US011035073B2

(12) United States Patent
Bocchino et al.

(10) Patent No.: US 11,035,073 B2
(45) Date of Patent: Jun. 15, 2021

(54) SELF CLEANING SUMP COVER

(71) Applicant: WHIRLPOOL CORPORATION, Benton Harbor, MI (US)

(72) Inventors: Gianluca Bocchino, Fabriano (IT); Roy E. Masters, St. Joseph, MI (US); Arun Rajendran, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 42 days.

(21) Appl. No.: 16/600,781

(22) Filed: Oct. 14, 2019

(65) Prior Publication Data

US 2020/0063329 A1 Feb. 27, 2020

Related U.S. Application Data

(62) Division of application No. 15/830,540, filed on Dec. 4, 2017, now Pat. No. 10,480,117.

(60) Provisional application No. 62/464,055, filed on Feb. 27, 2017, provisional application No. 62/561,901, (Continued)

(51) Int. Cl.
| *D06F 58/22* | (2006.01) |
| *D06F 58/24* | (2006.01) |
| *D06F 58/30* | (2020.01) |
| *D06F 58/50* | (2020.01) |
| *D06F 103/00* | (2020.01) |

(Continued)

(52) U.S. Cl.
CPC .............. *D06F 58/22* (2013.01); *D06F 58/24* (2013.01); *B08B 3/02* (2013.01); *B08B 2203/0223* (2013.01); *D06F 58/02* (2013.01); *D06F 58/30* (2020.02); *D06F 58/50* (2020.02); *D06F 2103/00* (2020.02)

(58) Field of Classification Search
CPC .......... D06F 58/22; D06F 58/24; D06F 58/02; D06F 2058/2858; D06F 58/28; D06F 2058/2854
See application file for complete search history.

(56) References Cited

U.S. PATENT DOCUMENTS

| 2,934,023 A | 4/1960 | Lamkin et al. |
| 3,129,711 A | 4/1964 | Schmitt-Matzen |
| 3,359,907 A | 12/1967 | Bochan |

(Continued)

FOREIGN PATENT DOCUMENTS

| CH | 707892 | 10/2014 |
| CN | 202630562 | 12/2012 |

(Continued)

*Primary Examiner* — David J Laux
(74) *Attorney, Agent, or Firm* — Price Heneveld LLP

(57) ABSTRACT

A fluid flow system for a laundry appliance includes a blower that delivers process air along an airflow path having a heat exchanger. A drain channel receives condensate from the heat exchanger and fluid spray from a spray nozzle for directing lint particles to the drain channel and on to a sump for collecting fluid, including the condensate. A pump seat and a fluid outlet are integrally formed in a sump cover. A pump directs the fluid from the sump to the fluid outlet. A fluid level sensor detects at least minimum and maximum capacities of the fluid in the sump. When the fluid is below the minimum capacity, the pump defines an idle state. When the fluid reaches the minimum capacity, the pump defines an active state. When the fluid exceeds the maximum capacity, the pump directs the fluid to the fluid outlet.

14 Claims, 37 Drawing Sheets

Related U.S. Application Data filed on Sep. 22, 2017, provisional application No. 62/572,794, filed on Oct. 16, 2017.

(51) Int. Cl.
  *B08B 3/02* (2006.01)
  *D06F 58/02* (2006.01)

(56) References Cited

U.S. PATENT DOCUMENTS

| | | |
|---|---|---|
| 3,455,119 A | 7/1969 | Bright |
| 3,653,807 A | 4/1972 | Platt |
| 3,680,893 A | 8/1972 | Giraud |
| 3,751,179 A | 8/1973 | Wassmann |
| 3,773,432 A | 11/1973 | Chow et al. |
| 3,836,001 A | 9/1974 | Heldreth |
| 3,896,641 A | 7/1975 | Worst |
| 3,953,146 A | 4/1976 | Sowards |
| 3,975,931 A | 8/1976 | Bischkopf |
| 4,068,870 A | 1/1978 | Whitney et al. |
| 4,251,758 A | 2/1981 | Pedersen et al. |
| 4,409,532 A | 10/1983 | Hollenbeck et al. |
| 4,451,069 A | 5/1984 | Melone |
| 4,600,361 A | 7/1986 | Bianco |
| 4,647,082 A | 3/1987 | Fournier et al. |
| 4,671,540 A | 6/1987 | Medvick et al. |
| 4,804,213 A | 2/1989 | Guest |
| 5,142,214 A | 8/1992 | Purson et al. |
| 5,214,936 A | 6/1993 | Lim et al. |
| 5,285,664 A | 2/1994 | Chang et al. |
| 5,395,140 A | 3/1995 | Wiethom |
| 5,628,531 A | 5/1997 | Rosenberg et al. |
| 5,658,020 A | 8/1997 | Carman et al. |
| 5,740,835 A | 4/1998 | Murphy |
| 5,911,750 A | 6/1999 | Mandel et al. |
| 5,921,104 A | 7/1999 | Chang |
| 6,070,419 A | 6/2000 | Chang |
| 6,114,827 A | 9/2000 | Alvaro |
| 6,159,962 A | 12/2000 | Steiner et al. |
| 6,519,962 B1 | 2/2003 | Schuetter |
| 6,574,979 B2* | 6/2003 | Faqih .............. B01D 5/0033 62/285 |
| 6,574,984 B1 | 6/2003 | McCrea et al. |
| 6,672,628 B2 | 1/2004 | Thomas et al. |
| 6,854,772 B2 | 2/2005 | Weller et al. |
| 6,863,314 B2 | 3/2005 | Guest |
| 6,913,294 B2 | 7/2005 | Treverton et al. |
| 7,316,428 B2 | 1/2008 | Takayanagi et al. |
| 7,448,146 B2* | 11/2008 | Cho .............. B01D 45/12 34/601 |
| 7,458,171 B1 | 12/2008 | Lentz |
| 7,510,216 B2 | 3/2009 | Tomerlin et al. |
| 7,624,896 B2 | 12/2009 | Doglioni Majer |
| 7,707,860 B2 | 5/2010 | Hong et al. |
| 7,770,418 B2 | 8/2010 | Kramme et al. |
| 7,866,182 B2 | 1/2011 | Lim et al. |
| 8,024,871 B2* | 9/2011 | Han .............. F24F 7/025 34/602 |
| 8,029,024 B2 | 10/2011 | Guest |
| 8,083,104 B2 | 12/2011 | Roetker et al. |
| 8,171,757 B2 | 5/2012 | Dahlke |
| 8,266,814 B2 | 9/2012 | Grunert |
| 8,499,978 B2 | 8/2013 | Dalchau et al. |
| 8,540,118 B2 | 9/2013 | McDonald et al. |
| 8,566,989 B2* | 10/2013 | Yoo .............. D06F 58/203 8/149.3 |
| 8,656,731 B2 | 2/2014 | Kim |
| 8,695,371 B2 | 4/2014 | Boarman et al. |
| 8,789,854 B2 | 7/2014 | Christian, Jr. et al. |
| 8,926,275 B2 | 1/2015 | Badafem et al. |
| 8,991,220 B2 | 3/2015 | Buso et al. |
| 9,010,144 B2 | 4/2015 | Park et al. |
| 9,065,363 B2 | 6/2015 | Marioni |
| 9,088,236 B2 | 7/2015 | Marioni |
| 9,255,358 B2 | 2/2016 | Kim |
| 9,273,903 B2 | 3/2016 | Vian et al. |
| 9,309,103 B2 | 4/2016 | Ergican et al. |
| 9,373,210 B2 | 6/2016 | Wittern, Jr. et al. |
| 9,404,211 B2 | 8/2016 | Hill et al. |
| 9,506,682 B2 | 11/2016 | Yun et al. |
| 9,581,377 B2 | 2/2017 | Kim et al. |
| 9,617,680 B2* | 4/2017 | Kitayama .............. D06F 58/30 |
| 9,644,308 B2 | 5/2017 | Leibman et al. |
| 9,702,078 B2 | 7/2017 | Lee |
| 9,702,080 B2 | 7/2017 | Lee et al. |
| 9,809,922 B2 | 11/2017 | Salomonsson |
| 9,890,029 B2 | 2/2018 | Comsa et al. |
| 9,903,064 B2 | 2/2018 | Del Pos et al. |
| 9,915,468 B2 | 3/2018 | You et al. |
| 10,563,342 B2* | 2/2020 | Moniz .............. B01D 47/06 |
| 10,662,574 B2* | 5/2020 | Bocchino .............. D06F 58/24 |
| 2006/0277690 A1 | 12/2006 | Pyo et al. |
| 2008/0132160 A1* | 6/2008 | Han .............. D06F 58/00 454/344 |
| 2009/0071031 A1* | 3/2009 | Kim .............. D06F 58/24 34/140 |
| 2010/0253075 A1 | 10/2010 | Werth |
| 2012/0032629 A1 | 2/2012 | Peterson et al. |
| 2012/0104021 A1 | 5/2012 | Cur |
| 2012/0114473 A1 | 5/2012 | Badafem et al. |
| 2012/0228871 A1 | 9/2012 | Li |
| 2012/0246960 A1* | 10/2012 | Lee .............. D06F 58/22 34/86 |
| 2013/0257043 A1 | 10/2013 | Guest |
| 2013/0312274 A1* | 11/2013 | Pillot .............. D06F 58/24 34/73 |
| 2013/0318813 A1 | 12/2013 | Hong et al. |
| 2014/0013616 A1* | 1/2014 | Lee .............. D06F 58/30 34/524 |
| 2014/0283542 A1 | 9/2014 | Jang |
| 2015/0197417 A1 | 7/2015 | Stagg et al. |
| 2015/0225226 A1 | 8/2015 | You |
| 2015/0345072 A1 | 12/2015 | Ko et al. |
| 2016/0010271 A1 | 1/2016 | Shin et al. |
| 2016/0083238 A1 | 3/2016 | Koo |
| 2016/0083894 A1 | 3/2016 | Bison et al. |
| 2016/0090681 A1 | 3/2016 | Nash et al. |
| 2016/0115643 A1* | 4/2016 | Bison .............. D06F 58/24 34/468 |
| 2016/0138209 A1* | 5/2016 | Kitayama .............. D06F 58/26 34/499 |
| 2016/0138849 A1 | 5/2016 | Lee et al. |
| 2016/0177496 A1* | 6/2016 | Moniz .............. D06F 58/22 34/82 |
| 2016/0201985 A1 | 7/2016 | Lee et al. |
| 2016/0205988 A1 | 7/2016 | Bird et al. |
| 2016/0341462 A1 | 11/2016 | Kim |
| 2017/0037560 A1 | 2/2017 | Shin et al. |
| 2017/0051449 A1 | 2/2017 | Nam et al. |
| 2017/0059224 A1 | 3/2017 | Bae et al. |
| 2017/0298563 A1 | 10/2017 | Roetker et al. |
| 2017/0341920 A1 | 11/2017 | Gonzales |

FOREIGN PATENT DOCUMENTS

| | | |
|---|---|---|
| DE | 2005011732 | 7/2006 |
| EP | 0454640 | 10/1991 |
| EP | 0682404 | 11/1995 |
| EP | 945973 | 9/1999 |
| EP | 2329757 | 6/2011 |
| EP | 2508668 A1 | 10/2012 |
| EP | 2620541 | 7/2013 |
| GB | 2288457 A | 10/1995 |
| JP | S57155777 | 9/1982 |
| JP | 2006177330 | 7/2006 |
| JP | 2008259665 | 10/2008 |
| JP | 2009287527 | 12/2009 |
| KR | 1020110125570 | 11/2011 |
| KR | 101588137 | 1/2016 |
| WO | 0346451 | 6/2003 |
| WO | 2004045351 | 6/2004 |
| WO | 20120226555 | 2/2012 |
| WO | 2012072477 | 6/2012 |

(56) References Cited

FOREIGN PATENT DOCUMENTS

| WO | 2012146534 A2 | 11/2012 |
|----|---------------|---------|
| WO | 2014115976    | 7/2014  |
| WO | 2015010731    | 1/2015  |
| WO | 2016204414    | 12/2016 |
| WO | 2017023122    | 2/2017  |

\* cited by examiner

SELF CLEANING SUMP COVER

CROSS-REFERENCE TO RELATED APPLICATIONS

The present application is a divisional of U.S. patent application Ser. No. 15/830,540 filed Dec. 4, 2017, entitled SELF CLEANING SUMP COVER, which claims priority to and the benefit under 35 U.S.C. § 119(e) of U.S. Provisional Patent Application No. 62/464,055, filed on Feb. 27, 2017, entitled SELF-CLEANING LINT FILTER FOR A LAUNDRY APPLIANCE HAVING A HEAT PUMP SYSTEM, and U.S. Provisional Patent Application No. 62/561,901, filed on Sep. 22, 2017, entitled SELF-CLEANING LINT FILTER FOR A LAUNDRY APPLIANCE HAVING A HEAT PUMP SYSTEM, and U.S. Provisional Patent Application No. 62/572,794, filed on Oct. 16, 2017, entitled SELF-CLEANING LINT FILTER FOR A LAUNDRY APPLIANCE HAVING A HEAT PUMP SYSTEM, the entire disclosures of which are hereby incorporated herein by reference.

FIELD OF THE DEVICE

The device is in the field of laundry appliances, more specifically, a laundry appliance that includes a self-cleaning lint filter for removing lint from process air before reaching a heat pump system.

SUMMARY

In at least one aspect, a fluid flow system for a laundry appliance includes a blower that delivers process air along an airflow path. A heat exchanger dehumidifies the process air and removes condensate therefrom. A drain channel receives the condensate from the heat exchanger and fluid spray from a spray nozzle for directing lint particles to the drain channel. A sump collects fluid from the drain channel. The fluid at least partially includes the condensate. A sump cover includes a pump seat, and a fluid outlet that are integrally formed in the sump cover. A pump directs the fluid from the sump and to the fluid outlet. A fluid level sensor detects at least a minimum capacity and a maximum capacity of the fluid in the sump. When the fluid is below the minimum capacity, the pump defines an idle state. When the fluid reaches the minimum capacity, the pump defines an active state. When the fluid exceeds the maximum capacity, the pump directs a flow of the fluid to the fluid outlet of the sump cover.

In at least another aspect, a fluid flow system for a laundry appliance includes a blower that delivers process air along an airflow path during performance of a drying operation. A heat exchanger dehumidifies the process air and removes condensate therefrom. A lint filter is included for capturing lint particles from the process air, wherein a fluid spray system removes the lint particles from the lint filter. A sump collects the condensate from the heat exchanger and lint particles from the fluid spray system to define sump fluid within the sump. A sump cover has a pump that directs the sump fluid from the sump and to a fluid diverter valve, and a fluid level sensor that at least partially operates the pump. The pump and the fluid level sensor are directly attached to the sump cover. The pump activates when a level of the sump fluid reaches a maximum capacity within the sump. The pump remains idle when the level of the sump fluid is below a minimum capacity.

In at least another aspect, a method for operating a fluid flow system for an appliance includes performing a drying operation. Sump fluid is delivered to a sump. The sump fluid includes condensate from a heat exchanger and lint particles from a fluid spray system. A level of the sump fluid in the sump is detected, wherein a sump pump remains idle during the drying operation when the level of the sump fluid is below a minimum capacity. A spray sequence is performed after the level of the sump fluid reaches the minimum capacity. The spray sequence directs the sump fluid to remove the lint particles from a surface and direct the lint particles and the sump fluid to the sump. The sump fluid containing the lint particles is recirculated during the spray sequence. The sump fluid is directed from the sump, to a spray nozzle via a fluid diverter valve, and back to the sump. The method also includes completing the spray sequence, completing the drying operation and operating a drain phase of the pump to deliver the sump fluid to a removable bottle after completion of the drying operation.

These and other features, advantages, and objects of the present device will be further understood and appreciated by those skilled in the art upon studying the following specification, claims, and appended drawings.

DETAILED DESCRIPTION OF EMBODIMENTS

Figure 1:
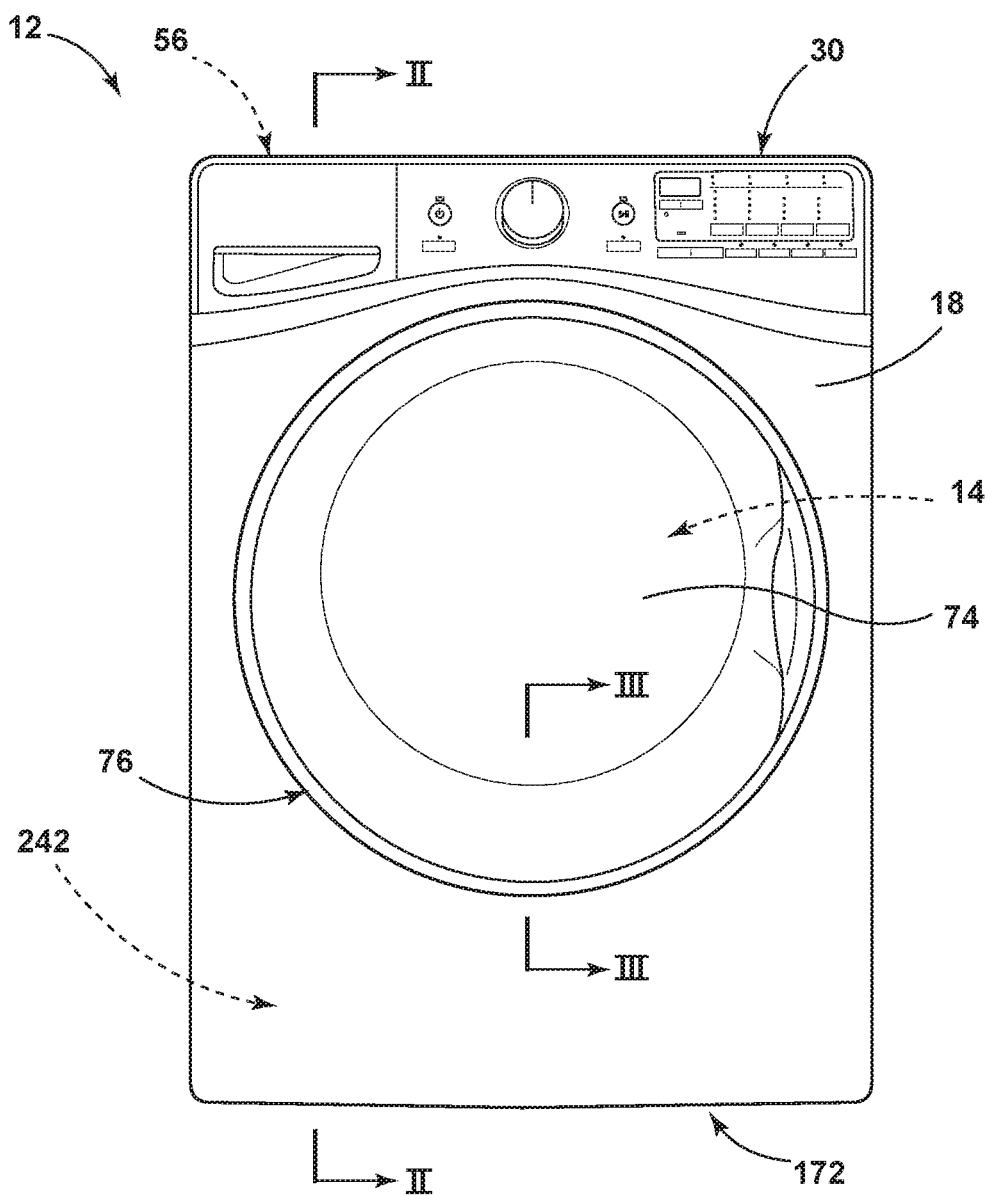
FIG. 1 is a front perspective view of a laundry appliance incorporating an aspect of a heat pump system.
Figure 2:
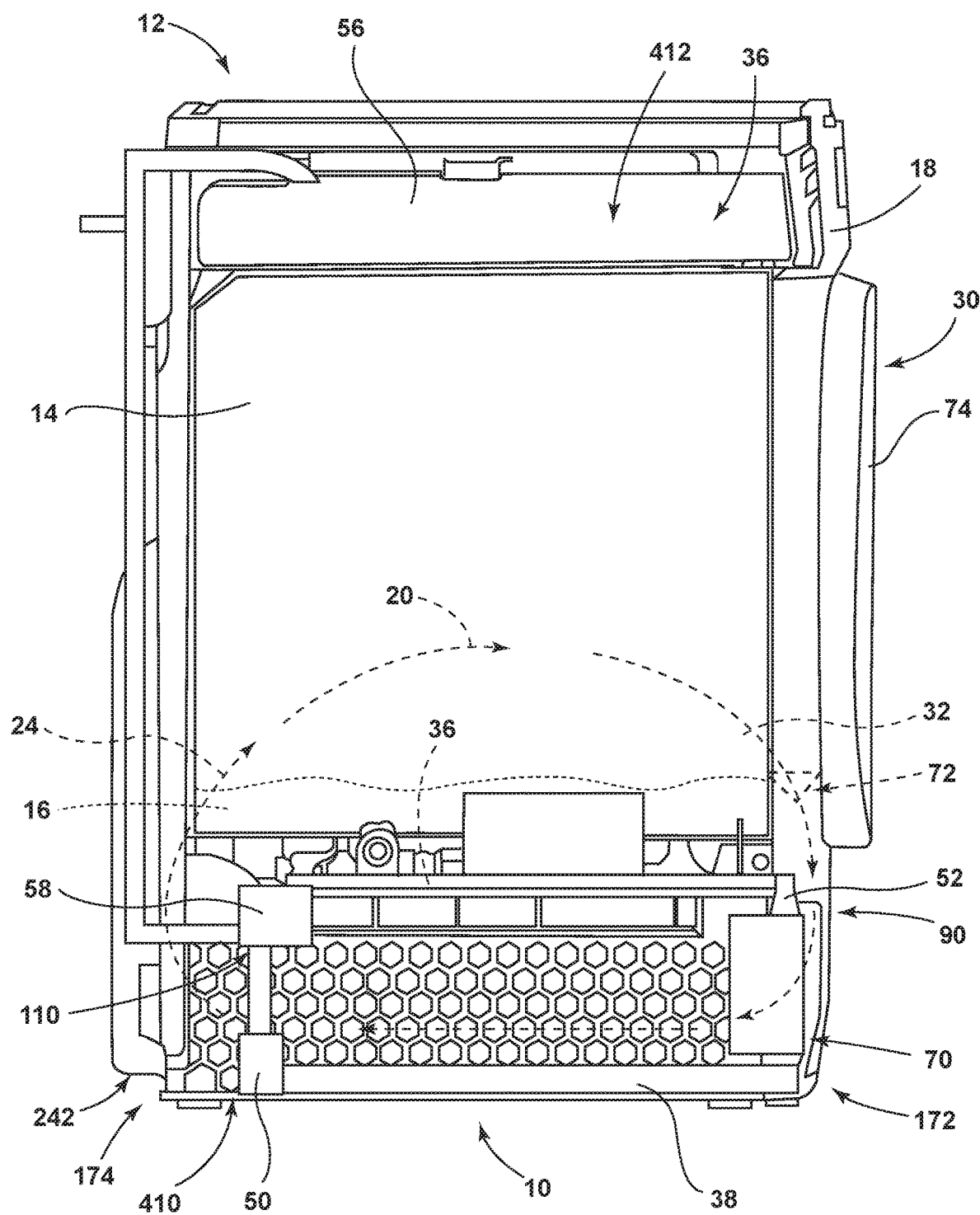
FIG. 2 is a cross-sectional view of the appliance of FIG. 1 taken along line II-II.
Figure 3:
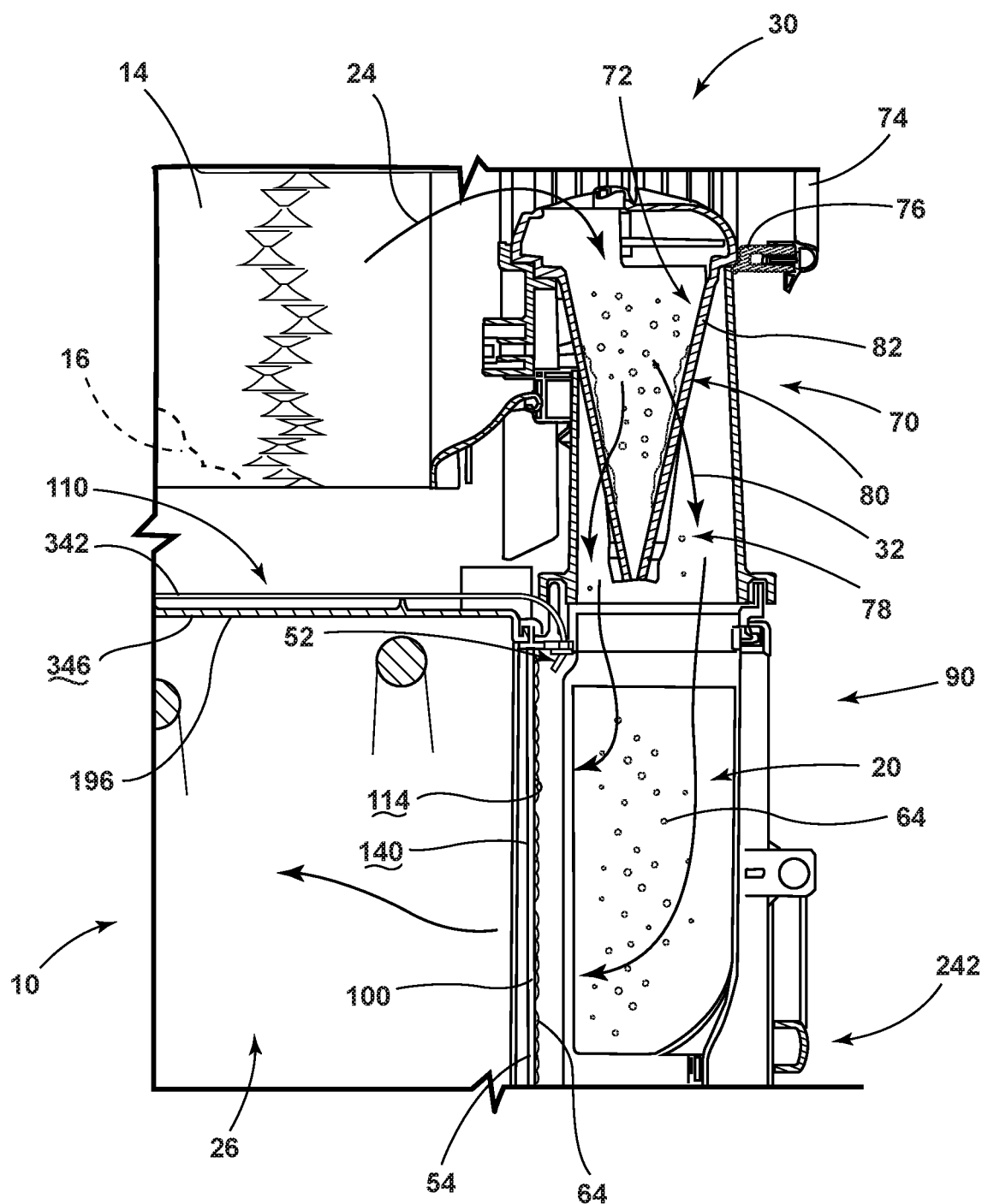
FIG. 3 is a cross-sectional view of the appliance of FIG. 1 taken along line III-III.
Figure 4:
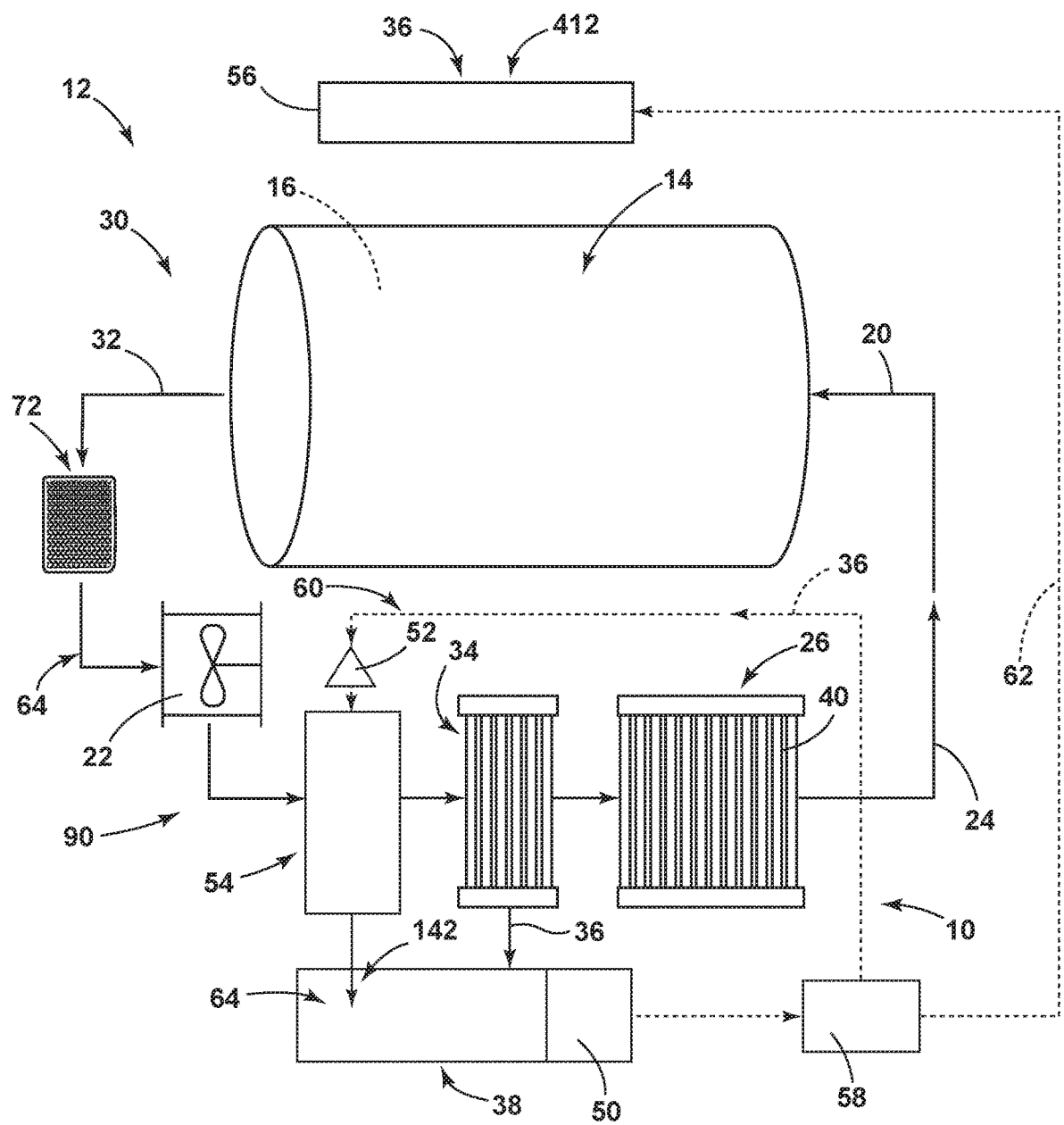
FIG. 4 is a schematic view of a laundry appliance incorporating an aspect of the heat pump system and an aspect of the self-cleaning lint filter.
Figure 5:
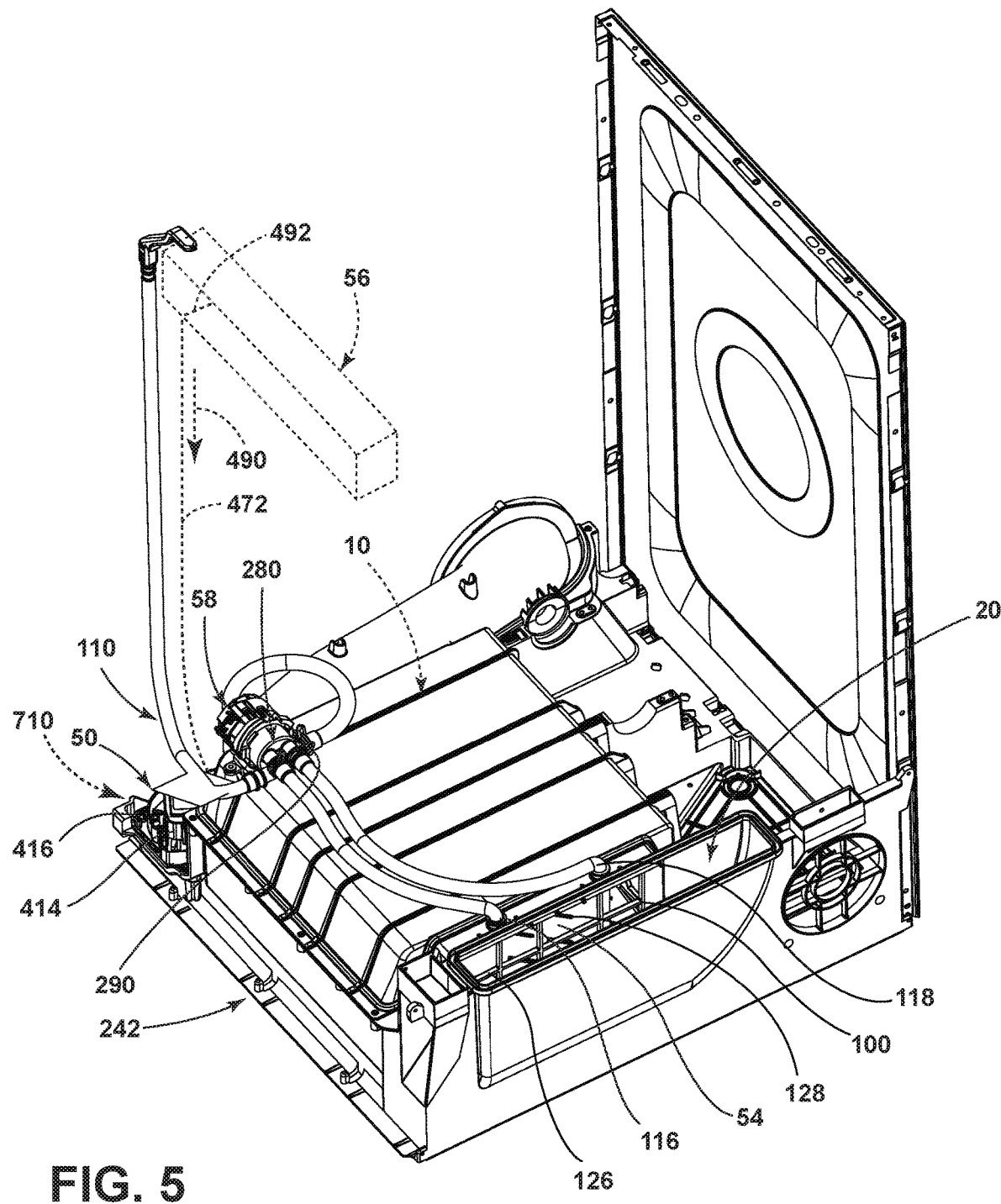
FIG. 5 is a top perspective view of a heat pump system for a laundry appliance.
Figure 6:
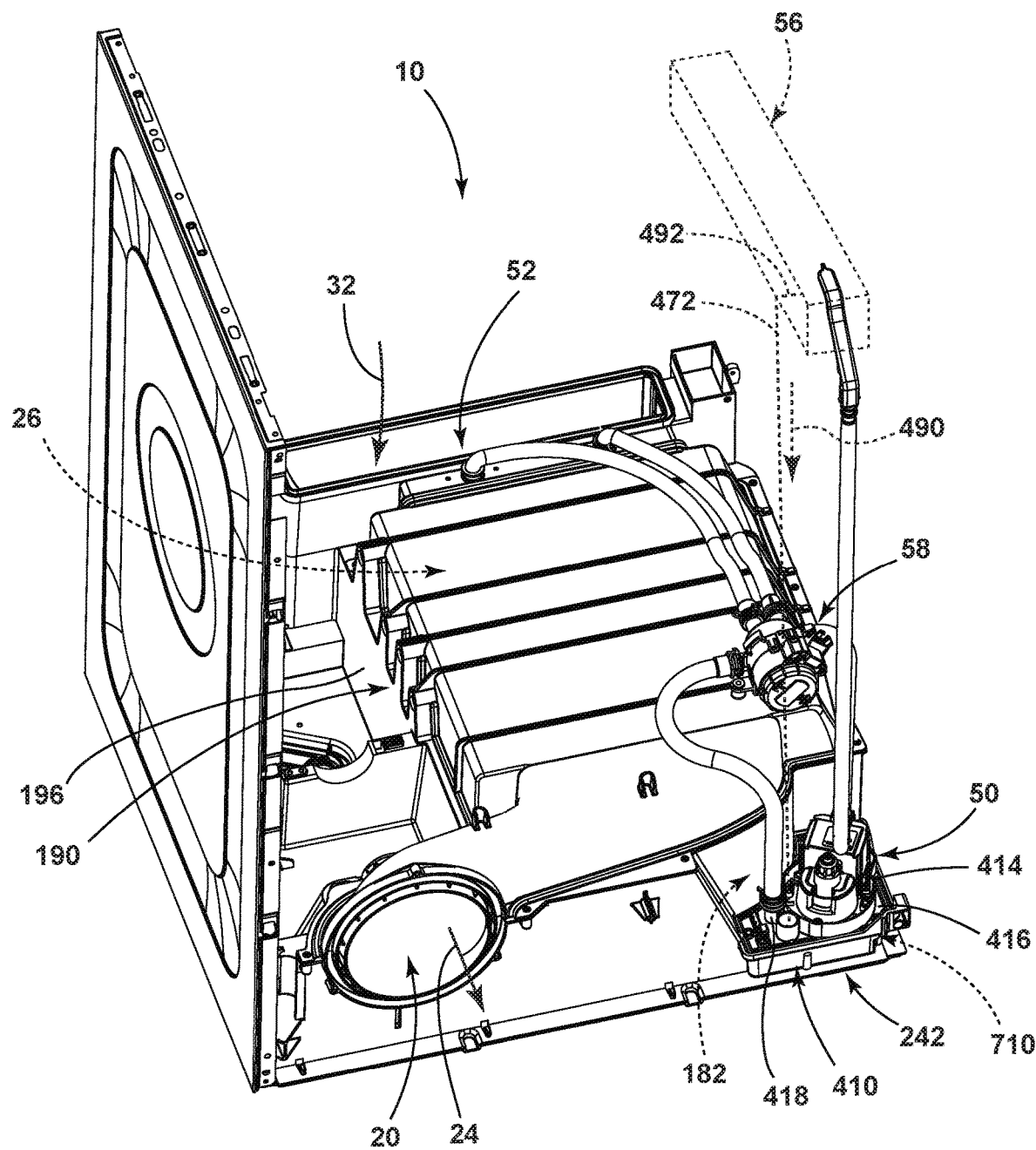
FIG. 6 is a second top perspective view of the heat pump system of FIG. 5.
Figure 7:
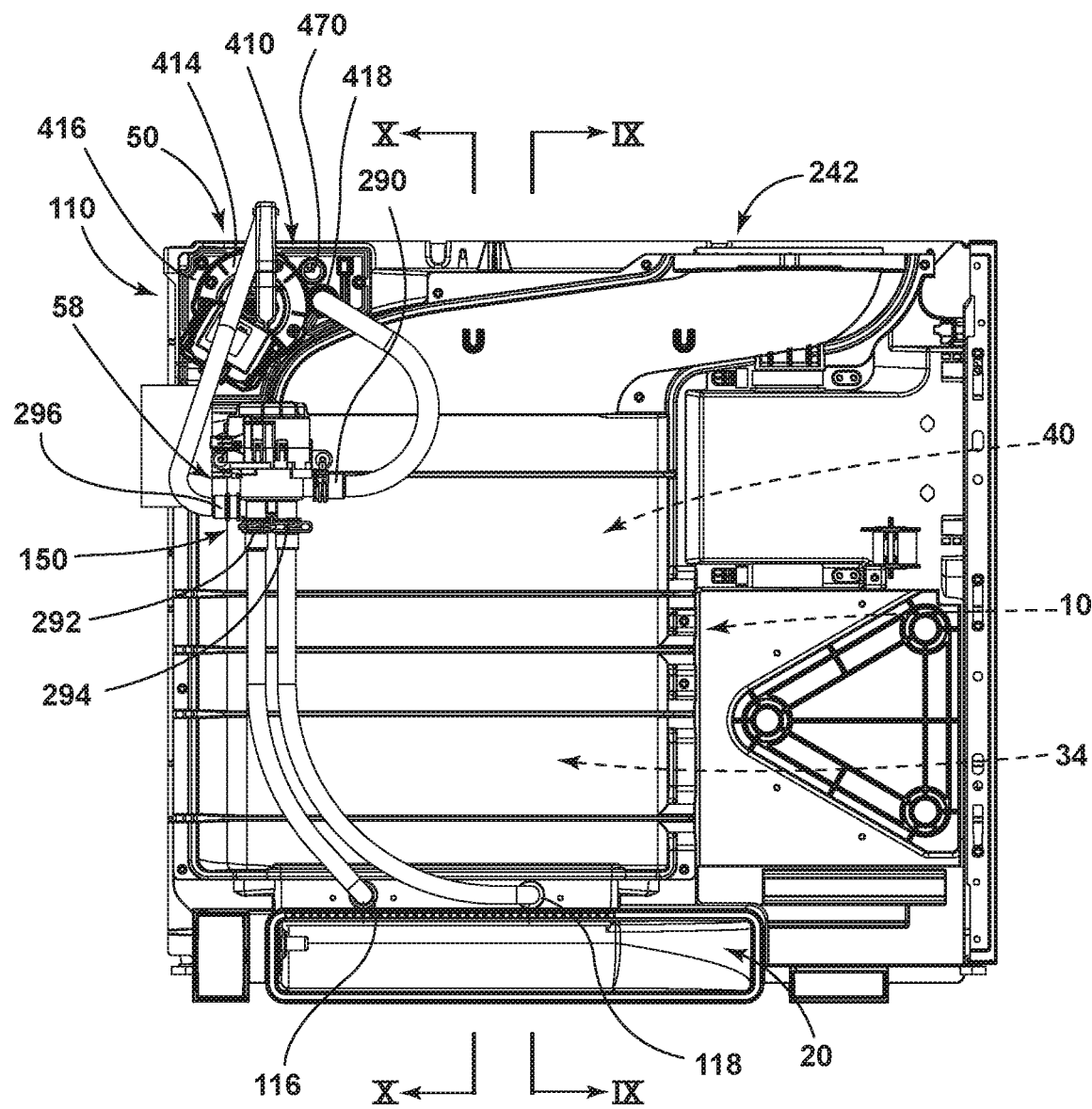
FIG. 7 is a top plan view of the heat pump system of FIG. 5.
Figure 8:
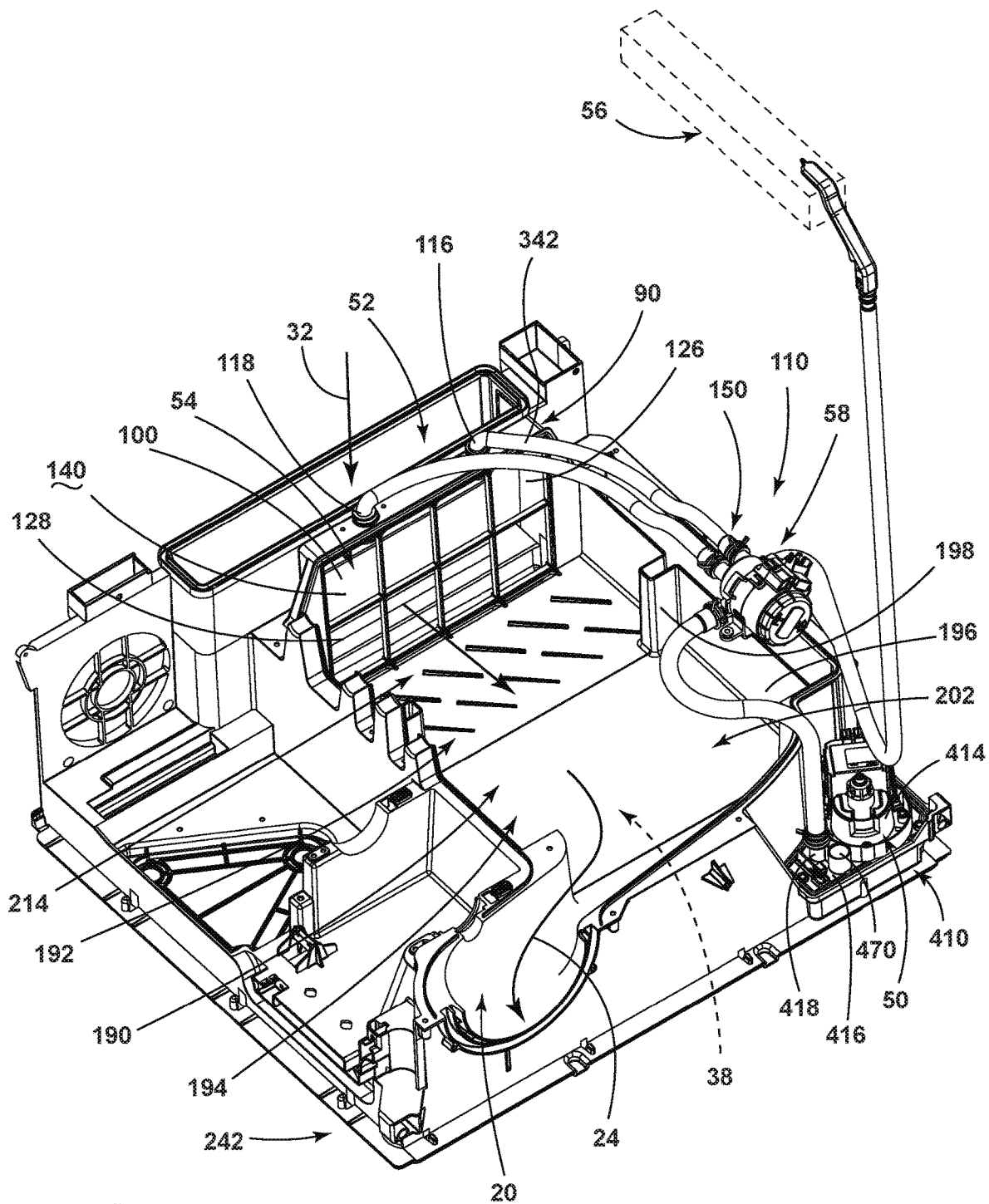
FIG. 8 is a top perspective view of the heat pump system of FIG. 5 with the heat exchangers removed.
Figure 9:
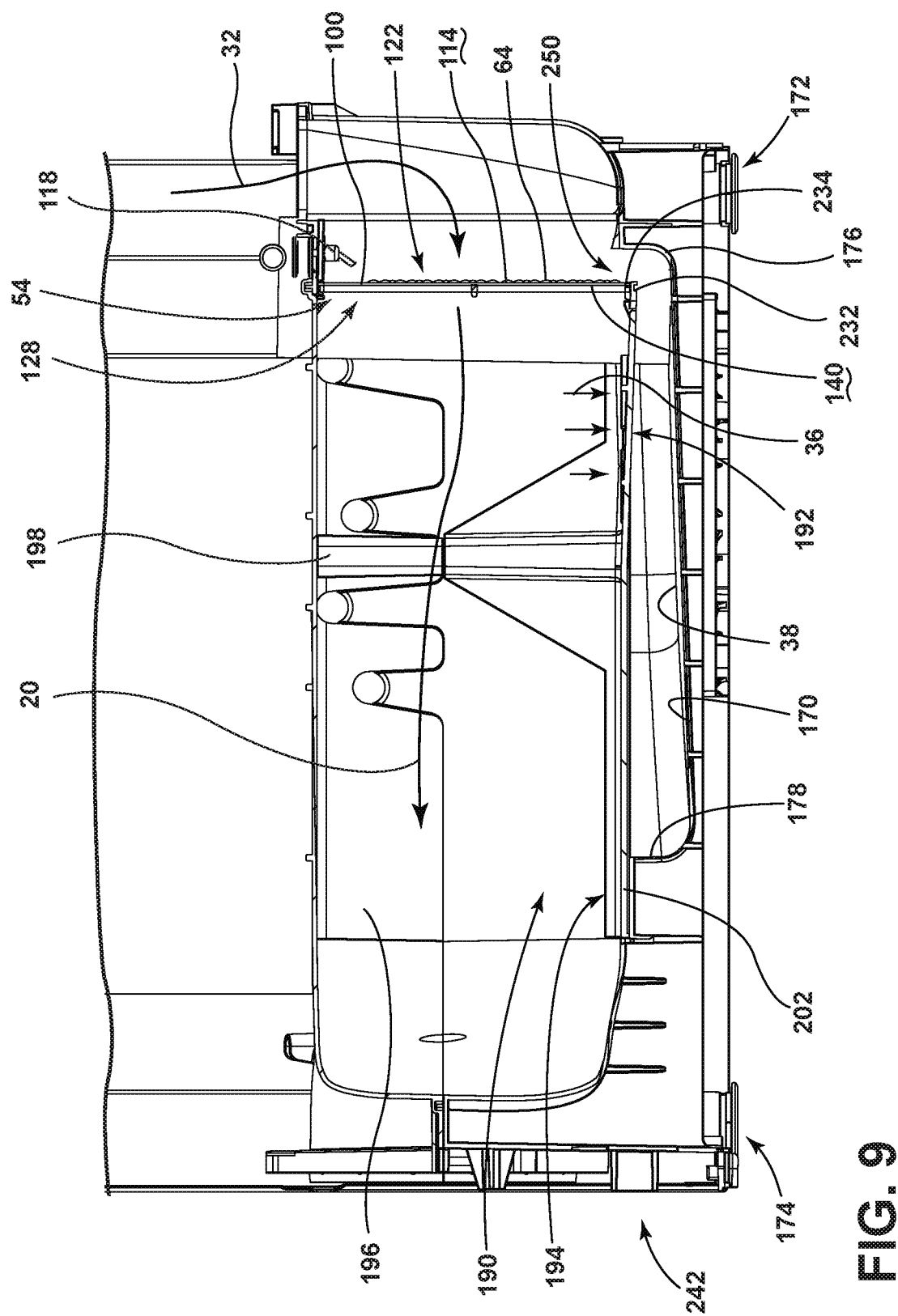
FIG. 9 is a cross-sectional view of the heat pump system of FIG. 7 taken along line IX-IX.
Figure 10:
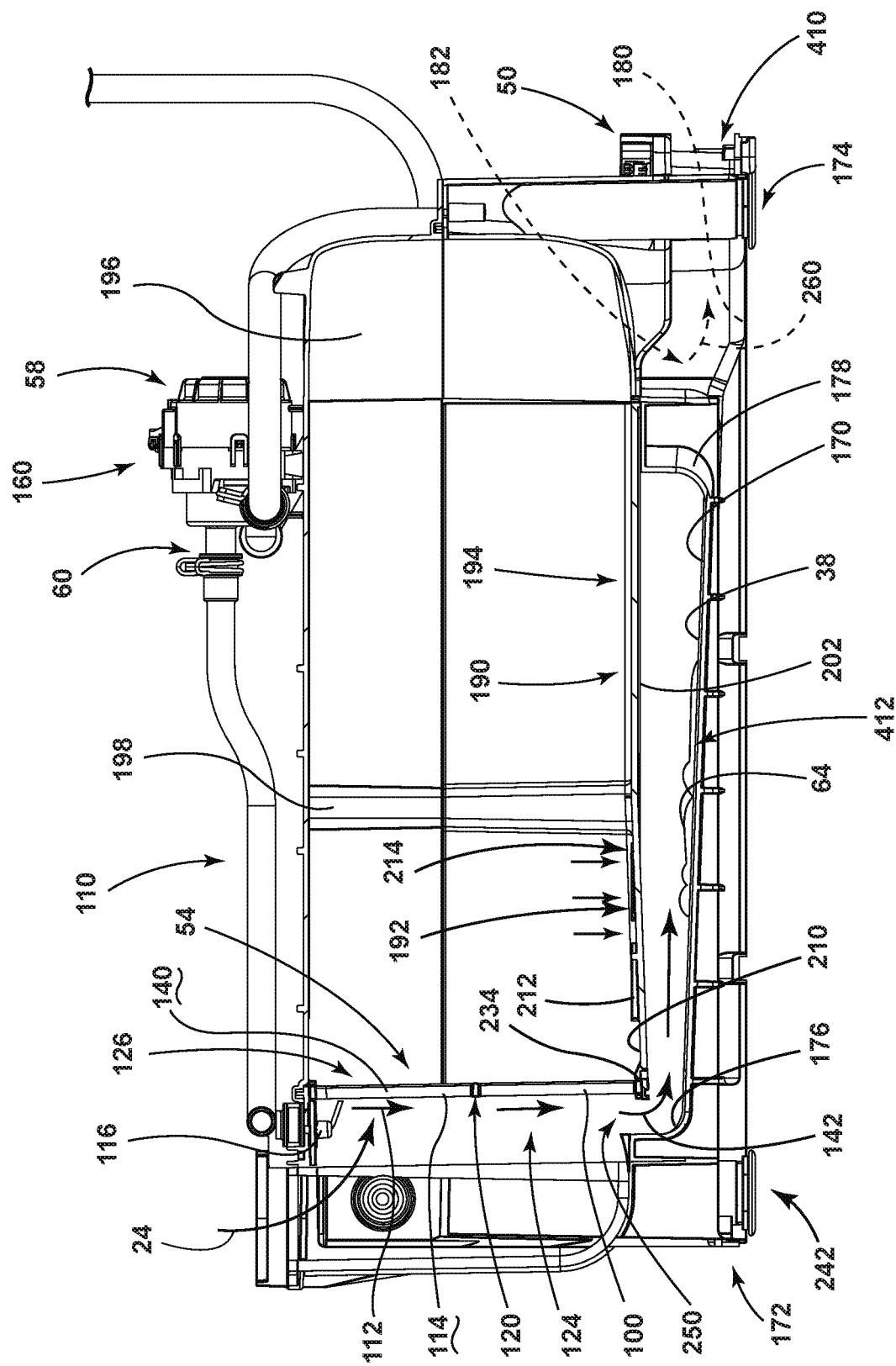
FIG. 10 is a cross-sectional view of the heat pump system of FIG. 7 taken along line X-X during activation of the first spray nozzle.
Figure 11:
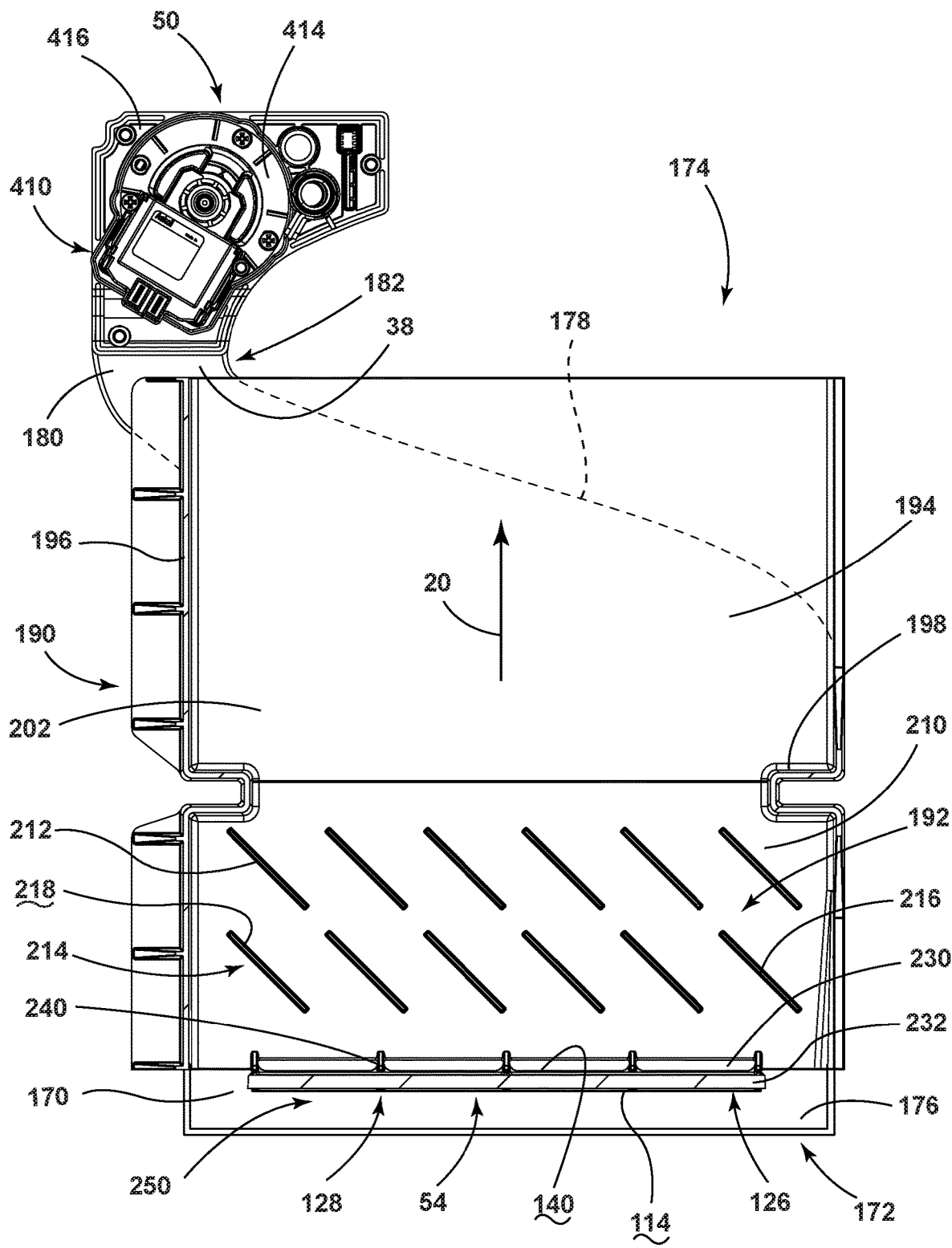
FIG. 11 is a top plan view of a condensate flow system for a laundry appliance.
Figure 12:
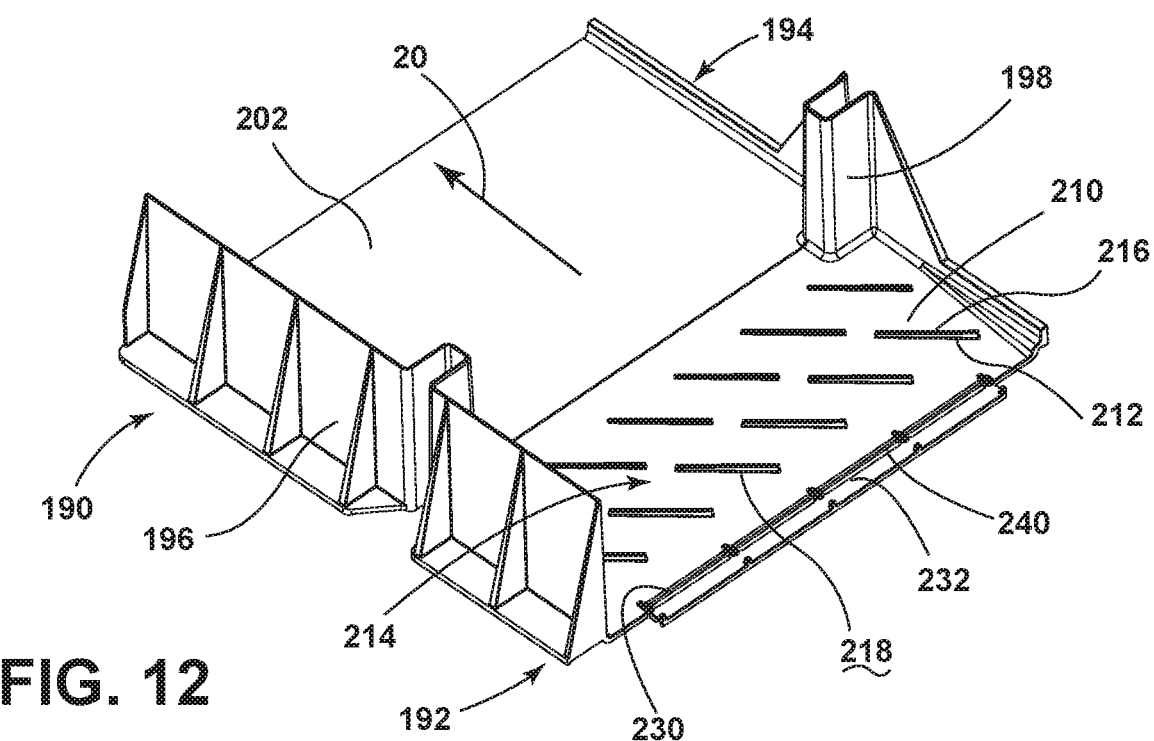
FIG. 12 is a top perspective view of an aspect of a heat exchanger support plate for use in connection with a heat pump system for a laundry appliance.
Figure 13:
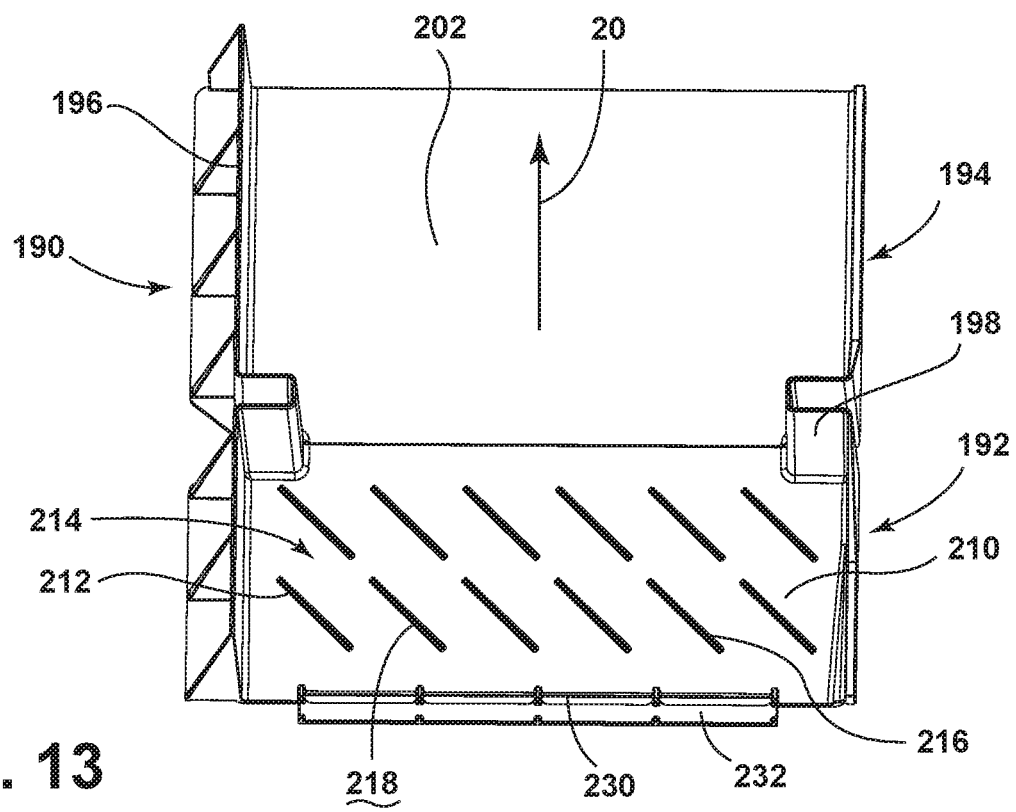
FIG. 13 is a top perspective view of the heat exchanger support plate of FIG. 12.
Figure 14:
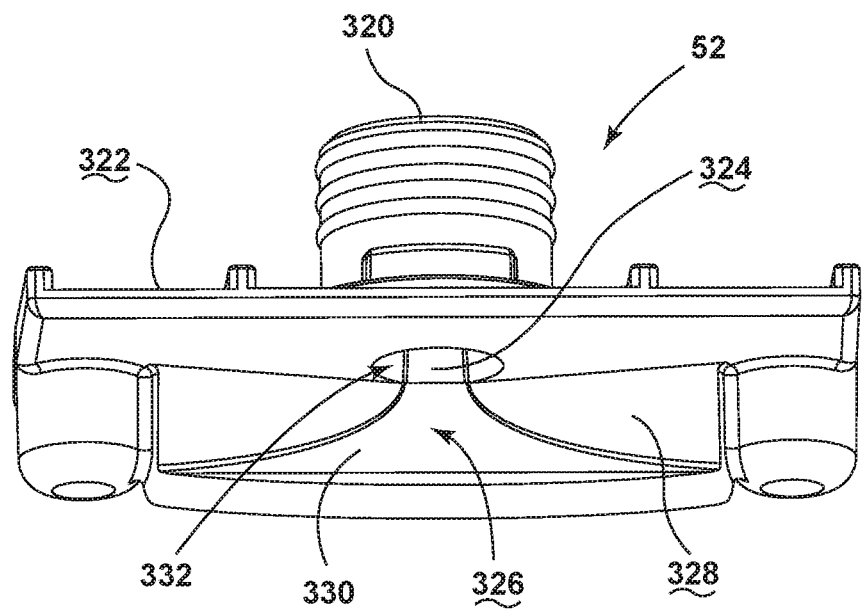
FIG. 14 is a top perspective view of a fluid nozzle for use in conjunction with the self-cleaning lint filter.
Figure 15:
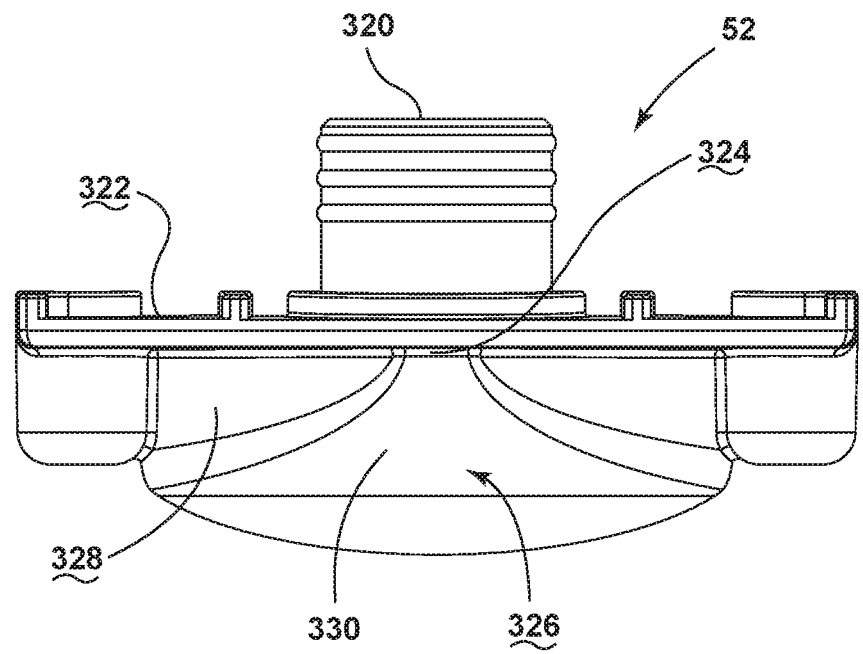
FIG. 15 is a top plan view of the fluid nozzle of FIG. 14.
Figure 16:
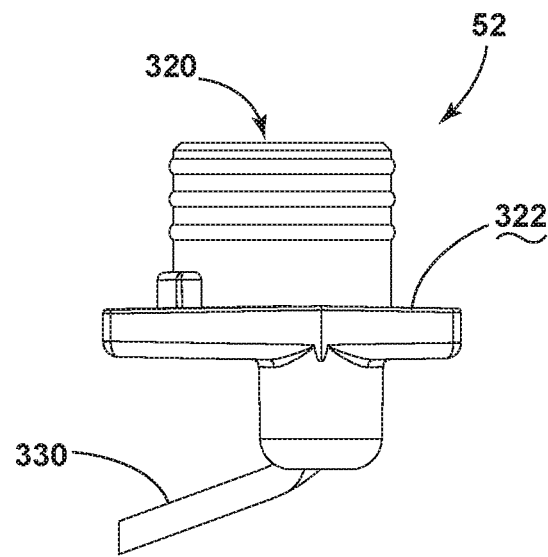
FIG. 16 is a side elevational view of the fluid nozzle of FIG. 14.
Figure 17:
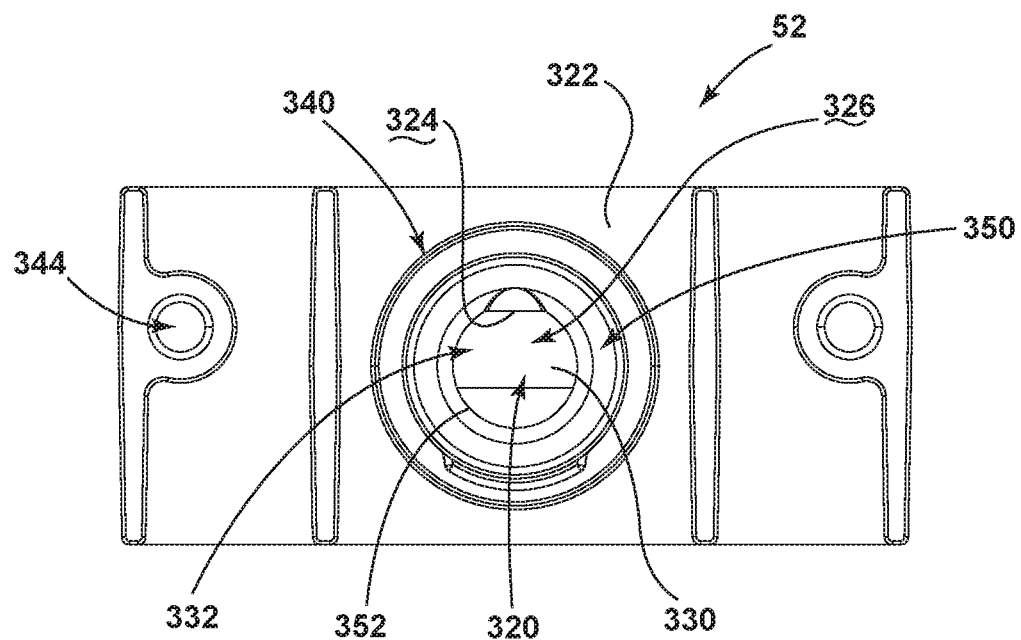
FIG. 17 is a rear elevational view of the fluid nozzle of FIG. 14.

As illustrated in FIGS. 1-4, reference numeral 10 generally refers to a heat pump system for use in a laundry appliance 12, typically a laundry drying appliance 12. The laundry appliance 12 can include a drum 14 for processing laundry articles 16 contained therein. The drum 14 is rotationally operable within a cabinet 18 that serves as a housing for the components of the laundry appliance 12. An airflow path 20 is included within the cabinet 18 and includes a blower 22 that moves process air 24 through the airflow path 20 and also through the drum 14. Accordingly, process air 24 can be moved through the drum 14 for drying or otherwise processing damp or wet articles 16 that may be contained within the drum 14. The heat pump system 10 is at least partially positioned within the airflow path 20. The heat pump system 10 can include at least one heat exchanger 26 that receives process air 24 from the drum 14 through operation of the blower 22. The blower 22 can be located upstream of the heat exchangers 26 such that operation of the blower 22 pushes the process air 24 toward and through the heat exchangers 26. The blower 22 can also be located downstream of the heat exchangers 26. In this configuration, operation of the blower 22 draws the process air 24 through the heat exchangers 26. One or more blowers 22 may be located either upstream or downstream of the heat exchangers 26. There may also be multiple blowers 22 that can be located both upstream and downstream of the heat exchangers 26.

Referring again to FIGS. 1-4, during a performance of a drying function 30 of the appliance 12, the at least one heat exchanger 26 can receive moisture-laden air 32 from the drum 14. The heat exchanger 26, typically an evaporator 34, can reduce the temperature of the moisture-laden air 32. By reducing the temperature of the moisture-laden air 32, the process air 24 is dehumidified and condensate 36 is precipitated out of the moisture-laden air 32. Once precipitated, this precipitated moisture is removed from the moisture-laden air 32 as condensate 36 that falls from the heat exchanger 26. A drain channel 38 is positioned below the heat exchanger 26 and serves to capture the condensate 36. After the condensate 36 has been removed, the process air 24 continues through the airflow path 20 back to the drum 14 to continue the drying function 30 of the laundry appliance 12.

The heat pump system 10 can also include a condenser 40 that serves to heat the now dehumidified process air 24 after moving through the evaporator 34. Accordingly, the heat pump system 10 can serve to modify the temperature of the process air 24 to perform various cooling and heating operations through use of the evaporator 34 and condenser 40, respectively, to dry the damp articles 16 within the drum 14. Additional heaters, such as electric heaters, can also be included to modify the temperature of the process air 24.

As exemplified in FIGS. 1-4, after the condensate 36 is removed from the moisture-laden air 32 and is moved to the drain channel 38, a pump 50 connected to the drain channel 38 is adapted to deliver the condensate 36 from the drain channel 38 to separate locations. These separate locations can be in the form of various spray nozzles 52 for cleaning one or more internal lint filters 54, an internal removable bottle 56 that can be removed after operation of the laundry appliance 12, as well as others. This location can also be in the form of an external drain where condensate 36 and other material can be moved by the pump 50 from the drain channel 38 to the exterior drain.

Where the condensate 36 is moved to the spray nozzles 52 and to the removable bottle 56 contained within the cabinet 18, a diverter valve 58 is connected to the pump 50. This diverter valve 58 serves to deliver the condensate 36 to various locations within the appliance 12 depending on the position of the diverter valve 58. As will be described more fully below, the diverter valve 58 is operable to define a cleaning phase 60, where condensate 36 is moved to the spray nozzles 52 for cleaning the internal lint filter 54. The diverter valve 58 can also be moved to a drain phase 62 where condensate 36 from the drain channel 38 as well as lint particles 64 and other particulate matter are moved through the pump 50 and through the diverter valve 58 for disposal of the condensate 36 and lint particles 64 into the removable bottle 56.

Referring again to FIGS. 1-4, as the process air 24 moves through the drum 14 for drying the damp articles 16 contained therein, the process air 24 can also pick up lint particles 64, such as fluff and other particulate matter, along with the moisture removed from the damp articles 16 within the drum 14. Accordingly, the moisture-laden air 32 moved from the drum 14 and toward the evaporator 34 also contains a certain amount of lint particles 64. In order to prevent, or substantially prevent, these lint particles 64 from reaching the evaporator 34 or other parts of the heat pump system 10, one or more air filters 70 are disposed within the airflow path 20 for cleaning the moisture-laden air 32 before it reaches the evaporator 34.

One such air filter 70 can include a removable lint filter 72 that is positioned proximate a door 74 of the cabinet 18. The removable lint filter 72 is typically positioned within an opening 76 for the door 74 of the appliance 12 and is adapted to be removed from a filter housing 78 by hand and without the use of tools. This removable lint filter 72 can include a single lint filtering layer 80 that captures lint particles 64 from the moisture-laden air 32 and entraps the lint particles 64 within a filtering material 82. This filtering material 82 can take the form of a mesh screen, foam-type filter, combinations thereof and other similar filtering material 82.

The removable lint filter 72 can include a single filtering layer 80 or can contain a plurality of filtering layers 80. Where a plurality of filtering layers 80 are included within the removable lint filter 72, each of the filtering layers 80 can contain an identical filtering material 82 with the same filtering capability. Alternatively, the filtering layers 80 can be oriented such that each successive filtering layer 80 contains a decreasing mesh size or pore size. In this manner, each successive layer of filtering material 82 of the removable lint filter 72 can entrap progressively smaller lint particles 64 from the moisture-laden air 32. Through the use of the removable lint filter 72, a majority of the lint particles 64 contained within the moisture-laden air 32 is designed to be entrapped by the removable lint filter 72. The removable lint filter 72 can include a single planar filter, multiple planar filters, planar filters oriented in a "V" or "U" configuration, as well as other similar configurations adapted to allow moisture-laden process air 24 to pass therethrough for entrapping lint particles 64 within the filtering material 82 of the removable lint filter 72.

In various embodiments of the device, the filtering material 82 can be in the form of a fluid that is sprayed through a portion of the airflow path 20. As this fluid is sprayed from the airflow path 20, the fluid wets portions of the lint particles 64 within the moisture-laden air 32. This moistened particulate matter increases in weight and may fall from the moisture-laden air 32 into a separate area defined within or attached to the airflow path 20. These wetted lint particles 64 can then be moved from the drain channel 38 for further disposal.

Referring now to FIGS. 2-11, the lint removal system 90 can include an internal lint filter 54 that is positioned within the airflow path 20 and between the removable lint filter 72 and the evaporator 34 of the heat pump system 10. The internal lint filter 54 includes a filtering material 82 with a mesh size or pore size that is typically smaller than the corresponding mesh size or pore size of the filtering layers 80 included within the removable lint filter 72. Accordingly, the removable lint filter 72 and the internal lint filter 54 cooperate to filter out and remove progressively smaller sized lint particles 64 as the moisture-laden air 32 moves toward the evaporator 34. The use of progressively smaller mesh sizes or pore sizes of the filtering material 82 within the lint removal system 90 allows for the capturing of larger lint particles 64 at the initial filter, typically the removable lint filter 72. Because the mesh size of the removable lint filter 72 is only adapted to capture lint particles 64 of a particular size, smaller lint particles 64 are allowed to pass through the filter material of the removable lint filter 72. This serves to limit excessive blockage by lint particles 64 and other particulate material within any one air filter 70 of the lint removal system 90. Typically, the removable lint filter 72 is adapted to catch the largest amount of lint particles 64. Each subsequent air filter 70 from the moisture-laden air 32 is designed to capture smaller lint particles 64 and, in turn, smaller quantities of lint particles 64. Through this system, each air filter 70 is designed to capture an appropriate quantity of lint particles 64 that prevents a total blockage of any one of the air filters 70 along the lint removal system 90.

Referring again to FIGS. 2-11, the internal lint filter 54 can include a single filtering member, typically, a single lint screen 100 that is positioned upstream of the evaporator 34. The internal lint filter 54 can also include multiple lint screens 100. As discussed above, each subsequent lint screen 100 is designed to capture smaller lint particles 64. In this manner, substantially all of the lint particles 64 from the moisture-laden air 32 can be captured within at least one of the air filters 70, either the removable lint filter 72 or an internal lint filter 54, of the lint removal system 90.

As exemplified in FIGS. 2-11, the removable lint filter 72 is adapted to be removed by hand and without the use of tools after each drying cycle performed by the appliance 12. Conversely, the internal lint filter 54 is typically designed to stay in a fixed position during regular use. While periodic cleaning of the internal lint filter 54 is provided for, such cleaning is typically designed to be performed by a professional technician. Such professional cleaning may be necessary for maintaining the heat pump system 10 and the lint removal system 90 and may occur annually, every two or more years, every six months, or other time period.

Referring again to FIGS. 1-11, the internal lint filters 54 are adapted to be cleaned through operation of the appliance 12 by using the condensate 36 that is collected within the drain channel 38. As discussed above, this condensate 36 is moved from the drain channel 38 by activation of a pump 50 coupled to the drain channel 38. The pump 50 moves this condensate 36 to the diverter valve 58. When the diverter valve 58 is in the cleaning phase 60, the condensate 36 moves through the diverter valve 58 and is directed to a fluid spray system 110 that sprays condensate 36 onto a surface of the internal lint filter 54. This fluid spray 112 from the nozzles of the fluid spray system 110 serves to push lint particles 64 off from a front surface 114 of the internal lint filter 54. The fluid spray 112 also pushes the lint particles 64 downward and into the drain channel 38.

Typically, the internal lint filter 54 will be served by at least two separate spray nozzles 52 for directing the fluid spray 112 to a surface of the internal lint filter 54. Additionally, where multiple internal lint filters 54 are included, each internal lint filter 54 will typically be served by at least two spray nozzles 52 for directing the fluid spray 112. During operation, the internal lint filter 54 will be sprayed by only one of the two spray nozzles 52, being first and second nozzles 116, 118, at any one time. As condensate 36 is sprayed from one of the first and second nozzles 116, 118, condensate 36 may become temporarily entrapped within a portion of the filter material. This temporarily trapped condensate 120 can cause a temporary blockage of process air 24 moving through that portion of the internal lint filter 54. The unsprayed portion 122 of the internal lint filter 54 remains substantially unblocked such that moisture-laden process air 24 is allowed to continue to pass therethrough. The temporarily trapped condensate 120 within the sprayed portion 124 of the internal lint filter 54 is eventually pushed out by the process air 24, evaporated, or otherwise removed from the lint screen 100 such that process air 24 can move therethrough to continue filtering lint particles 64. After operation of the first nozzle 116 to clean the first portion 126 of the internal lint filter 54, and removal of any trapped condensate 120 therefrom, the second nozzle 118 is then activated to remove lint particles 64 from the second portion 128 of the internal lint filter 54. As with the first nozzle 116, the second nozzle 118 sprays condensate 36, in the form of a fluid spray 112, to push lint particles 64 downward and into the drain channel 38 for ultimate removal from the appliance 12.

During operation of the first and second nozzles 116, 118 of the fluid spray system 110, condensate 36 can be sprayed onto the front surface 114 of the internal lint filter 54. In such an embodiment, the first and second nozzles 116, 118 are directed to push lint particles 64 off from the front surface 114 of the internal lint filter 54, such that the sprayed condensate 142 and lint particles 64 can be captured within the drain channel 38. The first and second nozzles 116, 118 of the fluid spray system 110 can also be oriented to spray condensate 36 through the back surface 140 of the internal lint filter 54 to push lint particles 64 off from the front surface 114 of the internal lint filter 54 where the sprayed condensate 142 and lint particles 64 can be captured within the drain channel 38. In various embodiments, a combination of spray nozzles 52 that spray both the front and back surfaces 114, 140 of the internal lint filter 54 can also be implemented.

As exemplified in FIGS. 2-11, to operate the first and second nozzles 116, 118, or any additional spray nozzles 52 that may be included within the fluid spray system 110, the diverter valve 58 can include a plurality of cleaning phase positions 150. Each cleaning phase position 150 can correspond to one spray nozzle 52 of the fluid spray system 110. In this manner, only one spray nozzle 52 of the fluid spray system 110 is operational at any one time. This configuration serves to minimize temporary blockage as a result of condensate 36 being temporarily trapped within the filter material. This configuration also serves to maximize fluid pressure from the fluid pump 50. Accordingly, substantially all of the suction 260 or fluid pressure generated by the pump 50 during the cleaning phase 60 can direct and force the fluid spray 112 through the diverter valve 58 in one of the cleaning phase positions 150 and through a single spray nozzle 52. Accordingly, the sprayed condensate 142 from each spray nozzle 52 can have a maximum amount of fluid pressure for projecting the sprayed condensate 142, in the form of the fluid spray 112, toward the respective portion of the internal lint filter 54.

After the cleaning phase 60 of the spray sequence 160 is completed for the fluid spray system 110, lint particles 64 and sprayed condensate 142 are contained within the drain channel 38. The amount of lint particles 64 contained within the drain channel 38 can vary depending upon certain factors. Such factors include, but are not limited to, the number of times a particular cleaning phase 60 or spray sequence 160 is performed, the type of drying function 30 performed, the amount of lint particles 64 captured by each internal lint filter 54, and other similar factors.

The spray sequence 160 can include a single operation of each spray nozzle 52 for the internal lint filter 54. Where multiple lint screens 100 are included within the internal lint filter 54, various spray sequences 160 can be conducted depending upon the amount of lint particles 64 captured within the internal lint filter 54. By way of example, and not limitation, where the internal lint filter 54 may include sequential first and second internal lint filters, the first internal lint filter may be adapted to capture greater amounts of lint having a larger size of lint particles 64. The second internal lint filter may capture smaller amounts of lint. Because the first internal lint filter will typically capture more lint particles 64, a spray sequence 160 dedicated to this first internal lint filter may operate more frequently than a separate spray sequence 160 for the second internal lint filter. The same may be true for additional lint screens 100 of internal lint filters 54 for the lint removal system 90.

Where lint particles 64 and sprayed condensate 142 are contained within the drain channel 38, the pump 50 may be activated according to various factors for moving the lint particles 64 and sprayed condensate 142 to the removable bottle 56. The pump 50 may be activated when a certain volume of lint particles 64 and sprayed condensate 142 are contained within the drain channel 38 after each spray sequence 160 is completed, or activation of the pump 50 may be based upon the amount of space available within the removable bottle 56. A combination of these initiating events may be incorporated within the fluid spray system 110 to remove the lint particles 64 and sprayed condensate 142 from the drain channel 38 to the removable bottle 56.

As exemplified in FIGS. 10 and 11, the drain channel 38 can include an angled bottom 170 that defines a slope to use the force of gravity for moving sprayed condensate 142 and lint particles 64 from a front portion 172 of the drain channel 38 proximate the internal lint filter 54 to a rear portion 174 of the drain channel 38 proximate the fluid pump 50. In certain aspects of the device, an additional spray nozzle 52 may be included at a front portion 172 of the drain channel 38 to assist in moving the lint particles 64 and sprayed condensate 142 down the angled bottom 170 and toward the fluid pump 50. The activation of the first and second nozzles 116, 118 that serve the internal lint filter 54 can be configured to remove lint particles 64 from the front surface 114 of the internal lint filter 54 and also assist in pushing the sprayed condensate 142 and lint particles 64 down the angled bottom 170 and toward the rear portion 174 of the drain channel 38. In such an embodiment, the front portion 172 of the drain channel 38 may include a curve or chamfer 176 that provides for a substantially laminar path that can assist in pushing the lint particles 64 and sprayed condensate 142 toward the rear portion 174 of the drain channel 38. The rear portion 174 of the drain channel 38 can include an angled back surface 178. This angled back surface 178 in conjunction with the angled bottom 170 drain channel 38 provides for a single low point 180 proximate a back corner 182 of the drain channel 38 where the fluid pump 50 is typically located. Accordingly, the drain channel 38 is designed to allow the lint particles 64 and sprayed condensate 142 to flow towards this low point 180 of the drain channel 38 to be removed by the fluid pump 50.

When an initiating signal is provided to the drain pump 50, the drain pump 50 is activated and sprayed condensate 142 and lint particles 64 are moved by the fluid pump 50 toward the diverter valve 58. The diverter valve 58, during this portion of the spray sequence 160, is moved to a drain phase 62 such that the lint particles 64 and sprayed condensate 142 are moved through the diverter valve 58 and toward the removable bottle 56. The removable bottle 56 is removable from the appliance 12 for pouring the lint particles 64 and sprayed condensate 142 into an external drain or into a trash receptacle.

In certain embodiments, the removable bottle 56 can include an indicator that informs the user when the removable bottle 56 is full of lint particles 64 and/or sprayed condensate 142 such that removal is necessary. Accordingly, the removable bottle 56 can include various sensors that can monitor the amount of lint particles 64 and/or sprayed condensate 142 therein to provide this indicator to the user of the appliance 12. As discussed above, when the removable bottle 56 becomes sufficiently full such that additional operation of the pump 50 and diverter valve 58 in the drain phase 62 may cause an overflow of the removable bottle 56, the appliance 12 may prevent operation of certain drying functions 30 until such time as the removable bottle 56 is emptied.

After the drain phase 62 is complete, the diverter valve 58 can be repositioned to one of the cleaning phase positions 150 to perform the next cleaning phase operation to spray condensate 36 onto the internal lint filter 54 using one of the spray nozzles 52. The specific operation of the spray sequences 160 and operation of the diverter valve 58 will be described more fully below.

As exemplified in FIGS. 8-13, the heat pump system 10 can include a heat exchange plate 190 that serves to support the evaporator 34 and condenser 40 of the heat pump system 10. Typically, a front region 192 of the heat exchange plate 190 serves to support the evaporator 34 and a rear region 194 of the heat exchange plate 190 supports the condenser 40. The heat exchange plate 190 can include sidewalls 196 that laterally support the evaporator 34 and condenser 40. The sidewalls 196 can include one or more shoulders 198 that can at least partially extend between the evaporator 34 and condenser 40 to provide consistent spacing and secure positioning in multiple directions for the evaporator 34 and condenser 40.

The heat exchange plate 190 includes a base 202 that serves to separate the airflow path 20 from the drain channel 38. This base 202 provides a lateral dividing wall that defines the airflow path 20 above the base 202 and the drain channel 38 below the base 202. Accordingly, as process air 24 or moisture-laden air 32 moves through the airflow path 20, the process air 24 moves over the base 202 of the heat exchange plate 190 and through the evaporator 34 and condenser 40. The process air 24 is substantially prevented from entering the drain channel 38 through the placement of the base 202 of the heat exchange plate 190.

Referring again to FIGS. 8-13, the front region 192 of the heat exchange plate 190 includes a sloped area 210 that serves to collect condensate 36 that falls from the evaporator 34 during the performance of a drying function 30. As this condensate 36 falls on the front region 192 of the heat exchange plate 190, the condensate 36 is directed through the sloped area 210 by a series of baffles 212 that are positioned at an angle with respect to the flow of process air 24 within the airflow path 20. As the condensate 36 falls onto the sloped area 210, the condensate 36 falls in typically small quantities. These small quantities of condensate 36 collect between the baffles 212. The condensate 36 flows down the sloped area 210 and through a meandering drain 214 that is defined generally below a top edge 216 of each of the baffles 212. These baffles 212 and the meandering drain 214 serve to block the process air 24 such that the movement of process air 24 does not push the condensate 36 up the sloped area 210 toward the rear region 194 and the condenser 40. Because the baffles 212 are positioned at an angle along the sloped area 210, the condensate 36 can flow along a directing surface 218 of the baffles 212 and within the meandering drain 214.

The condensate 36 is directed along the sloped area 210 and toward a condensate drain 230 positioned proximate a filter seat 232 of the heat exchange plate 190. The filter seat 232 receives a bottom portion 234 of the internal lint filter 54 and secures the internal lint filter 54 thereto to prevent inadvertent removal of the internal lint filter 54 during operation of the drying appliance 12. The condensate drain 230 is typically positioned immediately behind or downstream of the filter seat 232 such that condensate 36 moving down the sloped area 210 and between the baffles 212 of the heat exchange plate 190 can drop into the drain channel 38 behind the internal lint filter 54. The bottom portion 234 of the internal lint filter 54 can also serve to block a portion of the process air 24 from pushing the condensate 36 up the sloped area 210 and toward the condenser 40.

As exemplified in FIGS. 8-13, the baffles 212 within the front portion 172 of the heat exchange plate 190 are typically oriented in a diagonal configuration. These baffles 212 can be disposed in a similar angular configuration or can be disposed in various angles so long as the baffles 212 serve to define the meandering drain 214 and at least partially block the movement of process air 24 within the baffles 212. In this manner, the condensate 36 can drain down the sloped area 210 of the heat exchange plate 190 to the condensate drain 230.

The condensate drain 230 can be defined by a slot that extends between the sloped area 210 of the heat exchange plate 190 and the filter seat 232. This condensate drain 230 can also be in the form of a series of apertures defined within the base 202 of the heat exchange plate 190. To assist in supporting the internal lint filter 54, the filter seat 232 can be supported at least partially by the sloped area 210 of the heat exchange plate 190 through one or more support structures 240 that extend across or through the condensate drain 230. In this manner, the heat exchange plate 190 can support and fix the position of the internal lint filter 54 as well as the evaporator 34 and condenser 40 for the heat pump system 10.

This unitary base 202 that forms part of the heat exchange plate 190 can minimize wobble, vibration, and other noise that may emanate from the evaporator 34, condenser 40, internal lint filter 54, spray nozzles 52 or other component positioned within the basement 242 of the appliance 12 during performance of a drying function 30. While the heat exchange plate 190 includes the condensate drain 230 and opening 250, the drain channel 38 can be at least as wide, if not wider, than the heat exchange plate 190, such that condensate 36 that may flow outside of the condensate drain 230 and/or the condensate opening 250 may still fall into the drain channel 38 to be delivered to the fluid pump 50.

Referring again to FIGS. 8-13, in front of the filter seat 232, the heat exchange plate 190 defines a lint and condensate opening 250 through which the lint particles 64 can be pushed by the sprayed condensate 142 and into the drain channel 38. Through the condensate drain 230 and the lint and condensate opening 250, all of the condensate 36 and lint particles 64 and sprayed condensate 142 are moved into the common drain channel 38 for removal through a single fluid pump 50. The inclusion of a single fluid pump 50 and a single diverter valve 58 for removing condensate 36 as well as lint particles 64 and sprayed condensate 142 through the appliance 12 minimizes the amount of motors 270 and operational components needed for moving the material through the appliance 12.

The base 202 of the heat exchange plate 190 serves to position the evaporator 34 and a condenser 40 within the airflow path 20. The heat exchange plate 190 also elevates the evaporator 34 and the condenser 40 over the drain channel 38. Accordingly, the drain channel 38 can be placed at a low elevation within the basement 242 of the appliance 12 to efficiently capture condensate 36, lint particles 64 and sprayed condensate 142 while minimizing the amount of space necessary within the basement 242 for accomplishing these functions. The sidewalls 196 of the heat exchange plate 190 also define the sides of the airflow path 20 that serve to direct the movement of process air 24 and moisture-laden process air 24 through the airflow path 20 and through the heat pump system 10 of the appliance 12. This efficient movement of process air 24 through the heat exchange plate 190 also provides for an efficient thermal transmission of heat between the evaporator 34, the condenser 40, the process air 24, and heat exchange material contained within the heat pump system 10.

Referring now to FIGS. 20-23, the diverter valve 58 that apportions condensate 36 from the pump 50 between the first and second nozzles 116, 118 to define the cleaning phase 60 can include multiple separate cleaning phase positions 150 for sequentially delivering condensate 36 from the drain channel 38 to a first nozzle 116 for serving a first portion 126 of the internal lint filter 54 and then to a second nozzle 118 for serving a second portion 128 of the internal lint filter 54. During this cleaning phase 60, the first and second nozzles 116, 118 project the condensate 36 pumped by the fluid pump 50 onto a surface of the internal lint filter 54 to direct the captured lint particles 64 and sprayed condensate 142 to the drain channel 38.

The condensate 36 that is sprayed during the cleaning phase 60 is typically free of or substantially free of lint particles 64. These lint particles 64 are typically removed during a previous drain phase 62 of the diverter valve 58. During operation of the appliance 12 some minimal amounts of lint particles 64 may be present within the condensate 36 sprayed through the first and second nozzles 116, 118. These minimal lint particles 64 will typically be able to flow freely through the spray nozzles 52. In various aspects, fluid from an external fluid source, such as a faucet, may be used to supplement the condensate 36. The external fluid may also be used instead of condensate 36 in certain aspects of the device.

As discussed above, after the cleaning phase 60 is complete, the drain channel 38 contains both washed lint particles 64 and sprayed condensate 142 therein. This material is then moved toward the location of the pump 50, through at least the force of gravity to the low point 180 proximate the fluid pump 50. Activation of the fluid pump 50 causes a suction 260 within the drain channel 38 to remove the lint particles 64 and sprayed condensate 142 through the fluid pump 50 and toward the diverter valve 58. Before the lint particles 64 and sprayed condensate 142 from the fluid pump 50 reaches the diverter valve 58, the diverter valve 58 is manipulated to define a drain position corresponding to the drain phase 62. In this manner, the lint particles 64 and sprayed condensate 142 are moved through the diverter valve 58 in the drain phase 62 for movement of the lint particles 64 and sprayed condensate 142 to the removable bottle 56.

Referring again to FIGS. 20-23, the diverter valve 58 can include a dedicated motor 270 that is attached to a rotating disk 272 within a mixing chamber 274 of the diverter valve 58 via a shaft 276. The position of the disk 272 is detected by a sensing mechanism 278, such as a reed switch, Hall sensor, or other similar sensing mechanism 278 that activates and deactivates the motor 270 based upon the position of the disk 272 within the mixing chamber 274. When a particular position of the disk 272 is required to define one of the cleaning phase positions 150 or the position of the drain phase 62, the motor 270 can be activated. The sensing mechanism 278 proximate the motor 270 detects when the disk 272 or a valve opening 282 in the disk 272 is at the appropriate position and deactivates the motor 270 such that the disk 272 is maintained at the appropriate position. Accordingly, only one outlet 280 is adapted to receive either condensate 36 or lint particles 64 and sprayed condensate 142 for removal through the diverter valve 58. Accordingly, the diverter valve 58 can be used to specifically direct the movement of material through the diverter valve 58 to appropriate positions within the appliance 12. As a consequence, the diverter valve 58 can also segregate material within the appliance 12 so that it is kept away from certain portions of the appliance 12, such as keeping lint particles 64 away from the spray nozzles 52.

Referring again to FIGS. 20-23, the diverter valve 58 can include a single inlet 290 that receives material from the fluid pump 50. The inlet 290 delivers this material into the mixing chamber 274 to be delivered through the valve opening 282 and to only one outlet 280 of a plurality of outlets 280 of the diverter valve 58. The plurality of outlets 280 include a first nozzle outlet 292 and a second nozzle outlet 294 that correspond to the cleaning phase 60 and a bottle outlet 296 that corresponds to the drain phase 62. As discussed previously, the internal disk 272 is rotated about the shaft 276 such that the valve opening 282 in the disk 272 allows for fluid to pass from the mixing chamber 274 through only one of the outlets 280. Each outlet 280 corresponds to one spray nozzle 52, such as in the case of a cleaning phase 60, or a path to the water bottle 56, in the case of the drain phase 62. Where additional spray nozzles 52 beyond the first and second nozzle 116, 118 are included, additional cleaning phase positions 150 can be included within the diverter valve 58 to account for each spray nozzle 52 within the fluid spray system 110. In various aspects of the device, where multiple lint screens 100 are included, the diverter valve 58 described herein can define a primary diverter valve 58 and secondary diverter valves can be positioned downstream for serving the spray nozzles 52 of a particular internal lint filter 54.

As exemplified in FIGS. 20-23, the mixing chamber 274 and disk 272 are configured such that the drain phase 62 defines a smooth and substantially laminar fluid path to limit the ability of lint particles 64 to clog the diverter valve 58 during use. Accordingly, the configuration of the mixing chamber 274 is free of or is substantially free of accumulation points of fluid that may capture and retain lint particles 64 during use.

As exemplified in FIGS. 18-23, the pump 50 and diverter valve 58 can work in conjunction with one another to perform various spray sequences 160 for moving condensate 36 and lint particles 64 through the appliance 12. These spray sequences 160 can include various active and idle states or sequences that can be incorporated sequentially for removing lint particles 64 from the internal lint filter 54 and also for moving collected lint particles 64 and sprayed condensate 142 from the drain channel 38 to the water bottle 56. After a drying function 30 of the appliance 12 is initiated, process air 24 moves through the damp articles 16 within the drum 14 and defines moisture-laden air 32 that is moved through the lint removal system 90 and into the evaporator 34. Condensate 36 is precipitated from the moisture-laden air 32 and is collected within the drain channel 38, as described in the various aspects of the device included above.

Figure 18:
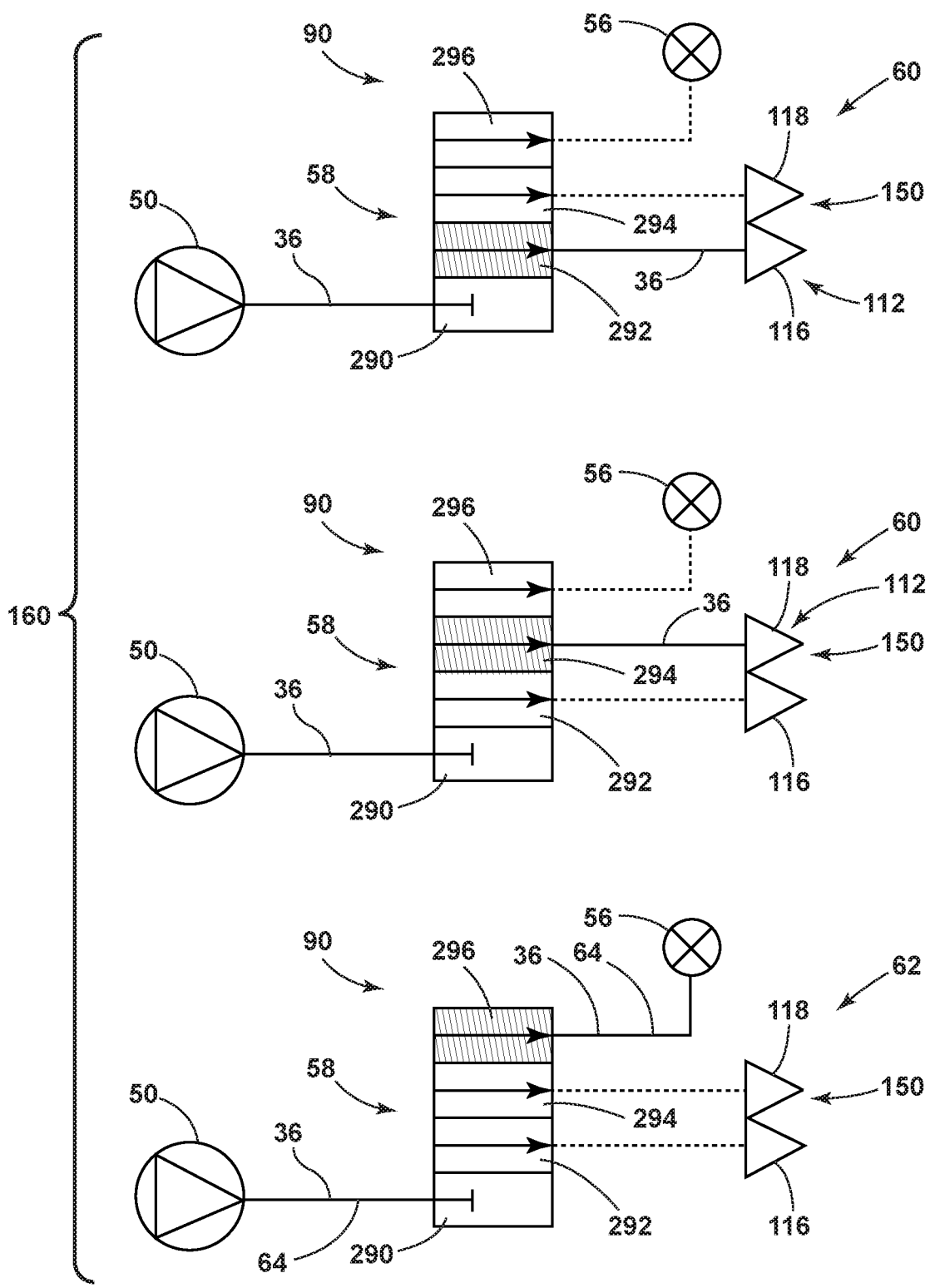
FIG. 18 is a schematic diagram illustrating operation of the pump and diverter valve for the condensate flow system and lint removal system.
Figure 19:
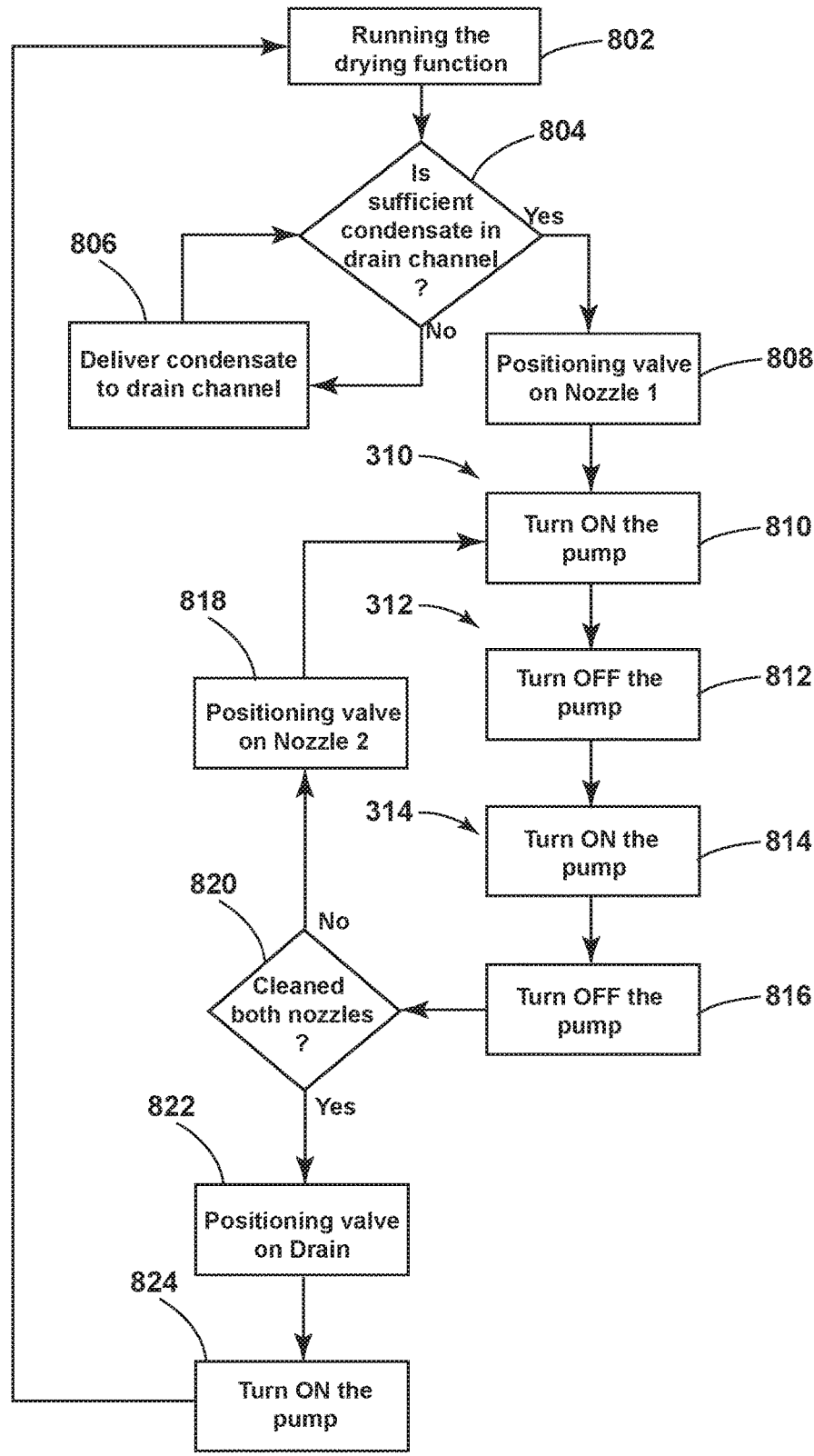
FIG. 19 is a schematic flow diagram illustrating a method for operating a spray sequence for cleaning a lint filter within a heat pump system.
Figure 20:
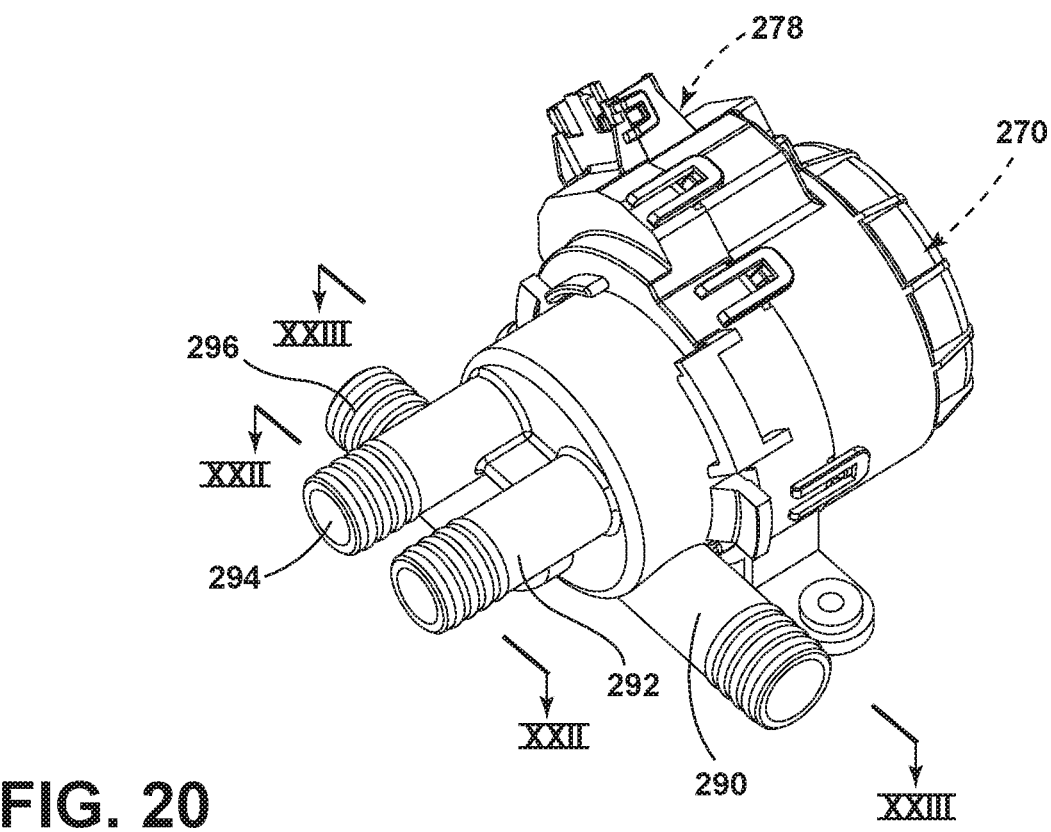
FIG. 20 is a top perspective view of an aspect of the diverter valve for use in connection with the heat pump system.
Figure 21:
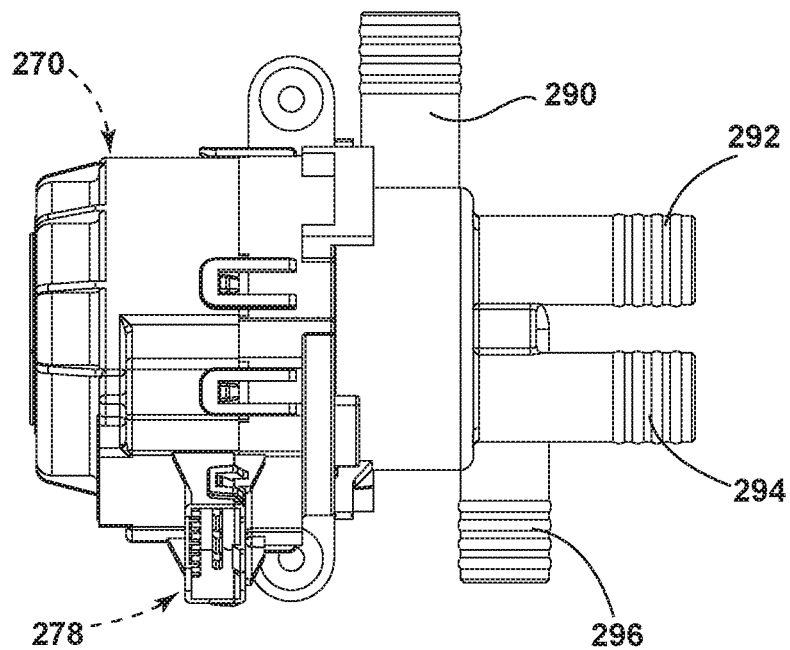
FIG. 21 is a top plan view of an aspect of the diverter valve for use in connection with the heat pump system.
Figure 22:
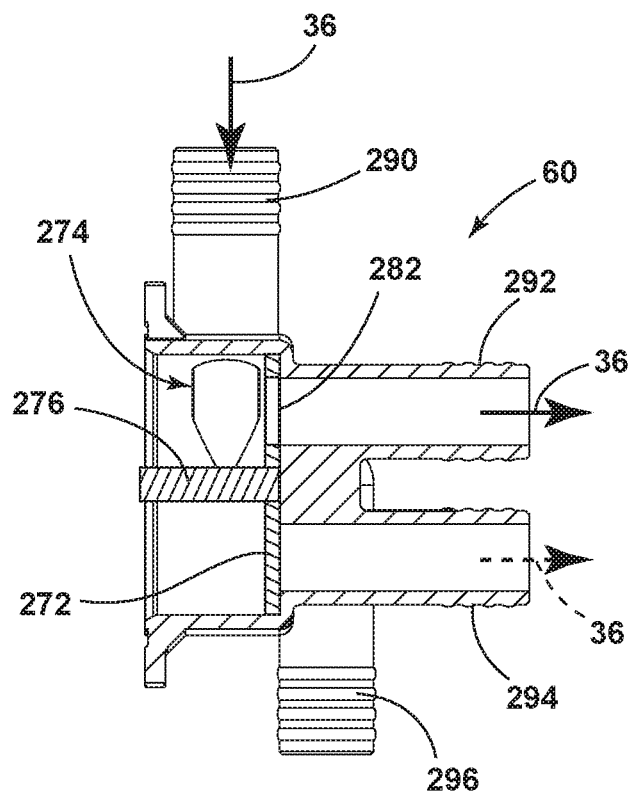
FIG. 22 is a cross-sectional view of the diverter valve of FIG. 20, taken along line XXII-XXII and showing the diverter valve in a cleaning phase.
Figure 23:
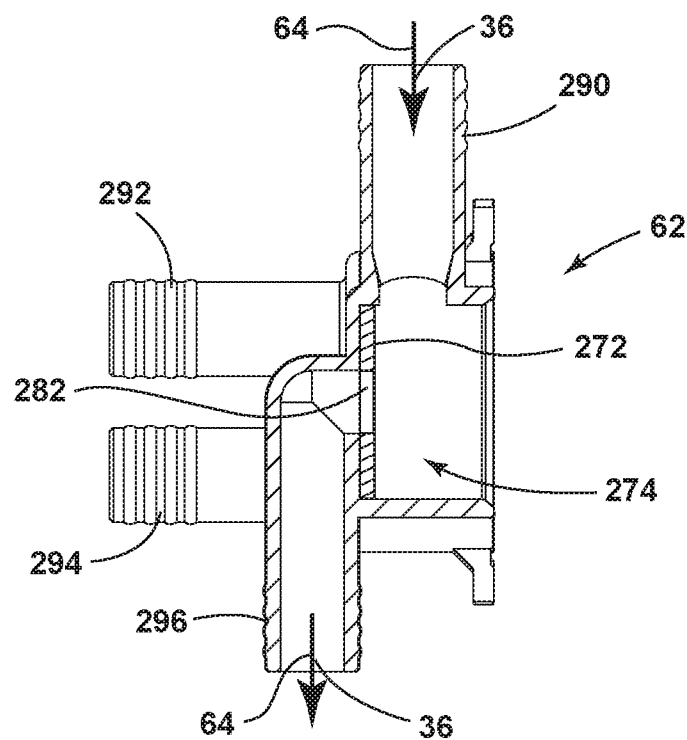
FIG. 23 is a cross-sectional view of the diverter valve of FIG. 20 taken along line XXIII-XXIII and showing the diverter valve in a drain phase.
Figure 24:
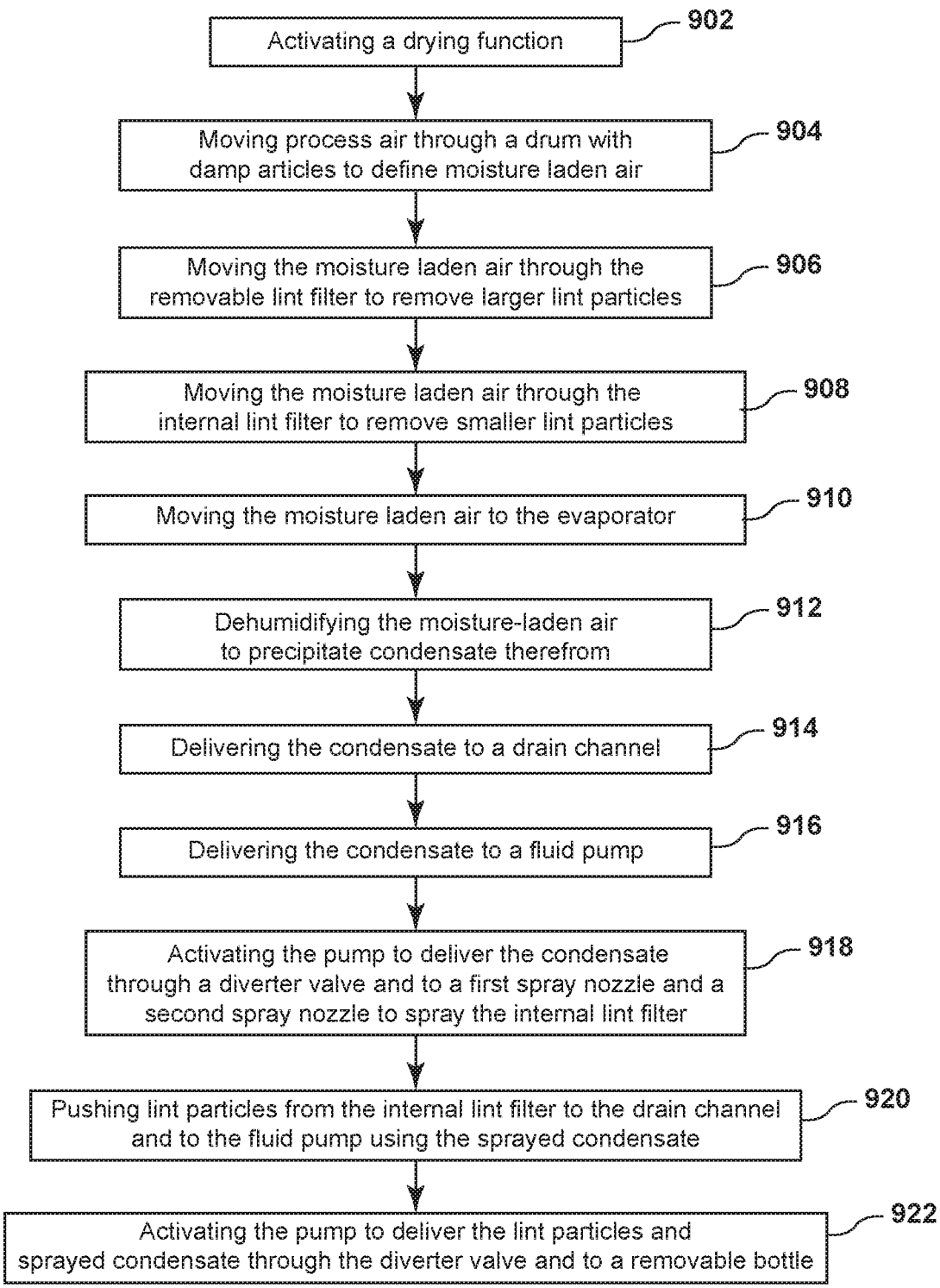
FIG. 24 is a schematic flow diagram illustrating a method for operating a lint removal system for an appliance.
Figure 25:
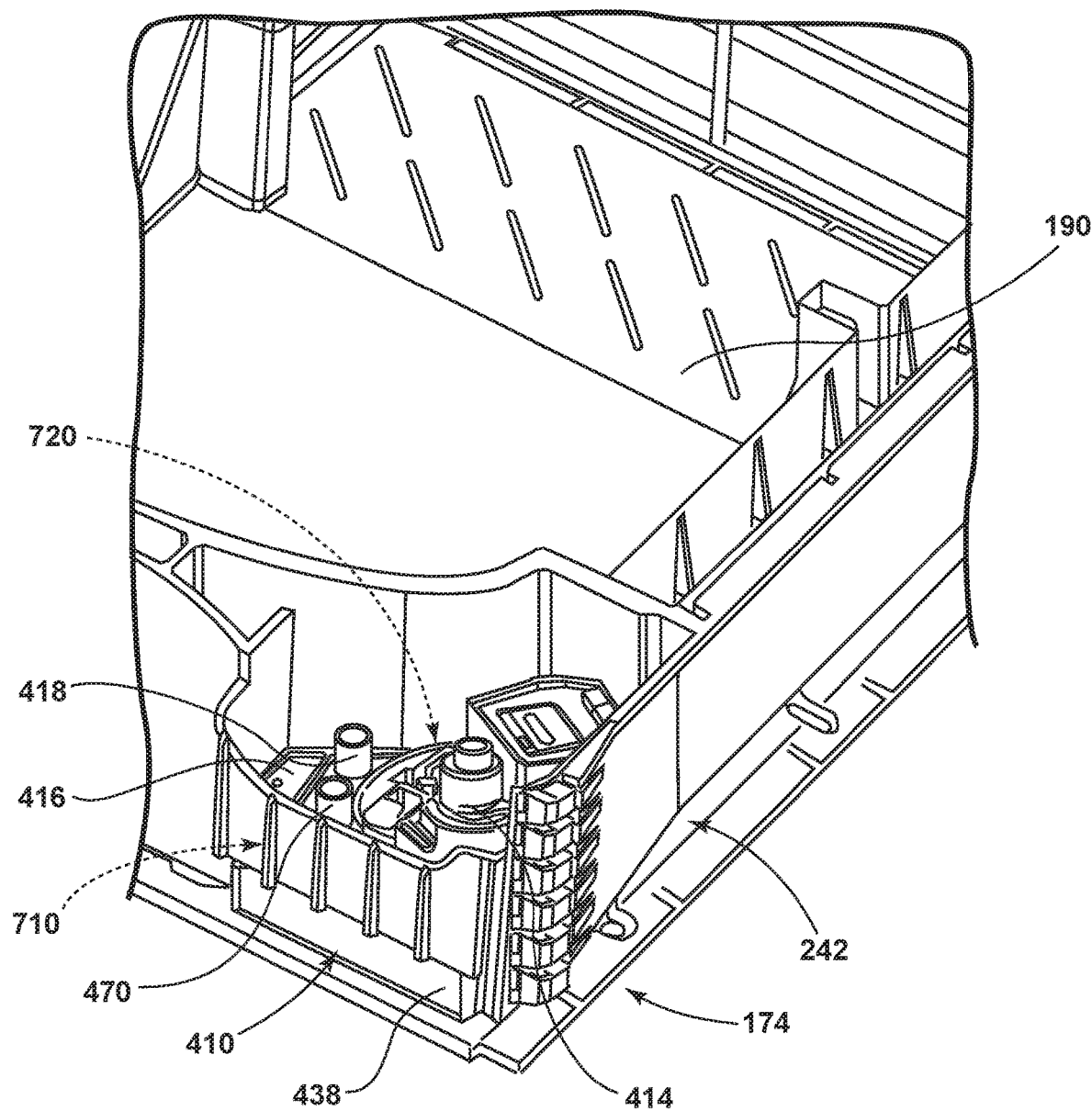
FIG. 25 is a top perspective view of a basement for a laundry appliance and showing an aspect of a sump cover for housing a sump pump of the appliance.
Figure 26:
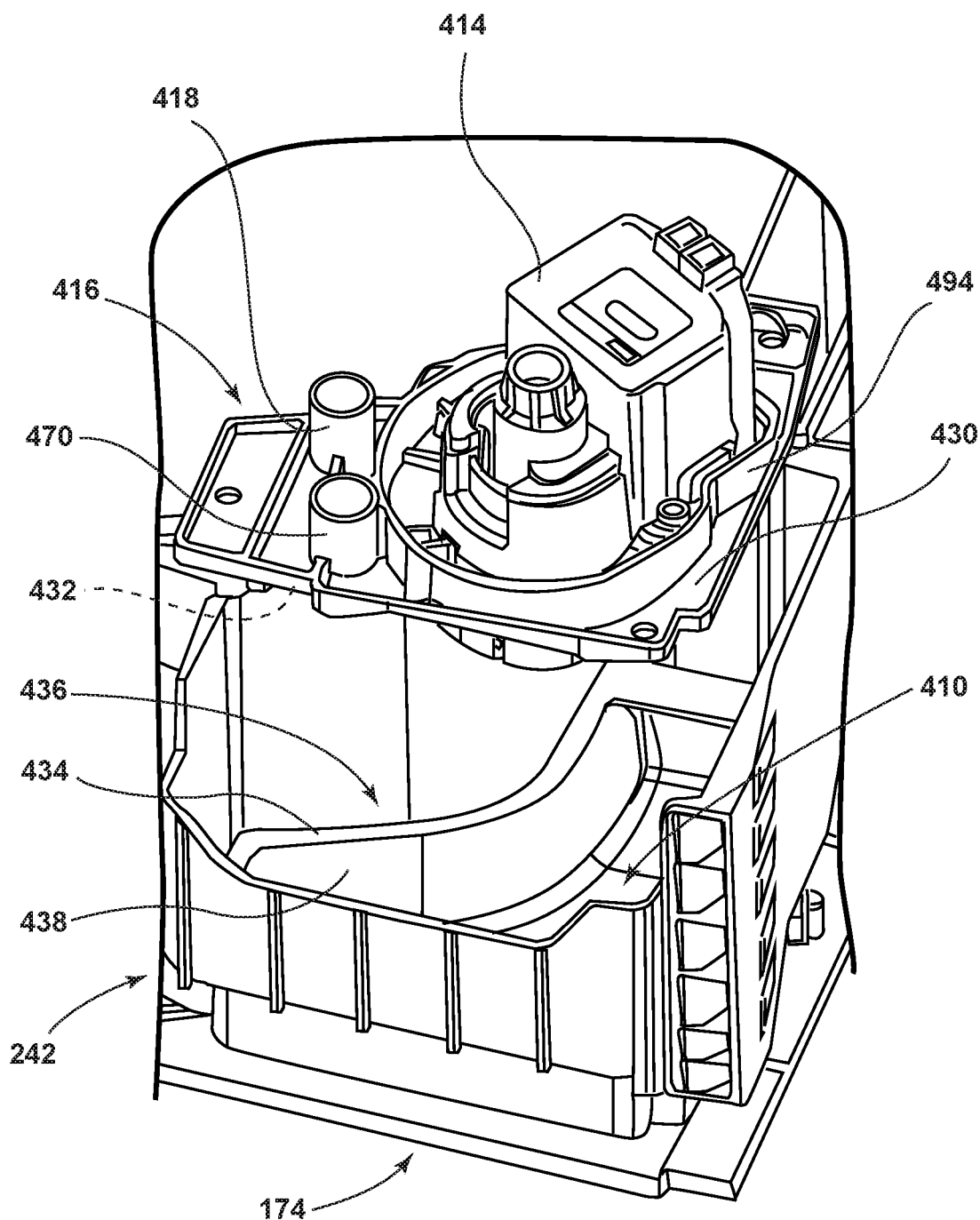
FIG. 26 is a partially exploded view of the sump cover of FIG. 25 shown removed from a sump portion of the basement for the laundry appliance.
Figure 27:
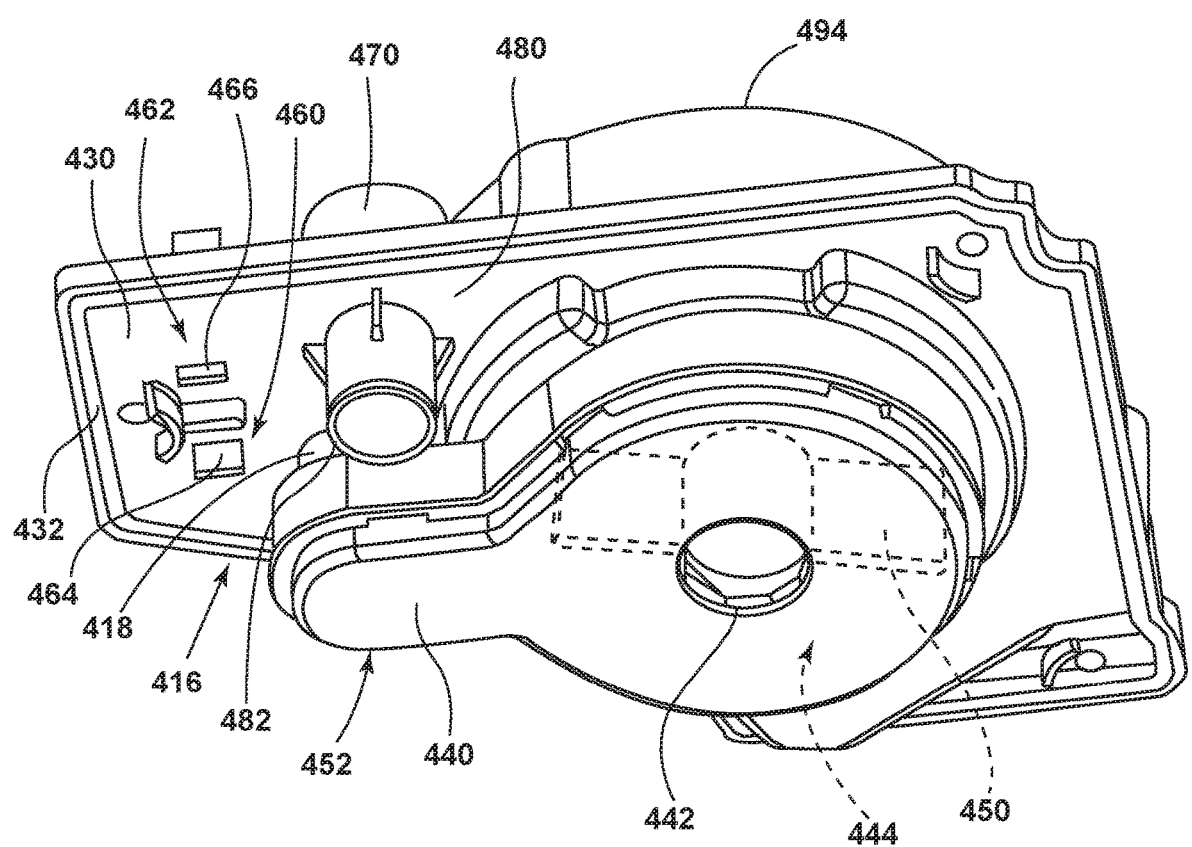
FIG. 27 is a bottom perspective view of an aspect of a sump cover that incorporates a fluid level sensor.
Figure 28:
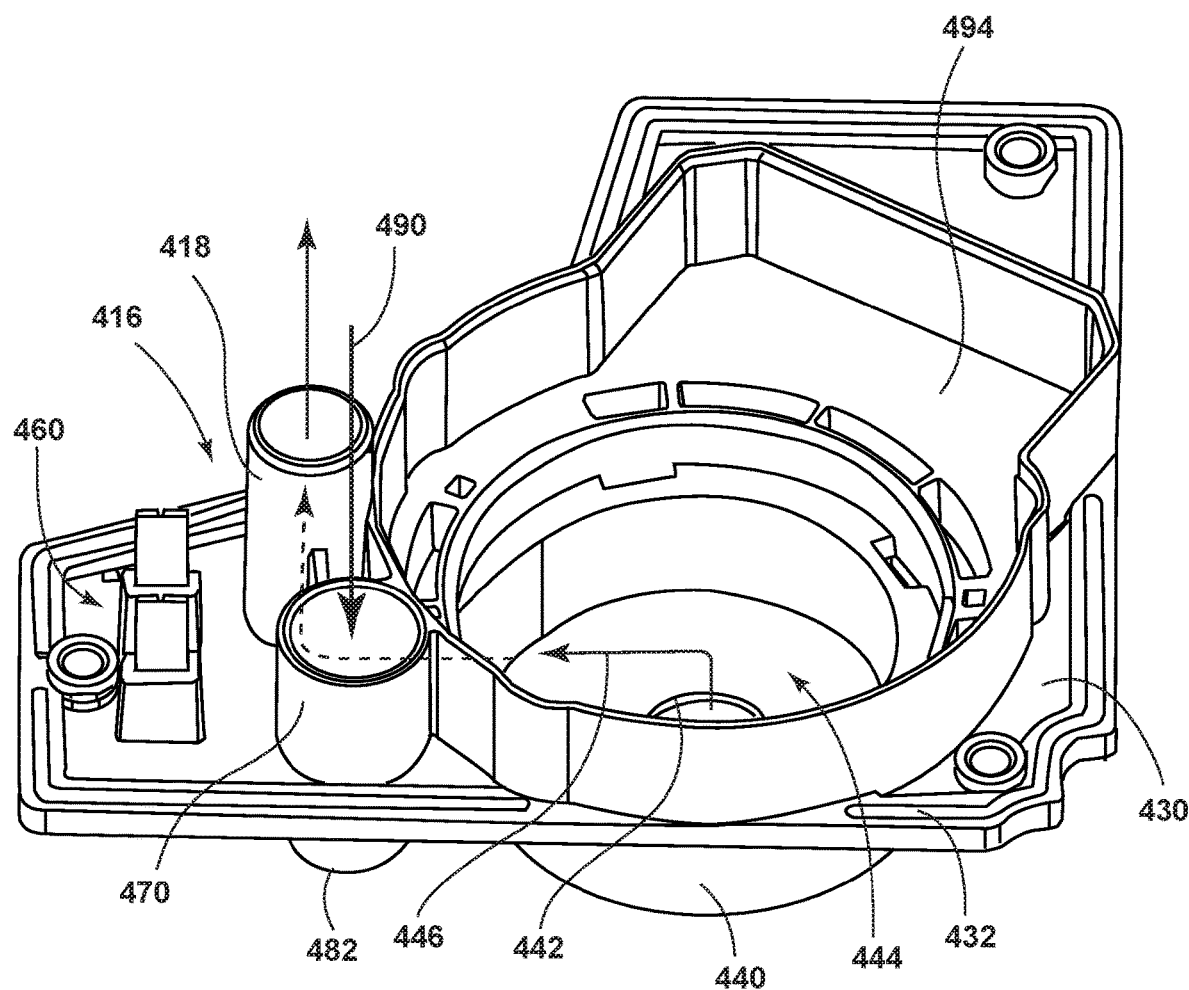
FIG. 28 is a top perspective view of the sump cover of FIG. 27.
Figure 29:
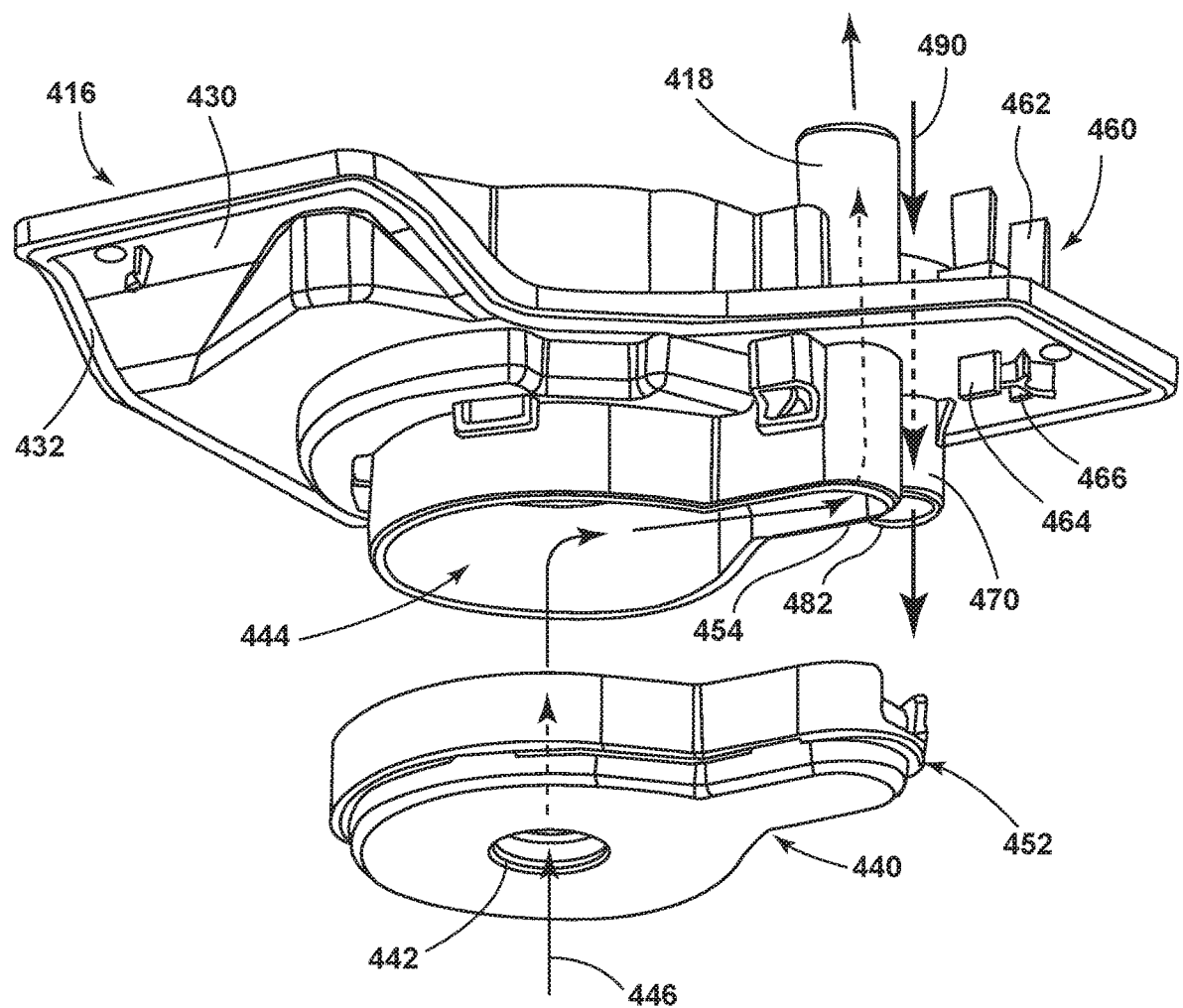
FIG. 29 is a partially exploded side perspective view of the sump cover of FIG. 27.
Figure 30:
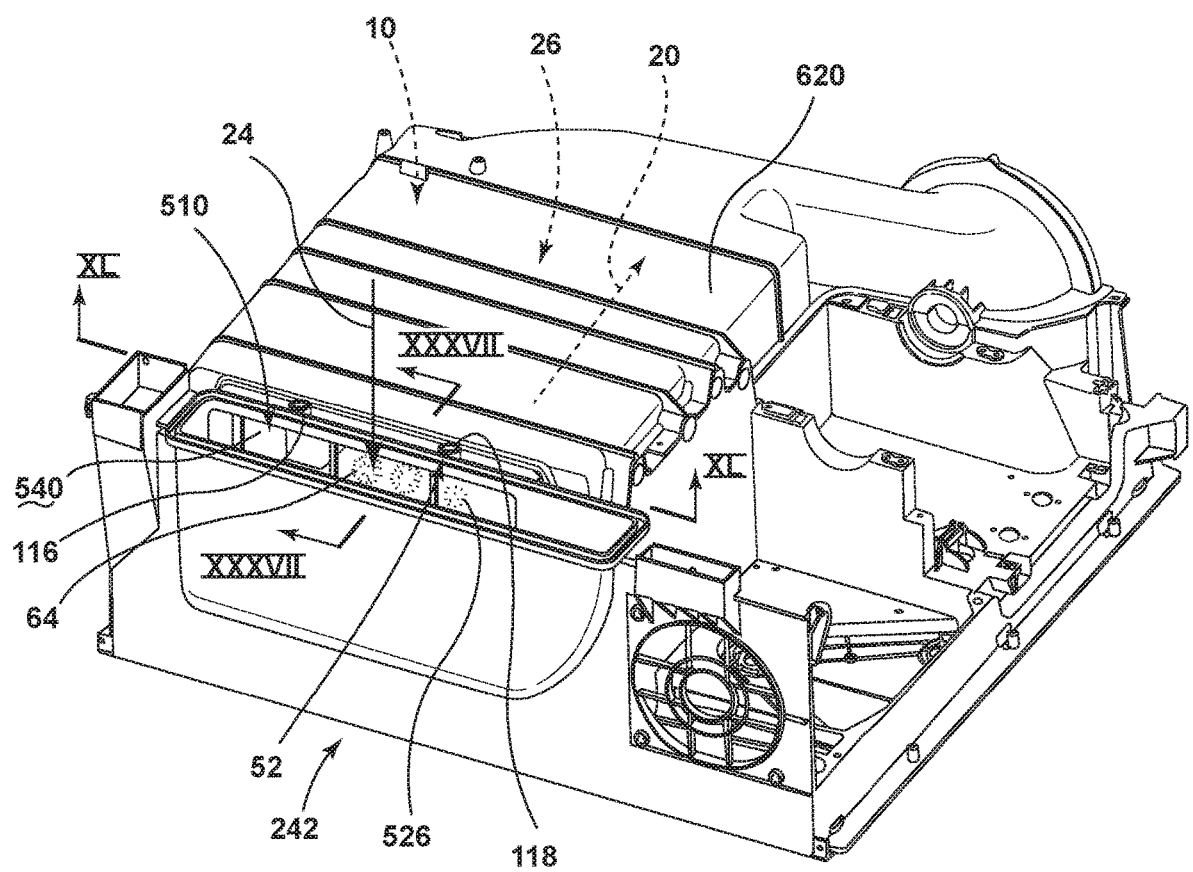
FIG. 30 is a top perspective view of a basement for a laundry appliance and showing an aspect of a lint filter positioned upstream of a heat exchanger.
Figure 31:
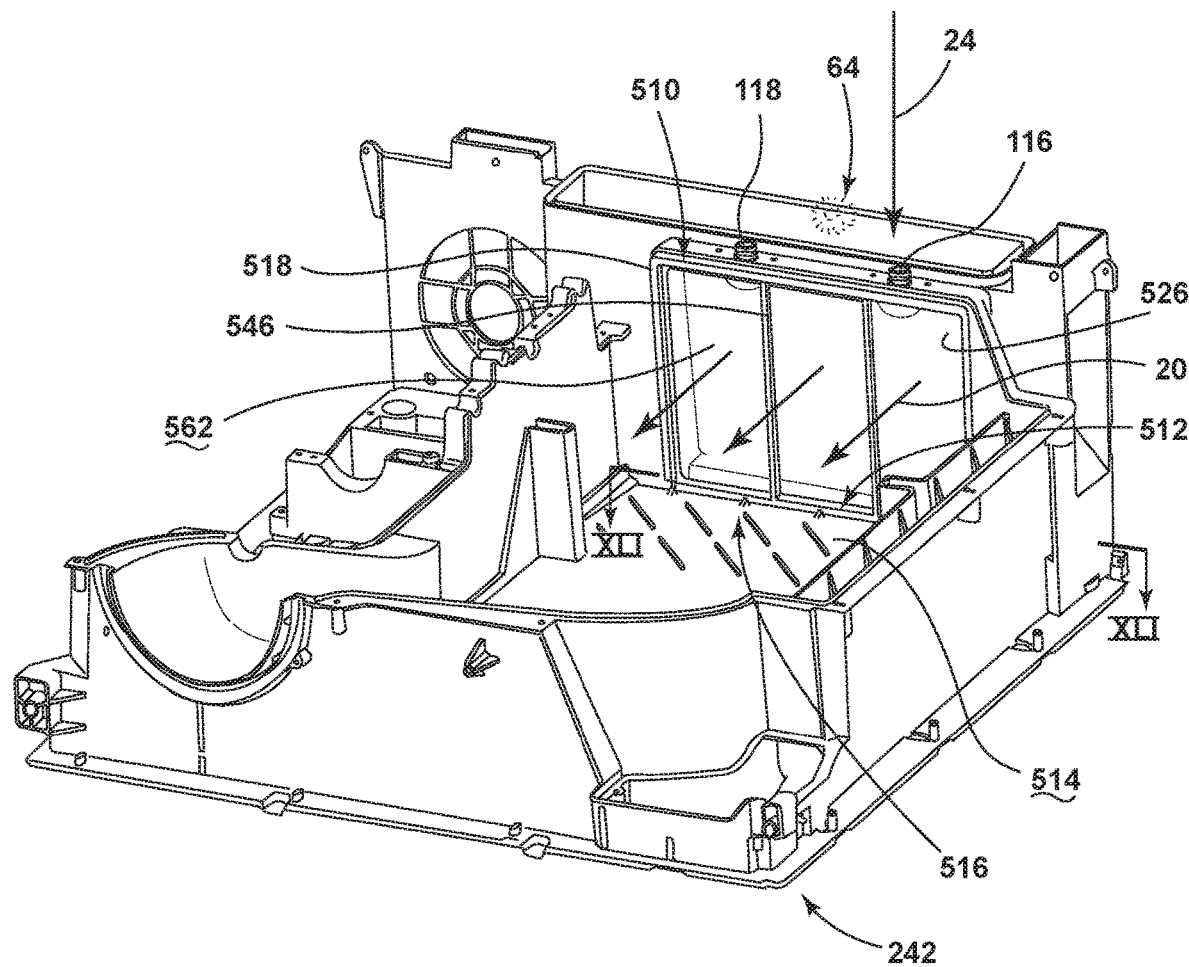
FIG. 31 is a rear perspective view of an aspect of a basement for the appliance showing the heat exchangers removed and illustrating an aspect of the lint filter.
Figure 32:
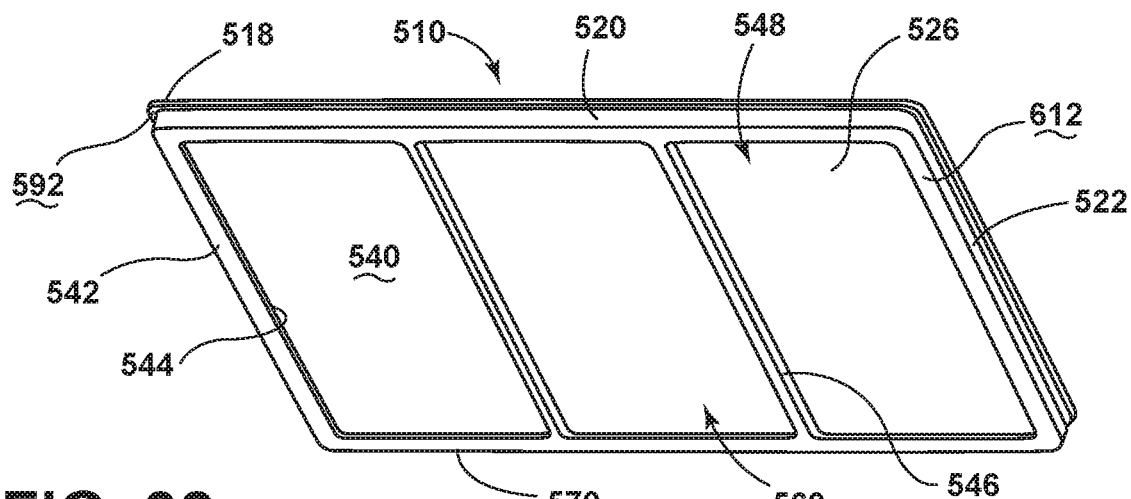
FIG. 32 is a top perspective view of an aspect of the lint filter.
Figure 33:
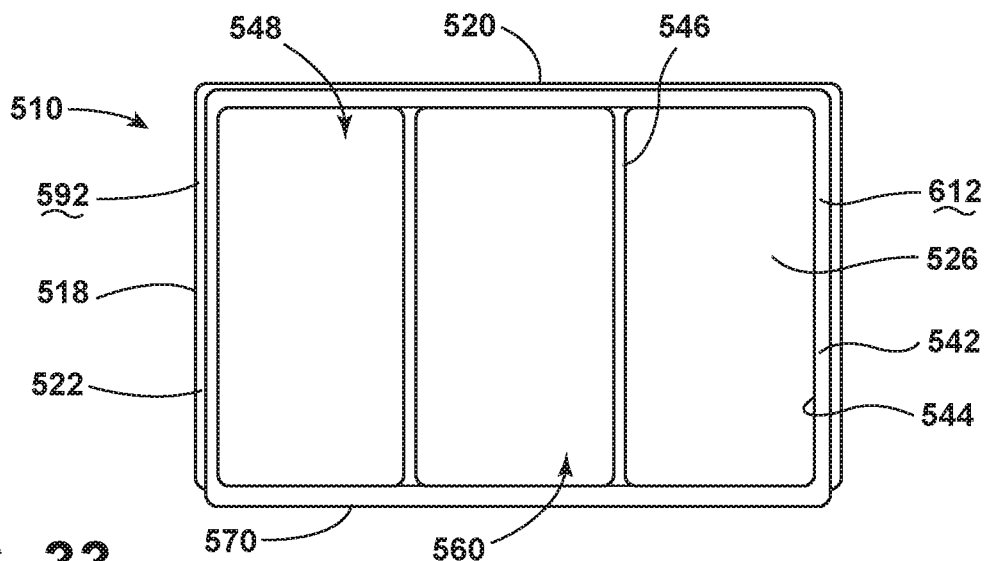
FIG. 33 is a front elevational view of the lint filter of FIG. 32.
Figure 34:
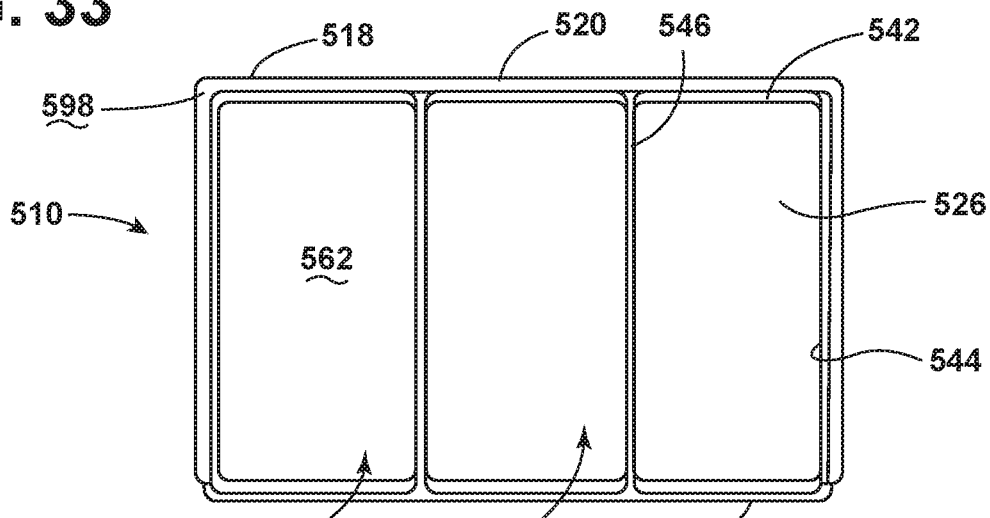
FIG. 34 is a rear elevational view of the lint filter of FIG. 32.
Figure 35:
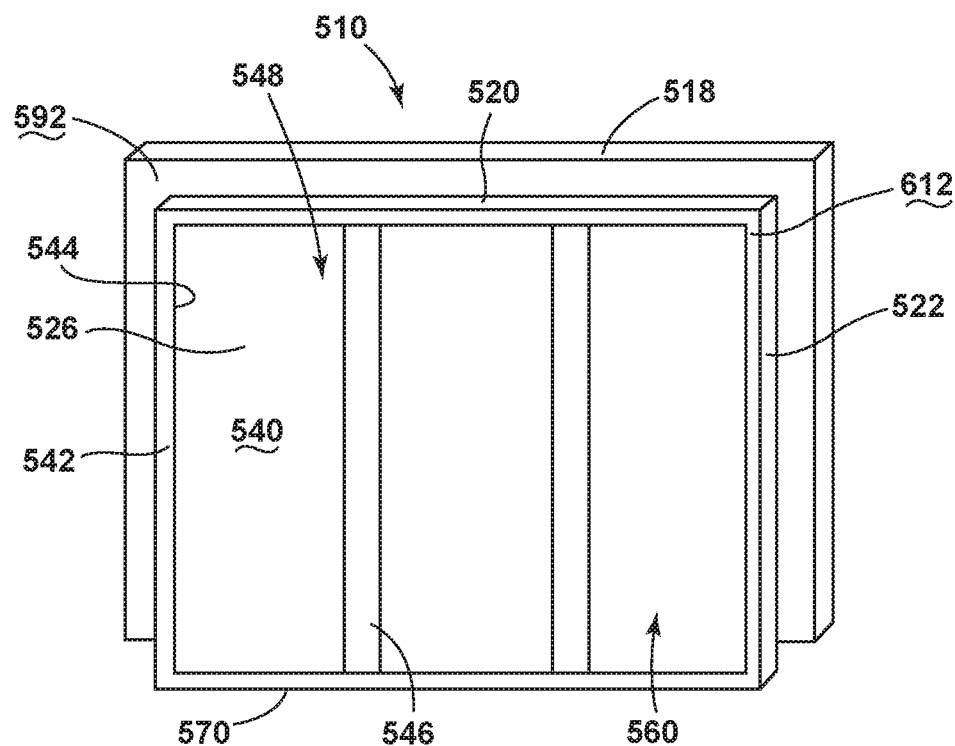
FIG. 35 is a schematic perspective view of a front side of the lint filter.
Figure 36:
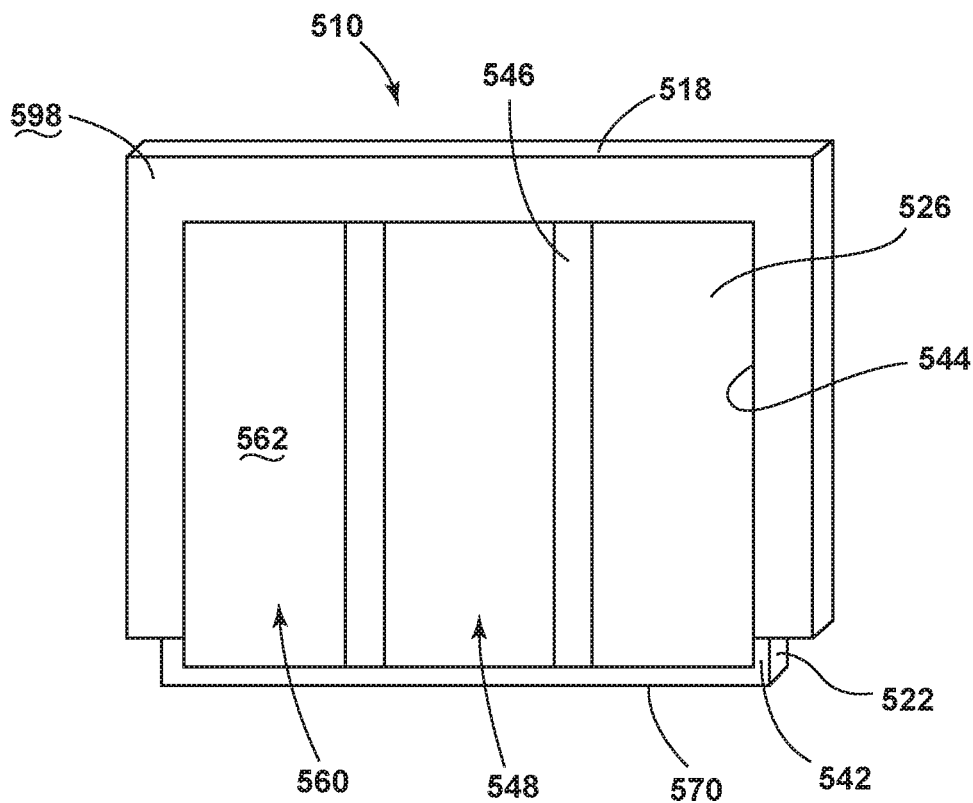
FIG. 36 is a schematic perspective view of a rear side of the lint filter of FIG. 35.

Referring now to FIGS. 18 and 19, a method 800 for operating an exemplary spray sequence 160 is disclosed. According to the method 800, a drying function 30 is performed to collect condensate 36 in the drain channel 38 and to clean lint particles 64 from the moisture-laden air 32 (step 802). Before operating one of the spray sequences 160 using the collected condensate 36 within the drain channel 38, a sensor or monitor within the drain channel 38 determines the amount of condensate 36 within the drain channel 38 (step 804). Only when a sufficient amount of condensate 36 is collected therein is the spray sequence 160 activated. Until such time as this amount of condensate 36 is collected, the heat pump system 10 continues to deliver condensate 36 to the drain channel 38 and the pump 50 will typically remain idle (step 806). Once the appropriate amount of condensate 36 is contained within the drain channel 38, the diverter valve 58 is moved to a first cleaning phase position 150 that corresponds to the first spray nozzle 52 (step 808). Typically, lint particles 64 from a previous spray sequence 160 has been moved to the water bottle 56 such that all or substantially all of the lint particles 64 from the previous spray sequence 160 has been removed and only captured condensate 36 remains within the drain channel 38.

During the cleaning phase 60, the pump 50 is activated and condensate 36 from the drain channel 38 is moved through the diverter valve 58 in the first cleaning phase position 150 and is moved through the first spray nozzle 52 (step 810). The pump 50 is activated for a predetermined time to clean the front surface 114 of a first portion 126 of the internal lint filter 54. The time period of this first active sequence 310 can vary in length of time. By way of example, and not limitation, the first active sequence 310 can be for a period of approximately 15 seconds. After completion of the first active sequence 310, a first idle sequence 312 is initiated where a pump 50 is deactivated and the flow of condensate 36 to the first nozzle 116 is substantially stopped (step 812). This idle sequence 312 can last for various lengths of time. This idle sequence 312 can allow time for the fluid sprayed during the first active sequence 310 to soak into various portions of the lint particles 64 and make the lint particles 64 heavier and easier to move during a subsequent active sequence.

After completion of the first idle sequence 312, which may last from approximately two seconds to approximately 10 seconds, and typically approximately five seconds, a second active sequence 314 is activated with respect to the first nozzle 116. Accordingly, the pump 50 is reactivated to initiate the second active sequence 314 and condensate 36 is moved from the drain channel 38, through the first nozzle 116, and onto the first portion 126 of the internal lint filter 54 (step 814). This second active sequence 314 can last for a predetermined amount of time. Such time can be in the range of from approximately five seconds to approximately 20 seconds. Typically, the time period of the second active sequence 314 will be substantially similar to that of the time period for the first active sequence 310. After the second active sequence 314 is complete, the pump 50 is deactivated and the flow of the condensate 36 to the first spray nozzle 52 is substantially stopped (step 816).

Through this sequence of the first active sequence 310, idle sequence 312 and second active sequence 314, substantially all of the lint particles 64 captured on the front surface 114 of the internal lint filter 54 are typically removed and pushed toward or into the drain channel 38. The pump 50 remains deactivated for a certain amount of time to allow for trapped condensate 120 that may be entrapped within the first portion 126 of the internal lint filter 54 to become dislodged, evaporate, or otherwise be removed from the filter material of the first portion 126 of the internal lint filter 54.

Referring again to FIGS. 18-23, after the cleaning phase 60 is complete with respect to the first portion 126 of the internal lint filter 54, the diverter valve 58 operates to move the disk 272 to the second cleaning phase position 150 that corresponds to the second spray nozzle 52 (step 818). Once in this position, the pump 50 is again activated to define the first active sequence 310 to move condensate 36 through the diverter valve 58 and into the second spray nozzle 52 for cleaning the second portion 128 of the internal lint filter 54 (step 810). After the first active sequence 310 is complete with respect to the second portion 128 of the internal lint filter 54, the idle sequence 312 is initiated and the pump 50 is deactivated (step 812). After the predetermined time is complete, the pump 50 is reactivated to initiate the second active sequence 314 to complete the cleaning of the second portion 128 of the internal lint filter 54 by moving condensate 36 through the second spray nozzle 52 (step 814). After the spray sequence 160 is complete with respect to the second portion 128 of the internal lint filter 54 (step 820), the diverter valve 58 is then moved to the drain phase 62 position (step 822). As discussed above, in this position, lint particles 64 and sprayed condensate 142 are contained within the drain channel 38 and are moved via the fluid pump 50 through the diverter valve 58 in the position corresponding to the drain phase 62 and up to the removable bottle 56 typically positioned at a top portion 436 of the appliance 12 (step 824). In the drain phase 62, the pump 50 may be activated through various active phases and intermittent idle phases to move the lint particles 64 and sprayed condensate 142 into position for being removed from the drain channel 38 by the fluid pump 50. Typically, the drain phase 62 may be a single operation of the pump 50 for a predetermined period of time. This period of time may be within a range of from approximately 20 seconds to approximately 60 seconds and typically will last approximately 30 seconds.

The exemplary spray sequence 160 identified above in method 800 can be modified based upon the particular drying function 30 being performed by the laundry appliance 12. By way of example, and not limitation, a towel drying function may collect more lint particles 64 than a delicates drying function. Accordingly, the time periods for the spray sequence 160 may be adjusted based upon a particular drying function 30 being performed. Additionally, where greater amounts of lint particles 64 may be captured within the internal lint filter 54, a spray sequence 160 corresponding to the first and second nozzles 116, 118 and the bottle 56 may include additional active sequences that are separated by additional idle sequences 312 such that three or more active sequences may be separated by corresponding idle sequences 312. Various lint monitors can also be included proximate the internal lint filter 54 to monitor whether lint particles 64 have been fully removed from the front surface 114 of the internal lint filter 54 or from the drain channel 38. Where a greater amount of lint particles 64 may require additional active sequences, the lint monitor may recognize that lint particles 64 remain on a portion of the internal lint filter 54 and may automatically override a predetermined sequence to reinitiate an additional active sequence to spray a surface of the internal lint filter 54 an additional time. Such monitors can include, but are not limited to, airflow monitors, visual monitors, weight sensors, lasers, sensors that monitor an efficiency level of a compressor for the heat pump system 10, combinations thereof, and other similar sensors that may be used to monitor an amount of lint particles 64 entrapped in a surface of the internal lint filter 54.

As exemplified in FIGS. 9-11 and 14-17, the internal lint filter 54 can include first and second spray nozzles 116, 118 that are adapted to spray condensate 36 onto respective first and second portions 126, 128 of the internal lint filter 54. Each spray nozzle 52 can include a centrally positioned fluid inlet 320 that is defined within an attachment surface 322 of the spray nozzle 52. Within the fluid inlet 320, a substantially planar surface 324 extends through the fluid inlet 320 and empties into a wide and multi-faceted deflecting surface 326 that includes two diverging lateral faces 328. These diverging lateral faces 328 are connected by an expanding curved fluid deflecting face 330. The fluid deflecting face 330 and the planar surface 324 define a substantially continuous and laminar flow path 332 through the spray nozzle 52. The deflecting face 330 is positioned at an angle with respect to the fluid inlet 320 of the spray nozzle 52 to produce a generally flat fluid spray 112 that can be directed toward a surface of the internal lint filter 54. The internal lint filter 54 can include additional portions other than the first and second portions 126, 128 such that the internal lint filter 54 may be divided into three or more sections. These sections can be defined by interior frame members of the internal lint filter 54 that add structural rigidity to the internal lint filter 54 and resist deflection due to the flow of process air 24 and fluid spray 112 during operation of the appliance 12. These various divided portions of the internal lint filter 54 can be sprayed by dedicated spray nozzles 52 wherein each divided portion of the internal lint filter 54 is served by a dedicated spray nozzle 52. The various divided portions may also be served by the first and second nozzles 116, 118. In such an embodiment, the frame members may be located at the back surface 140 of the internal lint filter 54. In this manner, these frame members may be positioned to be free of interference with the operation of the fluid spray 112 projecting from the first and second nozzles 116, 118 onto the two or more divided portions of the internal lint filter 54.

The fluid deflecting face 330 and the diverging lateral faces 328 are adapted to produce a flat and laminar spray that is positioned at an angle with respect to the internal lint filter 54. This angle can be various angles from parallel with the internal lint filter 54 or can be angled with respect to the internal lint filter 54. One such angle can be approximately 150° from horizontal or approximately 60° into the surface of the internal lint filter 54. As discussed above, the spray nozzles 52 can be directed to spray fluid through the laminar flow path 332 and onto a front or back surface 114, 140 of the rear filter. In certain aspects of the device, both the front and back surfaces 114, 140 of the internal lint filter 54 may be sprayed. The path of the fluid being sprayed from the first and second nozzles 116, 118 can take various shapes. These shapes can include, but are not limited to, fan-shaped, conical, arcuate, combinations thereof, and other shapes that are adapted to push the lint particles 64 off from the front surface 114 of the internal lint filter 54 toward the drain channel 38.

The first and second nozzles 116, 118 can include the fluid inlet 320 that extends from an attachment surface 322 of each spray nozzle 52. The attachment surface 322 of the spray nozzle 52 can include a concentric sealing geometry 340 that extends outward from the inlet 290. This concentric sealing geometry 340 is integral with the attachment surface 322 and provides a self-sealing attachment. Accordingly, no separate sealing member is typically disposed between the inlet 290 of each spray nozzle 52 and the sidewall 196 to which it is attached or at the tube 342 through which the condensate 36 is delivered to the first and second nozzles 116, 118. Each spray nozzle 52 can be attached to a sidewall 196 of the airflow path 20 such that the first and second spray nozzles 116, 118 can be in a fixed position relative to the internal lint filter 54. Threaded receptacles 344 that are integral with the first and second nozzles 116, 118 can receive fasteners for attaching the attachment surface 322 of each spray nozzle 52 to an interior surface 346 of the sidewall 196 airflow path 20.

Referring again to FIGS. 14-17, the fluid inlet 320 can be defined by a substantially consistent opening 76 that extends through the inlet 290 and to the deflecting surface 326. At least one narrowed portion 350 of the inlet 290 can be included. This narrowed portion 350 serves to at least partially increase the pressure of the condensate 36 being projected from the first and second spray nozzles 52. This narrowed portion 350 can be a rib 352 that extends around a portion of the fluid inlet 320. The narrowed portion 350 can also be a generally conical shape of fluid inlet 320 that gradually narrows toward the deflecting surface 326 for gradually increasing the pressure of the condensate 36 being moved through the first and second spray nozzles 52. Where a narrowed portion 350 is included, the planar surface 324 extending through the inlet 290 is typically not interrupted by the narrowed portion 350. Accordingly, the planar surface 324 can extend through the narrowed portion 350 to maintain the laminar flow path 332 through the entire fluid inlet 320 and toward the fluid deflecting face 330.

Referring now to FIGS. 1-24, having described various aspects of the fluid spray system 110 and the lint removal system 90, a method 900 is disclosed for operating the laundry appliance 12 having the fluid spray system 110 and the lint removal system 90. According to the method 900, a drying function 30 is activated (step 902). During performance of the drying function 30, damp or wet articles 16 contained within the drum 14 are dried by passing process air 24 through the drum 14. This process air 24 captures moisture from the damp articles 16. This moisture defines moisture-laden air 32 that is then moved toward the lint removal system 90 (step 904). The moisture-laden air 32 is then moved through a first removable lint filter 72 (step 906). Within the removable lint filter 72, larger lint particles 64 are typically captured. Additionally, the largest amount of lint particles 64 are typically captured within the removable lint filter 72 that is positioned at the opening 76 for the door 74 of the laundry appliance 12. The moisture-laden air 32 is then moved further down the airflow path 20 toward the internal lint filter 54. The moisture-laden air 32 is then moved through the internal lint filter 54 to remove additional lint particles 64 (step 908). After passing through the internal lint filter 54, very little, if any, lint particles 64 remain within the moisture-laden air 32. These lint particles 64 are entrapped within the removable lint filter 72 and the internal lint filter 54.

According to the method 900, the moisture-laden air 32 is then moved through the evaporator 34 of the heat pump system 10 (step 910). The evaporator 34 reduces the temperature of the moisture-laden air 32 to dehumidify and precipitate condensate 36 from the moisture-laden air 32 (step 912). This condensate 36 then falls onto a base 202 of the heat exchange plate 190 and is moved through the baffles 212 of the sloped portion toward the drain channel 38 (step 914). This condensate 36 is then captured within the drain channel 38 and is moved down the slope of the angled bottom 170 of the drain channel 38 toward the fluid pump 50 (step 916). Once a sufficient amount of condensate 36 is contained within the drain channel 38, the fluid spray system 110 is ready to initiate a spray sequence 160 for cleaning the internal lint filter 54 at the predetermined time. This predetermined time for initiating the spray sequence 160 can be at any one of various occurrences. Such occurrences can include, but are not limited to, the ending of a drying function 30, a certain time into a particular drying function 30, a time at which a sensor monitoring the internal lint filter 54 senses that an appropriate amount of lint particles 64 are entrapped within the internal lint filter 54, a reduced efficiency of a component of the heat pump system 10, such as a reduced efficiency of the compressor serving the evaporator 34 and condenser 40, a reduced amount of heat exchange within the heat pump system 10, combinations thereof, and other similar occurrences.

Referring again to FIGS. 1-24, at the appropriate time, the fluid pump 50 is activated and the diverter valve 58 is moved to a cleaning position. The fluid pump 50 then delivers the condensate 36 from the drain channel 38 through the diverter valve 58 and to, sequentially, the first and second spray nozzles 52 (step 918). Through the spray sequence 160, condensate 36 is sprayed through the first and second spray nozzles 52 onto the first and second portions 126, 128 of the internal lint filter 54, respectively, to push the lint particles 64 from the surface of the internal lint filter 54 into the drain channel 38 (step 920). As discussed above, activation of the first and second nozzles 116, 118 can push the lint particles 64 off the front surface 114 of the internal lint filter 54 and can also assist in pushing the lint particles 64 down the slope of the angled bottom 170 of the drain channel 38 toward the fluid pump 50. After completion of the cleaning phase 60 of the spray sequence 160, the diverter valve 58 is then moved to a drain phase 62 and the fluid pump 50 is again activated to move the lint particles 64 and sprayed condensate 142 from the drain channel 38, through the diverter valve 58 in the drain phase 62 and up to the removable water bottle 56 (step 922).

Referring now to FIGS. 1, 2, 5-11 and 25-29, within a rear portion 174 of the basement 242, a sump 410 is positioned downstream of the drain channel 38. This sump 410 is adapted to receive condensate 36 from the heat exchangers 26. The sump 410 is also configured to receive the fluid spray 112 and lint particles 64 from the spray nozzles 52 in the form of a fluid and lint mixture 412. This condensate 36 and the fluid and lint mixture 412 is then distributed from the sump 410 to various portions of the appliance 12. A sump pump 414 is disposed within a sump cover 416 that at least partially seals the sump 410 so that condensate 36 and the fluid and lint mixture 412 can be pumped through a fluid outlet 418 of the sump cover 416 into a separate location of the appliance 12. This sump cover 416 includes a plate member 430 having a perimeter seal 432 that engages a cover seat 434 disposed at a top portion 436 of the perimeter walls 438 of the sump 410. At this location, the engagement of the sump cover 416 and the cover seat 434 seals the sump 410 to allow for efficient operation of the sump pump 414. The sump cover 416 also includes a cup 440 that connects with the plate member 430 and includes an enlarged pump inlet 442 for accommodating passage of the fluid and lint mixture 412 without clogging the sump pump 414. The cup 440 forms a pump flow path 446 from the pump inlet 442, through an impeller chamber 444 of the cup 440 and to the fluid outlet 418.

Referring again to FIGS. 27-29, the sump pump 414 including the impeller 450 sits within the cup 440 such that the impeller 450 of the sump pump 414 rotates within the impeller chamber 444 of the cup 440. Through operation of the impeller 450, condensate 36 and the fluid and lint mixture 412 can be moved from the sump 410 upward into the pump inlet 442 positioned at a bottom of the cup 440 and through a fluid outlet 418 defined within the sump cover 416. The cup 440 has a generally circular shape that allows for rotational operation of the impeller 450 to provide for movement of the condensate 36 and the fluid and lint mixture 412 through the fluid outlet 418 of the sump cover 416.

As exemplified in FIGS. 18-29, operation of the impeller 450 within the cup 440 of the sump cover 416 can deliver the condensate 36 and the fluid and lint mixture 412 to and through the diverter valve 58 for delivery to various portions of the appliance 12. The diverter valve 58 can be operated to move at least condensate 36 as well as the fluid and lint mixture 412 up to the removable bottle 56 positioned within an upper area of the appliance 12. As discussed previously, the sump pump 414 can also be operated within the sump cover 416 to move condensate 36 to various spray locations such as spray nozzles 52 (shown in FIGS. 2 and 3) for cleaning lint particles 64 from air filters 70 disposed within the appliance 12 and also for cleaning other portions of the appliance 12, such as heat exchangers 26 and the like.

Referring again to FIGS. 25-29, in operation, the sump cover 416 includes a fluid level sensor 460 that is typically integrated within the plate member 430 of the sump cover 416. In at least one aspect of the device, the fluid level sensor 460 can include a pair of sensor contacts 462 that are installed within the plate member 430 of the sump cover 416. The fluid level sensor 460 delivers a signal when the level of the condensate 36 and/or fluid and lint mixture 412 within the sump 410 reaches at least one of the sensor contacts 462. The sensor contacts 462 then deliver a signal to activate and potentially deactivate the sump pump 414. These sensor contacts 462 can project downward into the sump 410 at different elevations. A lower contact 464 can be used to activate the sump pump 414 when the condensate 36 and the fluid and lint mixture 412 come into contact with this lower contact 464. An upper contact 466 can be used as a shut-off contact when the removable bottle 56 needs to be emptied, as will be more fully described below. When activated, the sump pump 414 operates the impeller 450 to move material within the sump 410 to the diverter valve 58 and onto various portions of an appliance 12.

The sensor contacts 462 can be injection molded within a portion of the sump cover 416. The sensor contacts 462 can also be attached as separate members to a portion of the sump cover 416 for operation of the fluid level sensor 460. While a pair of metal plates or metal contacts are shown as the sensor contacts 462, additional fluid sensing mechanisms can be incorporated within the sump cover 416 for detecting the amount of material within the sump 410 and activating and deactivating the sump pump 414 at the appropriate time to remove material from the sump 410.

As exemplified in FIGS. 5-8 and 25-29, the sump cover 416 can also include an overflow port 470 that receives an overflow conduit 472 that extends from the removable bottle 56 to the sump cover 416. During operation of the appliance 12, the removable bottle 56 will fill with material that includes condensate 36 and the fluid and lint mixture 412. It is necessary to remove this material periodically. If this material is not removed on a regular basis, the material will tend to overflow out of the removable bottle 56. To prevent this overflow, the overflow conduit 472 is attached to a portion of a removable bottle 56 and extends down to the overflow port 470 defined within the sump cover 416. During operation of the appliance 12, as the removable bottle 56 reaches its full capacity of material, the overflow conduit 472 will direct this overflow of material back down to the sump 410 via the overflow port 470 of the sump cover 416.

In certain conditions, where the removable bottle 56 remains at capacity and the appliance 12 continues to be operated, ultimately, the sump pump 414 may direct a sufficient amount of condensate 36 and the fluid and lint mixture 412 to fill both the removable bottle 56 and the sump 410. In this condition, both of the sensor contacts 462 of the fluid level sensor 460 will be in contact with material in the sump 410. At this point, portions of the appliance 12, or the entire appliance 12, can be deactivated until such time as the removable bottle 56 is removed from the appliance 12 and the material included therein is emptied. In various operating conditions, the entire appliance 12 can be shut down when both the removable bottle 56 and the sump 410 are filled to capacity with material. The appliance 12 may also be operated in a condition where the heat pump system 10 is deactivated so that no condensate 36 is added to the drain channel 38 or to the sump 410.

During operation of the appliance 12, the appliance 12 may also shut down when the sump pump 414 runs continuously and substantially uninterrupted for a certain amount of time. This condition will be activated where the sump 410 is at or near its maximum capacity and a removable bottle 56 is filled to a level where material is continually being moved to the overflow conduit 472 and returned to the sump 410 via the overflow port 470. This condition forms a feedback loop that may result in the deactivation of the appliance 12 until such time as the removable bottle 56 is emptied of the material contained therein. Again, this material typically includes condensate 36 and/or the fluid and lint mixture 412.

Referring again to FIGS. 25-29, the sump cover 416 can include a perimeter seal 432 that directly engages the perimeter walls 438 of the sump 410. This perimeter seal 432 defines a sealed engagement, such that suction 260 generated by the sump pump 414 can be efficiently moved through the pump inlet 442 rather than suction 260 being lost at the perimeter walls 438 of the sump 410. Additionally, the cup 440 of the sump cover 416 can define a sealing engagement between the sump pump 414 and the sump cover 416. Accordingly, operation of the impeller 450 of the sump pump 414 can generate sufficient suction 260 for moving condensate 36 as well as the fluid and lint mixture 412 from the sump 410 and to the diverter valve 58 to be delivered to various portions of the appliance 12.

Referring again to FIGS. 4-6 and 27-29, the overflow port 470 can be positioned through a bottom portion 480 of a plate member 430 from the sump cover 416. In this manner, the bottom edge 482 of the overflow port 470 is positioned below the lower contact 464 of the water level sensor. Accordingly, the bottom edge 482 of the overflow port 470 will typically be positioned below the level of material within the sump 410 when the sump 410 is activated. In this manner, when the level of the condensate 36 and/or the fluid and lint mixture 412 reaches the lower contact 464 of the fluid level sensor 460, the sump pump 414 is activated and the bottom edge 482 of the overflow port 470 is positioned below the level of this material. Accordingly, when suction 260 is generated by the sump pump 414, the suction 260 can direct the material through the pump inlet 442 at the bottom portion 480 of the cup 440 of the sump cover 416. Through this configuration, the suction 260 is not lost through the overflow port 470. Accordingly, the bottom edge 482 of the overflow port 470 is typically positioned below the water level during operation of the sump pump 414 so that air cannot pass into the overflow port 470 to create a condition where suction 260 from the sump pump 414 is lost and the system is made less efficient.

Typically, as exemplified in FIGS. 5-8 and 25-29, the overflow conduit 472 from the removable bottle 56 that extends to the overflow port 470 of the sump cover 416 is a direct run of conduit that does not pass through any check valve or other similar diverting mechanism. In this manner, overflow material 490 from the removable bottle 56 can be fed by gravity through the overflow conduit 472 and into the sump 410 via the overflow port 470. Typically, the overflow inlet 492 for the overflow conduit 472 is positioned in engagement with the removable bottle 56 at a higher location of the removable bottle 56. Through this configuration, solid material such as lint particles 64 can settle to the bottom of the removable bottle 56 so that primarily fluid is moved through the overflow conduit 472. By moving primarily fluid through the overflow conduit 472, clogging as a result of lint particles 64 can be minimized so that the overflow conduit 472 and the overflow port 470 of the sump cover 416 can remain substantially unobstructed.

Referring again to FIGS. 27-29, in forming the sump cover 416, the cup 440 that forms the pump inlet 442 for the sump cover 416 can be made as a separate piece that is subsequently attached to the remainder of the sump cover 416. By forming the cup 440 having the pump inlet 442 as a separate piece, the impeller chamber 444 formed by the cup 440 can include a larger pump inlet 442. This larger pump inlet 442 provides for movement of lint particles 64 as well as fluid through the pump inlet 442, past the impeller 450, and through a fluid outlet 418 to be directed to the diverter valve 58 for the appliance 12. The cup 440 that forms the pump inlet 442 also includes an enlarged portion 452 that extends from the impeller chamber 444 and toward the outlet aperture 454 of the fluid outlet 418. This enlarged portion 452 also allows for movement of the lint particles 64 and fluid through the fluid outlet 418, past the impeller 450, and into the fluid outlet 418, without substantially clogging the sump cover 416 with the lint particles 64. The sump cover 416 can be made of various materials that can include, but are not limited to, plastic, metals, composite materials, various polymers, combinations thereof, and other similar materials.

In various aspects of the device, the appliance 12 can include a pair of fluid outlets 418 that are utilized through bi-directional operation of the sump pump 414. In such an embodiment, clockwise rotation of the impeller 450 can move material to a first fluid outlet 418. Conversely, counter-clockwise rotation of the impeller 450 can move the material to a second fluid outlet 418 for delivery to a separate location of the appliance 12.

Referring again to FIGS. 25-29, the sump cover 416 can include integral portions that are each formed within various portions of the sump cover 416. By way of example, and not limitation, each of the pump inlet 442, fluid outlet 418, overflow port 470, pump seat 494, perimeter seal 432 and fluid level sensor 460 can each be incorporated within portions of the sump cover 416. It is contemplated that some or all of these features can be injection molded within various portions of the sump cover 416 to define a unitary assembly that can be attached as a single unit onto the cover seat 434 defined at the perimeter wall 438 of the sump 410 to define a sealed connection between the sump cover 416 and the sump 410 defined within the basement 242 of the appliance 12. Additionally, the pump seat 494 defined within the sump cover 416 can define a specific seat within which the sump pump 414 can be disposed and secured. Accordingly, the sump pump 414 and sump cover 416 can be manufactured at a single assembly, and attached over the sump 410. During manufacture, an electrical connection can be made between the sump pump 414 and the electrical system of the appliance 12, so that the sump pump 414 and sump cover 416 can be installed as a single assembly within the basement 242 of the appliance 12. By installing this single assembly, the integral features of the sump cover 416 that can include the fluid inlet 320, fluid outlet 418, overflow port 470, fluid level sensor 460, impeller chamber 444, pump seat 494, and other features can be integrally formed within this single assembly and installed as a single unit within the basement 242 of the appliance 12. This can save time and resources during manufacture, maintenance and repair, as the sump cover 416 and its component parts can be manufactured separately and installed as a single piece within the basement 242 of the appliance 12.

Referring now to FIGS. 30-41, a lint filter 510, and, in various embodiments, a fixed and substantially non-removable lint filter, can be disposed within the airflow path 20 upstream of the heat exchangers 26. In this position, the lint filter 510 can be disposed within a filter receptacle 512 defined within the inside surface 514 of the airflow path 20. Accordingly, various securing features 516 are defined within the airflow path 20 for maintaining a position of the lint filter 510 in a secured and fixed position upstream of the heat exchanger 26.

As exemplified in FIGS. 31-36, the lint filter 510 can include a continuous outer blocking flange 518 that extends outward from a top side 520 and opposing vertical sides 522 of the lint filter 510. The continuous blocking flange 518 serves to secure the lint filter 510 within the airflow path 20. The blocking flange 518 also prevents process air 24 from escaping around the lint filter 510. As process air 24 moves toward the lint filter 510, the continuous blocking flange 518, through its engagement with the airflow path 20, at the filter receptacle 512, creates a seal 524 that prevents leakage of process air 24 around the outer frame 542 of the lint filter 510. In this manner, the process air 24, which is typically laden with lint particles 64, is funneled through the filtering material 526 of the lint filter 510. Accordingly, substantial amounts of lint particles 64 can be captured within the lint filter 510 during operation of the appliance 12.

Referring again to FIGS. 30-41, as process air 24 is moved from the drum 14 (shown in FIG. 2) and toward the heat exchangers 26, the process air 24 is moved through an upstream surface 540 or front side of the lint filter 510. By securing the lint filter 510 within the filter receptacle 512, vibration, wobbling, and other movement that might generate noise resulting from the passage of process air 24 through the lint filter 510 can be mitigated or substantially eliminated. To further resist this vibration, the lint filter 510 can include the outer frame 542 that extends around a perimeter 544 of the filtering material 526. One or more internal frame members 546 can also extend within an interior portion 548 of the lint filter 510. These internal frame members 546 can provide additional strength and rigidity to the lint filter 510. This additional rigidity serves to prevent vibration and other movement of the lint filter 510 and within the lint filter 510 during operation of the appliance 12.

According to various aspects of the device, the filtering material 526 can be separated into filtering sections 560 that are separated by the internal frame members 546. Accordingly, the filtering material 526 can be included as three separate filtering sections 560 that extend between the outer frame 542 and the internal frame members 546. Alternatively, the filtering material 526 can be a single piece of filtering material 526 that extends within the frame of the lint filter 510. In such an embodiment, the internal frame members 546 are typically positioned against a downstream surface 562 of the filtering material 526. By placing the internal frame members 546 on the downstream surface 562 of the filtering material 526, the internal frame members 546 can oppose deflection of the filtering material 526 that may be experienced as the process air 24 moves through the upstream surface 540 of the filtering material 526. The process air 24 may tend to bias the filtering material 526 towards the heat exchangers 26. The placement of the internal frame members 546 serves to oppose this tendency of the filtering material 526 to move toward the heat exchangers 26 and limit vibration and other movement within the lint filter 510.

As exemplified in FIGS. 37-41, the lint filter 510 can be positioned and secured within the filter receptacle 512 within the airflow path 20. The outer blocking flange 518 is typically not included within a bottom edge 570 of the lint filter 510. This configuration makes the bottom edge 570 of the frame for the lint filter 510 have a thinner profile that can seat within a bottom recess 572 of the filter receptacle 512 defined within a bottom wall 574 of the airflow path 20. Through this thinner configuration, the bottom edge 570 of the lint filter 510 is disposed at a lower position with the inside surface 514 of the airflow path 20. In this manner, the filtering material 526 of the lint filter 510 extends from near top edge 576 of the bottom recess 572 that is substantially at the level of the inside surface 514 and extends upward through the airflow path 20. By seating the outer frame 542 of the lint filter 510 within the bottom recess 572, the outer frame 542 can be positioned within the filter receptacle 512 so that a maximum amount of the filtering material 526 of the lint filter 510 can be exposed for capturing lint particles 64 as process air 24 moves through the airflow path 20 and through the filtering material 526 of the lint filter 510. Additionally, because the blocking flange 518 of the lint filter 510 is not contained within the bottom edge 570 of the lint filter 510, the lint filter 510 is able to sit lower within the airflow path 20 so that the bottom edge 570 of the lint filter 510 can be entirely or substantially seated within the bottom recess 572 of the filter receptacle 512. By seating the bottom edge 570 of the outer frame 542 within the bottom recess 572, this engagement also substantially forms a seal 524 at the bottom edge 570 of the lint filter 510 so that process air 24 is substantially unable to circumvent the lint filter 510. The process air 24 is thereby directed through the filtering material 526 of the lint filter 510.

Referring again to FIGS. 32-41, the blocking flange 518 extends upward along the opposing vertical sides 522 of the lint filter 510. The filter receptacle 512 defined within the airflow path 20 includes vertical walls 590 that engage a forward surface 592 of the blocking flange 518. Similarly, the top area of the filter receptacle 512 includes a top recess 594 that engages the forward surface 592 of the blocking flange 518. To secure the forward surface 592 of the blocking flange 518 against the vertical walls 590 and top recess 594 of the airflow path 20, the filter receptacle 512 can include a plurality of tabs 596 that engage a rearward surface 598 of the blocking flange 518. Accordingly, the blocking flange 518 is secured between the vertical walls 590 and top recess 594 of the airflow path 20 on the forward side. The various tabs 596 that extend at least along the top and bottom of the airflow path 20 engage the rearward surface 598 of the lint filter 510. Accordingly, the forward and rearward surfaces 592, 598 of the lint filter 510 are secured in the filter receptacle 512. This secure engagement that defines the filter receptacle 512 is configured to maintain the lint filter 510 in a fixed position. The filter receptacle 512 is further configured to minimize and/or substantially eliminate vibration experienced by the lint filter 510 within the lint filter receptacle 512 during operation of the appliance 12.

Referring again to FIGS. 9-13, 39 and 41, the lint filter 510 can be seated within the filter seat 232 of the heat exchange plate 190. The filter seat 232 is typically configured to define the bottom recess 572 of the lint filter receptacle 512. The various tabs 596 can be defined by the support structures 240 that extend across or through the condensate drain 230 that is positioned downstream of the lint filter 510. These support structures 240 can maintain the position of the filter seat 232 and also secure the lint filter 510 within the filter seat 232 to minimize vibration or other movement. The support structures 240 acting as the tabs 596 for the filter receptacle 512 also maintain the positioning of the lint filter 510 in relation to the condensate drain 230 downstream of the lint filter 510 and the condensate opening 250 upstream of the lint filter 510. Through this configuration, the movement of condensate 36 and the fluid and lint mixture 412 can be substantially unimpeded through the fixed positioning of the lint filter 510 within the filter seat 232 and the filter receptacle 512 of the airflow path 20.

Referring again to FIGS. 9, 10, 18 and 37-40, the first and second nozzles 116, 118 of the fluid spray system 110 can also define a portion of the filter receptacle 512. In such an embodiment, a body 610 of each of the first and second nozzles 116, 118 can engage a front surface 612 of the outer frame 542 for the lint filter 510. This engagement between the first and second nozzles 116, 118 and the lint filter 510 serves to further secure the position of the lint filter 510. This configuration also sets the positioning of the first and second nozzles 116, 118 in relation to the filtering material 526 contained within the lint filter 510. By fixing the position of the first and second spray nozzles 116, 118 with respect to the lint filter 510, the spray sequence 160 performed by the fluid spray system 110 can be maintained as a substantially consistent fluid spray 112 that is directed to a surface of the filtering material 526 of the lint filter 510. Typically, the first and second nozzles 116, 118 direct the fluid spray 112 toward the upstream surface 540 of the lint filter 510. However, other spray configurations can be implemented, such as spraying the fluid spray 112 through the downstream surface 562 of the lint filter 510.

As exemplified in FIGS. 9, 10 and 37-40, the first and second nozzles 116, 118, during operation of the particular spray sequence, direct a flow of fluid spray 112 onto a surface of the lint filter 510. The inclusion of the internal frame members 546 serves to provide support to the filtering material 526 and maintains the positioning of the filtering material 526 during the spray sequence 160. During a particular spray sequence 160, the force of the spray fluid 112 emanating from the first and second nozzles 116, 118 may tend to push or otherwise bias the filtering material 526 toward the heat exchangers 26. By including the internal frame members 546 against a downstream surface 562 of the filtering material 526, the position of the filtering material 526 can remain substantially consistent over the life of the appliance 12. This consistent positioning of the filtering material 526 also provides for a substantially consistent fluid spray 112 during a spray sequence 160 for effective removal of lint particles 64 from the upstream surface 540 of the filtering material 526.

While the term "non-removable" may be used to describe the nature of the lint filter 510, the term "non-removable" is used to describe the lint filter 510 as being held in place and not removed for cleaning after each drying cycle. Rather, the lint filter 510 may be periodically removed during service calls that are conducted by a service professional working on the appliance 12. Through the fixed location of the lint filter 510 within the lint filter receptacle 512, the lint filter 510 can be removed from the lint filter receptacle 512 by removing a portion of the airflow path 20 that defines the lint filter receptacle 512. By way of example, and not limitation, a cover member 620 of the airflow path 20 near the heat exchangers 26 for the airflow path 20 may be removed and the lint filter 510 can be separated from the lint filter receptacle 512 for maintenance, repair, routine cleaning or replacement.

Additionally, in various aspects of the device, the lint filter 510 can be a removable-type lint filter that can be separated from the lint filter receptacle 512 by a user of the appliance 12. In such an embodiment, this removal of the lint filter 510 may be accomplished by separating various portions of the lint filter receptacle 512 so that the lint filter 510 can be removed from the airflow path 20. Typically, the lint filter 510 is substantially non-removable and is configured for periodic removal from the airflow path 20 by a service professional during maintenance of the appliance 12.

Referring again to FIGS. 30-41, in order to fix the position of the lint filter 510 within the filter receptacle 512, either the outer frame 542 for the lint filter 510 or a portion of the lint filter receptacle 512 can include an elastomeric member. This elastomeric member may act as a damper to absorb vibration or other movement that may be experienced by the lint filter 510 during operation of the appliance 12. Such an elastomeric member can typically be made of a heat-resistant material that can withstand temperatures experienced within the airflow path 20 during a particular drying operation.

Referring again to FIGS. 32-41, the lint filter 510 includes the blocking flange 518 that extends outward from a top side 520 and the opposing vertical sides 522 of the lint filter 510. As discussed previously, this blocking flange 518 is not included within the bottom edge 570 of the lint filter 510 so that the bottom edge 570 can seat lower within the lint filter receptacle 512 to maximize the amount of the filtering material 526 that extends across the airflow path 20 for capturing lint particles 64 present within the process air 24 being directed from the drum 14 and to the heat exchangers 26.

According to various aspects of the device, the lint filter 510 can include a unitary plastic frame that includes the outer frame 542, the continuous blocking flange 518 and the internal frame members 546. The filtering material 526 can be attached to the perimeter frame and can extend across the internal frame members 546 as a single piece of a filtering material 526. It is also contemplated that the internal frame members 546 can be separate members that are attached to the outer frame 542. Additionally, the lint filter 510 can be made of various materials that can include, but are not limited to, plastic, metals, composite materials, various polymers, combinations thereof, and other similar materials. The filtering material 526 can be made of various filtering media that can include, but is not limited to, metallic wire mesh, plastic wire mesh, a perforated member, fibrous filtering media, and other similar filtering material 526 that can capture lint particles 64 and also be washed by the first and second nozzles 116, 118 through operation of the fluid spray system 110.

As exemplified in FIGS. 9, 10 and 31-41, the lint filter 510 is separated into three filtering sections 560 through the inclusion of the internal frame members 546. It is contemplated that the number of spray nozzles 52 included in the fluid spray system 110 can match the number of filtering sections 560 within the lint filter 510. Accordingly, with three filtering sections 560, three spray nozzles 52 may be included. Additionally, as exemplified in FIGS. 31 and 40, two spray nozzles 52 can be used to spray fluid onto a plurality of filtering sections 560 that may not match the number of spray nozzles 52 of the fluid spray system 110. The inclusion of the internal frame members 546, in certain respects, supports the positioning of the filtering material 526 from behind to prevent deflection or other displacement of the filtering material 526 toward the heat exchanger 26. Such deflection or displacement may negatively affect the performance of the lint filter 510 in capturing lint particles 64 and receiving the fluid spray 112 from the first and second nozzles 116, 118 for cleaning lint particles 64 off from the lint filter 510.

According to various aspects of the device, the lint filter 510 can include a plurality of filtering members that can be placed sequentially within a position upstream of the heat exchanger 26. In such an embodiment, each filtering member may have its own dedicated set of spray nozzles 52 for directing fluid to the respective filter member for cleaning lint particles 64 off from a surface of the particular filter member. The number of filter members within the airflow path 20 can include a single filter member or a plurality of filter members. The number of filter members can vary depending upon the design of the appliance 12 and the various performance parameters of the particular appliance 12.

Figure 37:
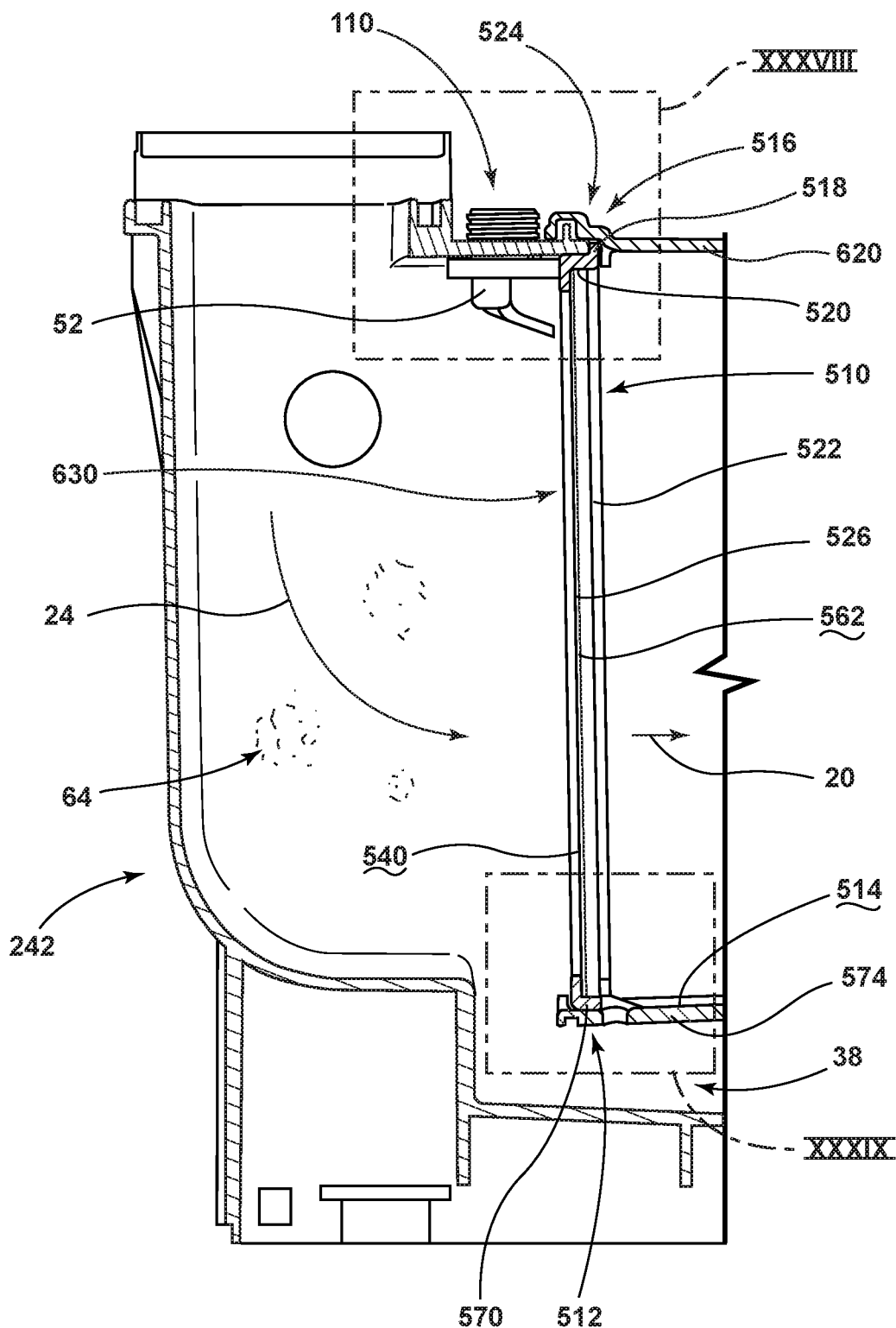
FIG. 37 is a cross-sectional view of the lint filter of FIG. 30 taken along line XXXVII-XXXVII.
Figure 38:
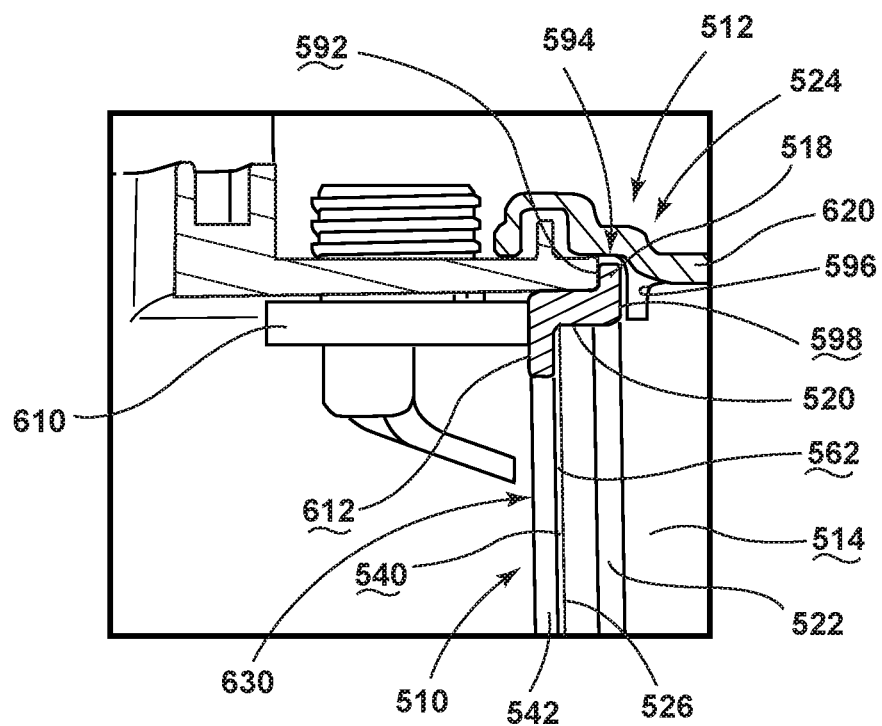
FIG. 38 is an enlarged cross-sectional view of the lint filter of FIG. 37 taken at area XXXVIII.
Figure 39:
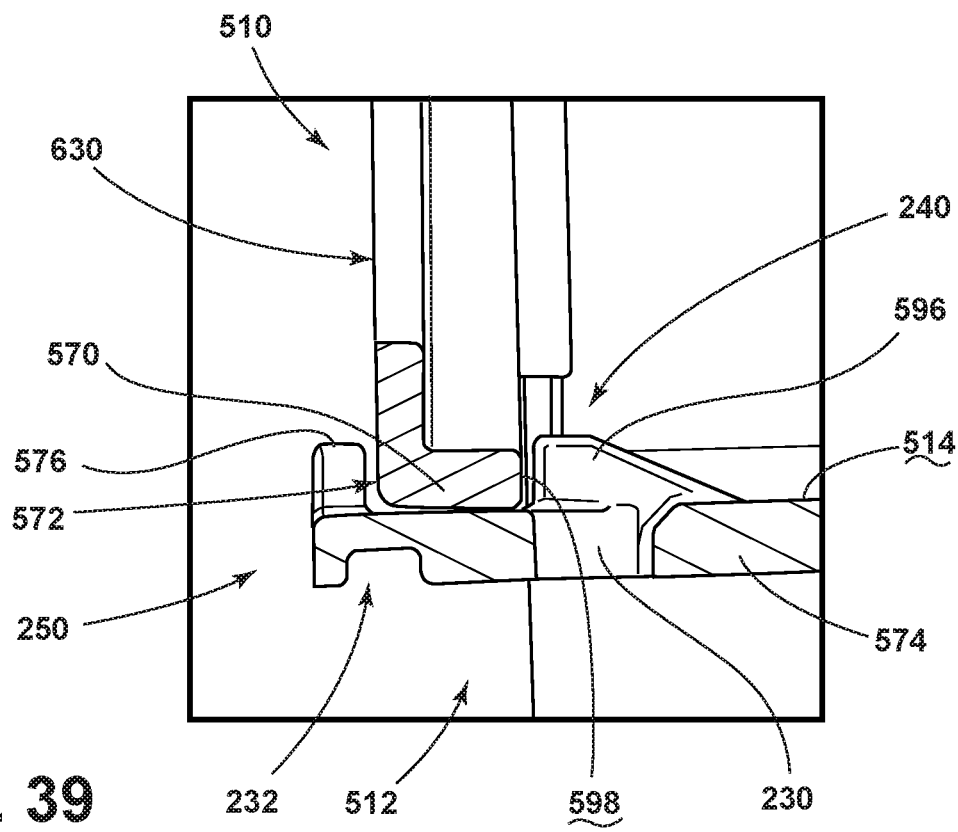
FIG. 39 is an enlarged cross-sectional view of the lint filter of FIG. 37 taken at area XXXIX.
Figure 40:
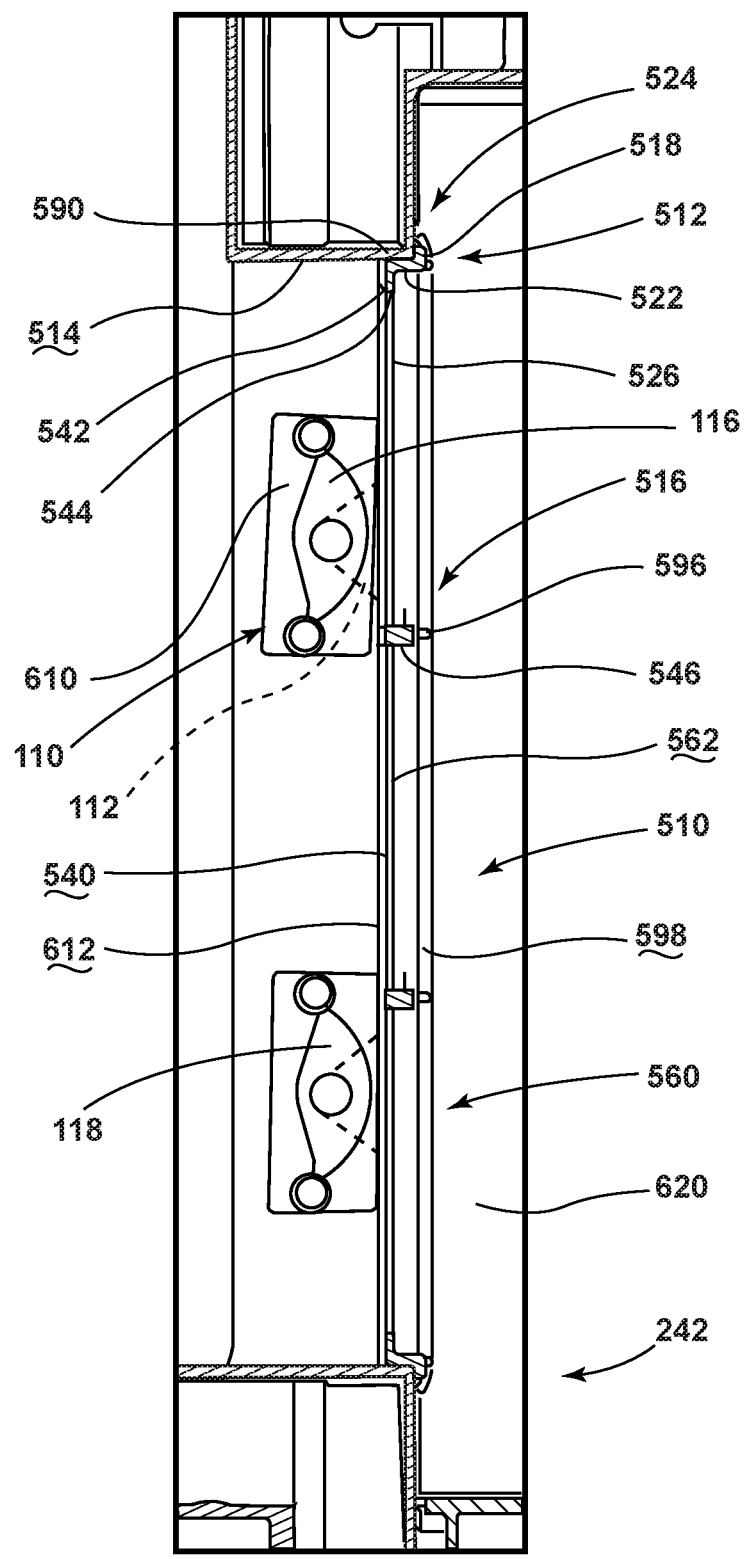
FIG. 40 is a cross-sectional view of the lint filter of FIG. 30 taken at line XL-XL.
Figure 41:
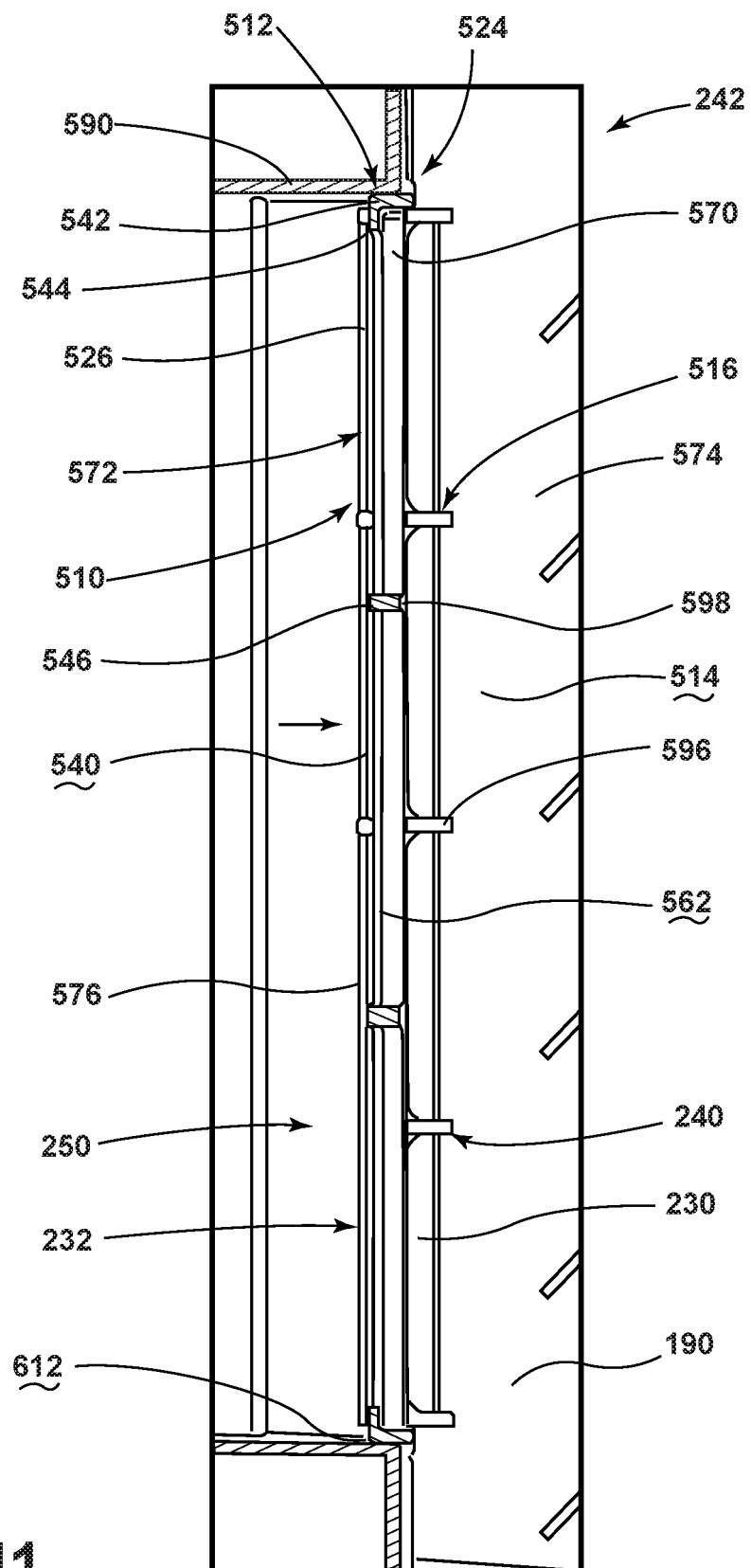
FIG. 41 is a cross-sectional view of the lint filter of FIG. 31 taken at line XLI-XLI.

According to various aspects of the device as exemplified in FIGS. 37-39, the lint filter 510 can be disposed at an inclined angle 630 so that a bottom edge 570 of the lint filter 510 is positioned closer to the heat exchangers 26 and the top side 520 of the lint filter 510 is positioned farther from the heat exchangers 26. In this manner, the upstream surface 540 of the lint filter 510 slopes away from the first and second nozzles 116, 118. Because the upstream surface 540 of the lint filter 510 is positioned at an inclined angle 630, the fluid spray 112 emanating from the first and second nozzles 116, 118 can more efficiently direct the entrapped lint particles 64 down the upstream surface 540 of the lint filter 510 and through the condensate opening 250. The inclined angle 630 also assists in preventing the entrapped lint particles 64 from stacking up at the bottom edge 570 of the lint filter 510. Rather, the upstream surface 540 of the lint filter 510 having the inclined angle 630 is conveniently suited to allow the lint particles 64 to fall away from the upstream surface 540 and be directed into the condensate opening 250 for removal into the drain channel 38 for the appliance 12. In various aspects of the device, the inclined angle 630 places a portion of the lint filter 510 over the condensate opening 250. By angling the upstream surface 540 of the lint filter 510, gravity assists in pulling the entrapped lint particles 64 away from the upstream surface 540 of the lint filter 510 and moving the lint particles 64 toward the condensate opening 250 for removal.

Figure 42:
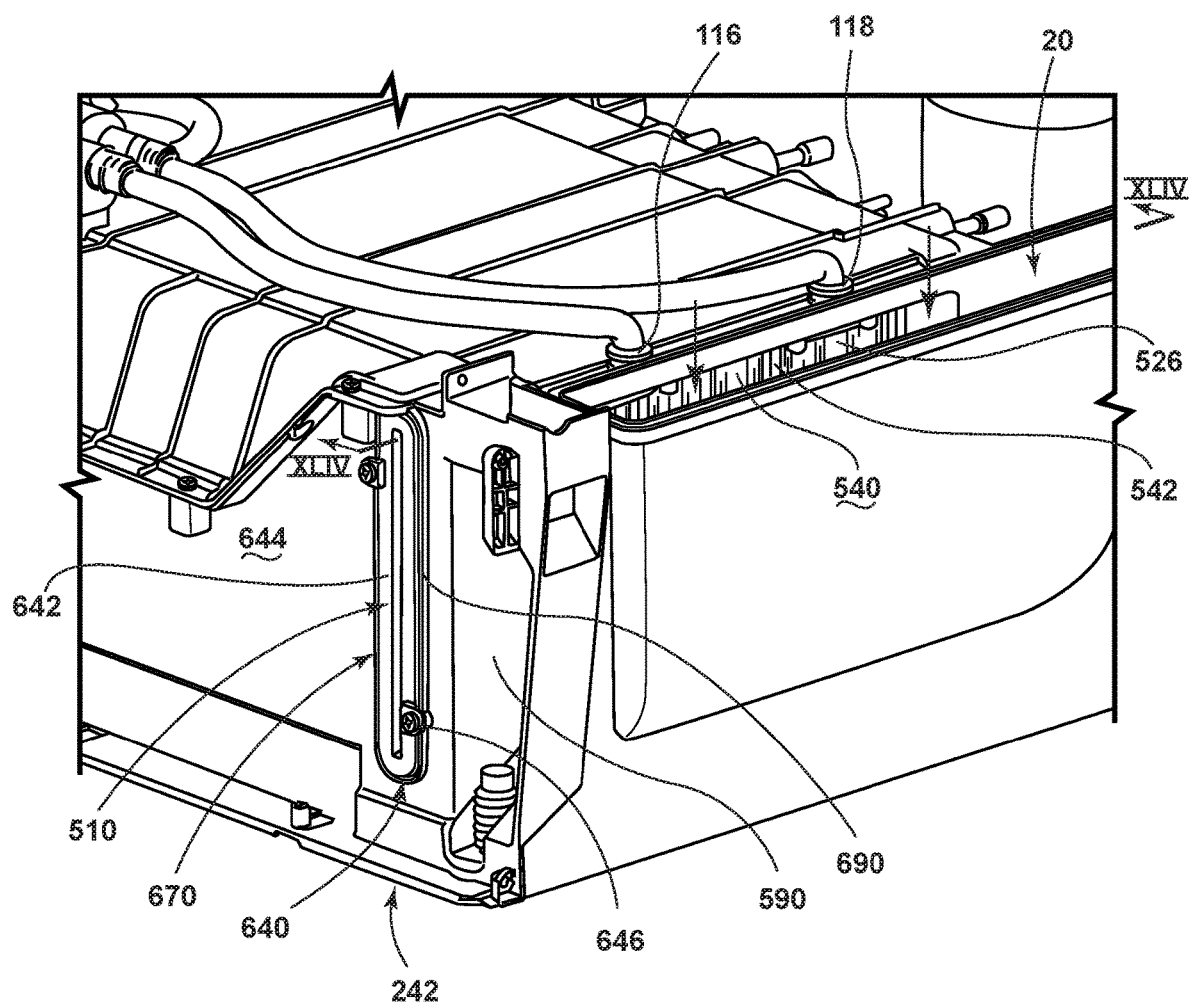
FIG. 42 is a side perspective view of a basement for a laundry appliance showing an aspect of a lint filter positioned upstream of a heat exchanger.
Figure 43:
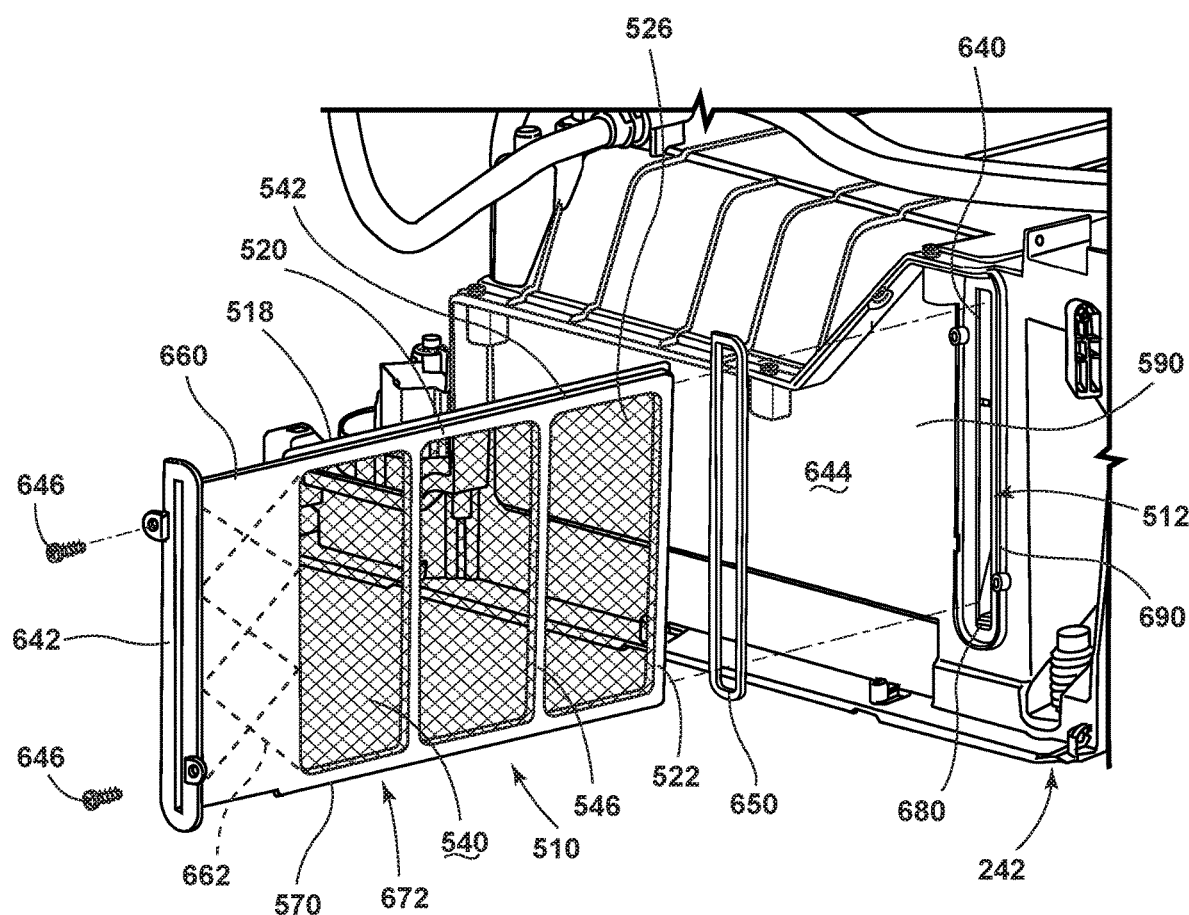
FIG. 43 is a partially exploded view of the basement of FIG. 42 showing the lint filter removed from the lint filter receptacle.
Figure 44:
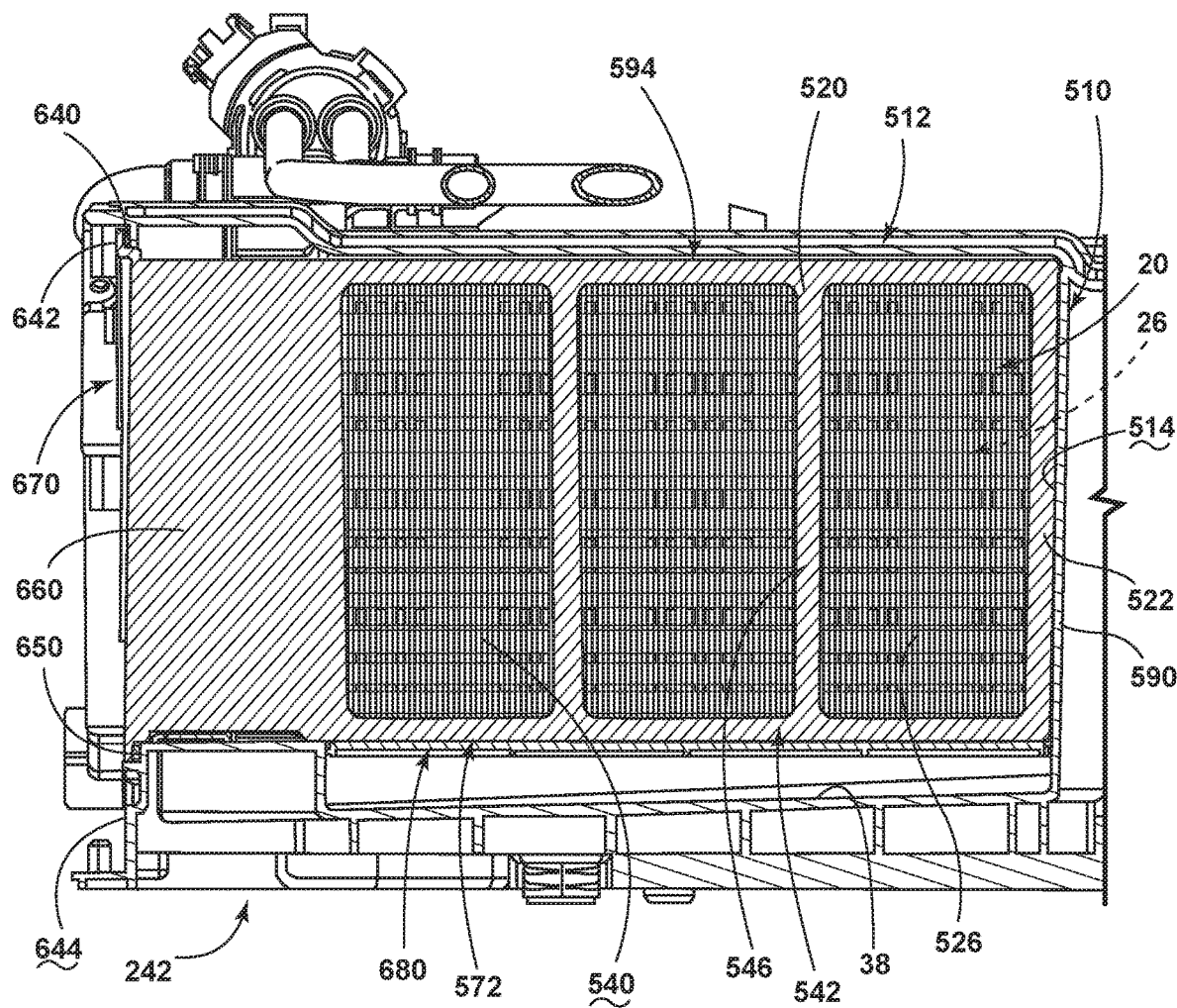
FIG. 44 is a cross-sectional view of the basement of FIG. 42 taken along line XLIV-XLIV.
Figure 45:
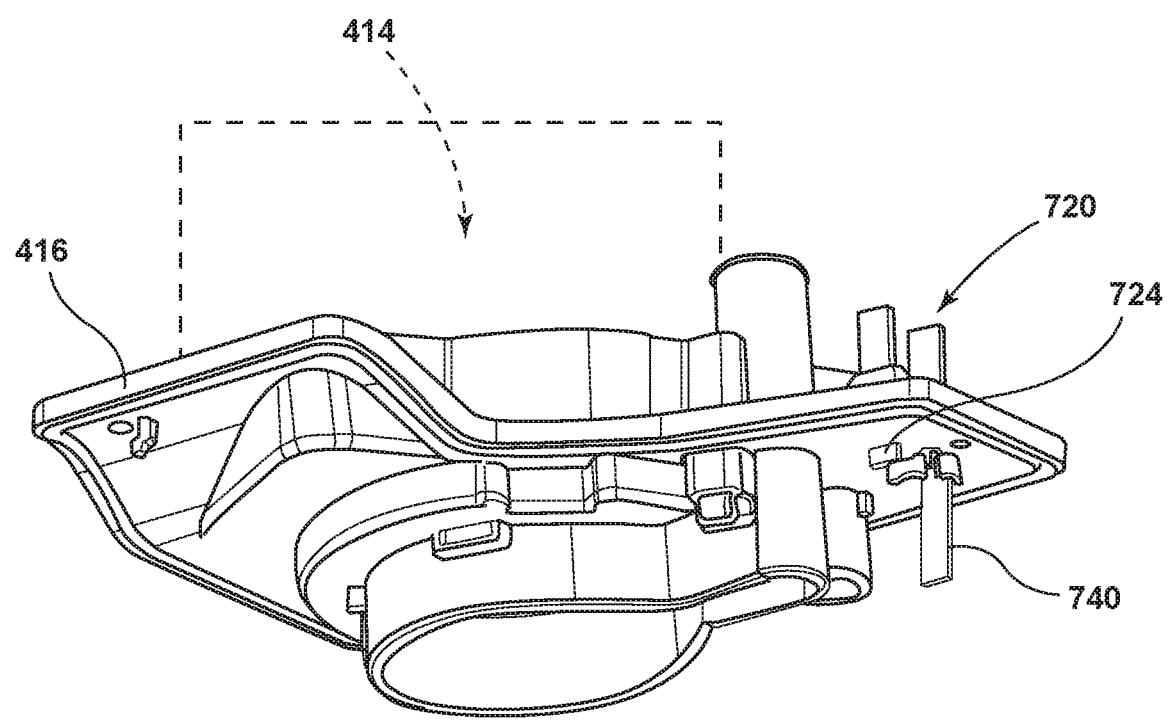
FIG. 45 is a perspective view of an aspect of a sump cover incorporating a multi-component fluid level sensor for operating a sump pump.
Figure 46:
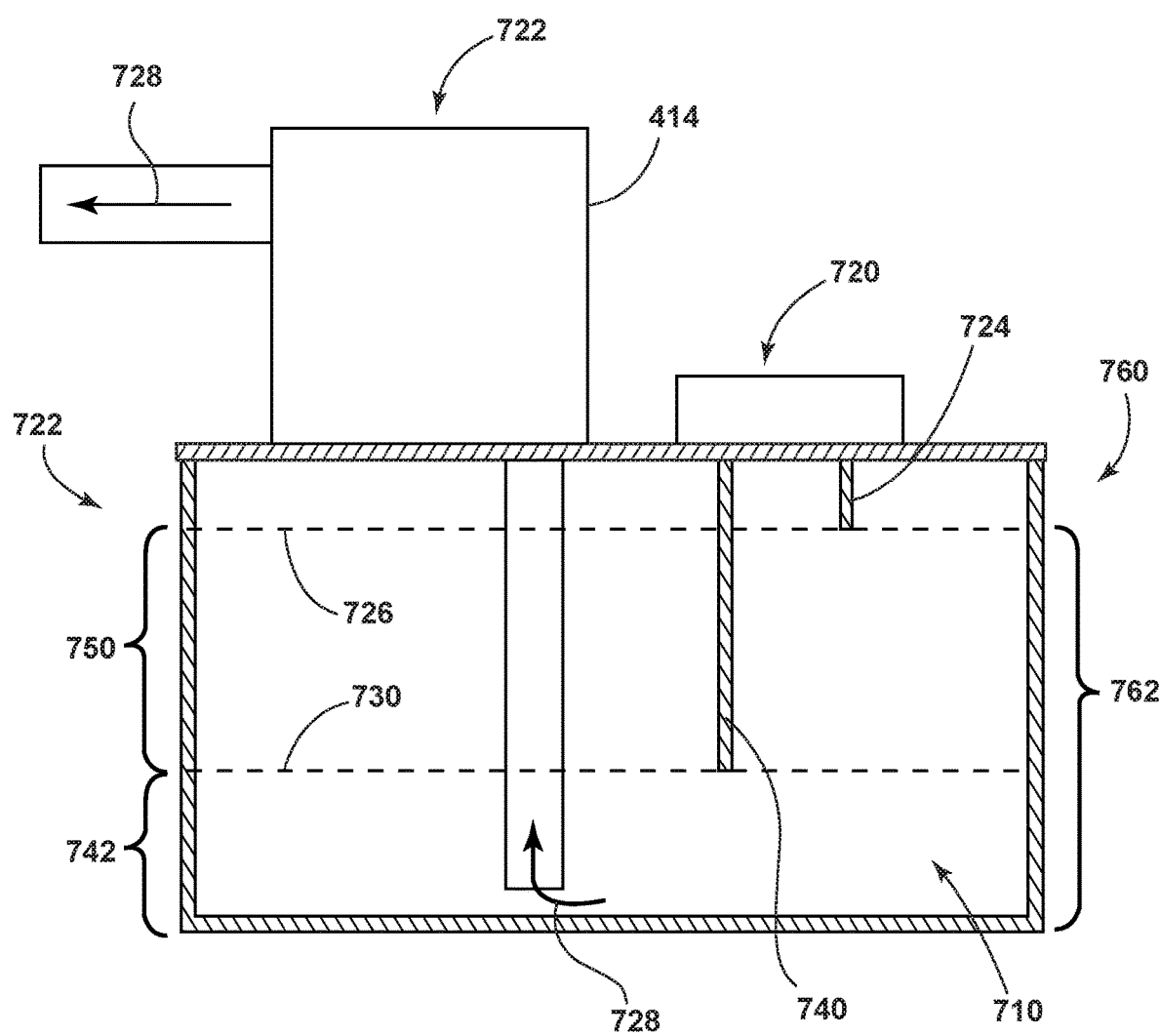
FIG. 46 is a schematic cross-sectional view of a sump for a laundry appliance that includes an aspect of the multi-component fluid level sensor and exemplifying operation of the pump in relation to the multi-component fluid level sensor.

Referring now to FIGS. 42-44, various aspects of the device can include a lint filter 510 that can be removed, typically, by a service technician during a service call. For allowing convenient removal of the lint filter 510, the filter receptacle 512 that is defined within the inside surface 514 of the airflow path 20 can also include a filter aperture 640 disposed within one of the vertical walls 590 that define the basement 242. The filter aperture 640 can allow for slidable engagement of the lint filter 510 into and out from the airflow path 20. The lint filter 510 can include a securing flange 642 that is positioned substantially perpendicular to the outer frame 542 for the lint filter 510. This securing flange 642 can be used to secure the lint filter 510 to the vertical wall 590 of the basement 242 at the filter aperture 640. Various fasteners 646 such as screws, clips, hasps, clasps, hooks, and other similar fixing mechanisms can be used to selectively secure the securing flange 642 of the lint filter 510 against the outer surface 644 of the basement 242. This configuration allows the lint filter 510 to be securely placed within the airflow path 20 such that the lint filter 510 experiences a minimal amount of vibration, if any, during operation of the appliance 12.

As exemplified in FIG. 43, during a service call, the individual servicing the appliance 12 can remove the fasteners 646 from the securing flange 642 and can slidably remove the lint filter 510 from the filter receptacle 512 and through the filter aperture 640 defined within the vertical wall 590 of the basement 242. To assist in securing the lint filter 510 to the vertical wall 590, a gasket 650, such as an elastomeric gasket, can be placed between the securing flange 642 of the lint filter 510 and the outer surface 644 of the vertical wall 590. This gasket 650 can be used to further secure the lint filter 510 within the filter receptacle 512. The compression of the gasket 650 serves to absorb at least a portion of the vibrations that may be experienced in the basement 242, so that the lint filter 510 experiences a minimal amount of vibration during operation of the appliance 12. This configuration also serves to minimize the amount of noise that emanates from the lint filter 510 during operation of the appliance 12.

Referring again to FIGS. 43 and 44, the lint filter 510 can include a support portion 660 that extends between the securing flange 642 and the outer frame 542 extending around the filtering material 526 for the lint filter 510. When the lint filter 510 is installed within the filter receptacle 512, the support portion 660 extends between the vertical wall 590 and the airflow path 20 and allows for accurate positioning of the filtering material 526 within the airflow path 20. Accordingly, using the support portion 660 of the lint filter 510, substantially all of the filtering material 526 is placed within the airflow path 20. Various reinforcing ribs 662 can be placed within the support portion 660. These reinforcing ribs 662 can also extend around portions of the outer frame 542 to reinforce the lint filter 510 and minimize vibration of the outer frame 542 and the support portion 660 during operation of the appliance 12.

As exemplified in FIGS. 42-44, the filter receptacle 512 can be in the form of a slidably engageable slot within which the lint filter 510 can be slidably operated between an installed position 670 and a removed position 672. To slidably engage the filter receptacle 512, the blocking flange 518 of the lint filter 510 can be disposed along the top side 520 and one of the vertical sides of the lint filter 510. As discussed previously, the blocking flange 518 along the top side 520 is adapted to engage the top recess 594 of the filter receptacle 512 that includes the various tabs 596 and the first and second nozzles 116, 118. In such an embodiment, the blocking flange 518 typically does not extend along the vertical side of the lint filter 510 that is adjacent to the filter aperture 640. Rather, the support portion 660 engages a portion of the basement 242 to align the lint filter 510 within the airflow path 20 and secure the lint filter 510 within the filter receptacle 512 disposed within the basement 242 of the appliance 12.

Referring again to FIGS. 37-44, the top and bottom recesses 594, 572 are typically aligned with at least a portion of the filter aperture 640 such that the top and bottom recesses 594, 572 cooperatively define a sliding channel 680 through which the lint filter 510 can be manipulated between the installed and removed positions 670, 672. The tabs 596 of the top and bottom recesses 594, 572 as well as the first and second nozzles 116, 118 can be used to define the sliding channel 680 and properly align the lint filter 510 as it is being slidably inserted into the filter receptacle 512 to define the installed position 670. Where a vertical side 522 of the lint filter 510 engages one of the tabs 596 or the first and second nozzles 116, 118, a person operating the lint filter 510 receives feedback that the lint filter 510 is properly aligned within the lint filter receptacle 512. The feedback provided by the top and bottom recesses 594, 572 helps to ensure that the lint filter 510 is properly and securely placed within the filter receptacle 512. As discussed previously, when the lint filter 510 is in the installed position 670 within the filter receptacle 512, the lint filter 510 experiences minimal amounts of vibration. In this manner, minimal amounts of noise emanate from the lint filter 510 during operation of the appliance 12.

As exemplified in FIGS. 42 and 43, the filter aperture 640 disposed within the vertical wall 590 of the basement 242 can include an outer recess 690 that receives the securing flange 642. The outer recess 690 can be used to receive the securing flange 642 of the lint filter 510 and inform the user of the appliance 12 that the lint filter 510 is fully installed within the filter receptacle 512. Typically, the gasket 650 is disposed within the outer recess 690. This configuration can also further assist in minimizing the amount of vibration experienced by the lint filter 510 during operation of the appliance 12.

Referring now to FIGS. 5-6, 25-29, 45 and 46, condensate 36 that has been removed by the heat exchangers 26 is delivered to the drain channel 38. This condensate 36 flows through the drain channel 38 and is directed to the sump 410 where a sump pump 414 selectively operates to deliver the condensate 36 to other portions of the appliance 12 or out of the appliance 12 for eventual disposal. The sump 410 can also be used to collect lint particles 64 that have been cleaned from various portions of the appliance 12. The sump pump 414 that is disposed within the sump area 710 can be in the form of a washer-type pump that is able to move condensate 36 as well as various particulate material, such as lint particles 64, from the sump area 710 to other portions of the appliance 12 for use or disposal. The condensate 36 and the fluid and lint mixture 412 can each be defined as a sump fluid 728 that is moved into the sump area 710 and transported therefrom by the sump pump 414. The other portions of the appliance 12 that the sump pump 414 can deliver the sump fluid 728 to can include, but are not limited to, various spray nozzles 52, a removable bottle 56, a drum 14, various cooling functions of the appliance 12, combinations thereof, and other similar locations.

Referring again to FIGS. 25-29 and 45-46, the sump area 710 can include a multi-component fluid sensor 720 that controls activation and deactivation of the sump pump 414. Using a multi-component fluid sensor 720, the amount of sump fluid 728 within the sump 410 may be used to control the various operating cycles 722 of the sump pump 414. The multi-component fluid sensor 720 can include an upper sensor 724 that detects when the level of sump fluid 728 reaches a maximum capacity 726. When the sump fluid 728 reaches this maximum capacity 726, the upper sensor 724 triggers activation of the sump pump 414. Once activated, the sump pump 414 delivers at least a portion of the sump fluid 728 from the sump area 710 to another portion of the appliance 12. During operation of a particular drying function 30 of the appliance 12, when the upper sensor 724 detects that the level of condensate 36 is at the maximum capacity 726, the sump pump 414 will initiate an operating cycle 722 to remove, typically, only that amount of sump fluid 728 to leave approximately a minimum capacity 730 of sump fluid 728 within the sump area 710. This minimum capacity 730 of sump fluid 728 can be used for accomplishing various spray sequences 160 of the appliance 12, as will be described more fully below.

When the sump fluid 728 has been detected as being at this maximum capacity 726, the sump pump 414 activates to remove at least a portion of the sump fluid 728 to a removable bottle 56 or to an external drain to prevent overflow of sump fluid 728 out of the drain channel 38 and also out of the sump area 710.

Referring again to FIGS. 25-29 and 45-46, the multi-component fluid sensor 720 also includes a lower sensor 740 that detects when the level of sump fluid 728 reaches the minimum capacity 730. When the level of sump fluid 728 is below this minimum capacity 730, a control for the appliance 12 can place the sump pump 414 in an idle state 742, such that the sump pump 414 is not typically activated. The minimum capacity 730 of sump fluid 728 being within the sump pump 414 ensures that an appropriate amount of sump fluid 728 is contained within the sump pump 414 for accomplishing a particular spray sequence 160 of the appliance 12. Such spray sequences 160 can include a particular cleaning cycle where a lint filter 510, coil of a heat exchanger 26, or other surface of the appliance 12 is cleaned using sump fluid 728 contained within the sump pump 414.

Where the amount of sump fluid 728 within the sump pump 414 is below this minimum capacity 730, there may be an insufficient amount of sump fluid 728 for accomplishing an uninterrupted spray sequence 160. Where insufficient sump fluid 728 exists, operation of a particular operating cycle 722 of the sump pump 414 may result in the sump pump 414 moving air, rather than the sump fluid 728. The movement of air through the sump pump 414 may result in overexertion of the sump pump 414, wasted energy, and potentially damage to the sump pump 414 and other portions of the appliance 12. By ensuring that at least a minimum capacity 730 of sump fluid 728 is contained within the sump pump 414, the multi-component fluid sensor 720 can be utilized to ensure uninterrupted efficient performance of an operating cycle 722 of the sump pump 414 during operation of the appliance 12.

Referring again to FIGS. 25-29 and 45-46, after the amount of sump fluid 728 within the sump pump 414 reaches the minimum capacity 730, the minimum capacity 730 of sump fluid 728 is detected by the lower sensor 740. Again, the sump fluid 728 may be only condensate 36 or may be the fluid and lint mixture 412 that includes both condensate 36 and lint particles 64. The lower sensor 740 can then send a signal to a control to place the sump pump 414 in an activated state 750. In this activated state 750, the sump pump 414 is typically able to be activated where initiation of a spray sequence 160 of the appliance 12 is necessary or where movement of sump fluid 728 from the sump area 710 is necessary, such as when the amount of sump fluid 728 in the sump area 710 reaches the maximum capacity 726. Again, the multi-component fluid sensor 720 may also be used to ensure that the minimum capacity 730 of sump fluid 728 is contained within the sump area 710. In this manner, during an operating cycle 722, the sump pump 414 will have a substantially continuous supply of condensate 36 during a spray sequence 160 and the sump pump 414 will be substantially prevented from pumping quantities of air, which may cause damage to the sump pump 414.

Referring again to FIGS. 5-6, 25-29 and 45-46, during a particular spray sequence 160 of the appliance 12, the sump pump 414 in the activated state 750 is operated to deliver sump fluid 728 to the spray nozzle 52 that is used to clean the particulate material such as lint particles 64 from a surface of the lint filter 510, or from a surface of a coil of a heat exchanger 26. The spray nozzle 52 can also be used to clean other surfaces of an appliance 12, such as a heat exchange plate 190, the drain channel 38, the sump area 170, the drum 14, or other portions of the appliance 12. The sump fluid 728 delivered by the sump pump 414 and used to clean the surface of the appliance 12 is then delivered back to the drain channel 38 and then on to the sump area 170. In this manner, the sump pump 414 may recirculate the sump fluid 728 during performance of the particular spray sequence 160. As discussed above, to account for the recirculation of lint particles 64 within the sump fluid 728, the sump pump 414 can be a washer-type pump that is configured to move these particles of matter in the form of lint particles 64 and other particulate material may be contained within the sump fluid 728. Because the sump fluid 728 is recirculated during a particular spray sequence 160, it is typically not necessary that additional fluid be added to the sump area 170 to perform the particular spray sequence 160. In this manner, so long as the minimum capacity 730 of sump fluid 728 is contained within the sump area 170, the recirculating function of the sump pump 414 for delivering sump fluid 728 to the spray nozzles 52 is typically sufficient to accomplish the entire spray sequence 160.

Referring again to FIGS. 5-6, 25-29 and 45-46, at the completion of a particular drying function 30, a certain amount of sump fluid 728 will typically be contained within the sump area 170. This sump fluid 728, at the end of the drying function 30 will be moved by the sump pump 414 to a separate area of the appliance 12 for disposal. This separate area may be in the form of the removable bottle 56 or may be an outlet for moving the sump fluid 728 to an external drain outside of the appliance 12. During this final drain operation 760 at the end of the drying function 30, a signal is provided, typically by a control, to initiate an override 762 to the multi-component fluid level sensor 460. This override 762 allows the amount of sump fluid 728 within the sump area 170 to drop below the minimum capacity 730 while maintaining operation of the sump pump 414 for removing the sump fluid 728 from the sump area 170 to after completion of the drying function 30. This override 762 can also be in the form of a deactivation or suspension of the multi-component fluid sensor 720. In either instance, the sump pump 414 may be activated when the level of sump fluid 728 within the sump pump 414 is above or below the minimum capacity 730 that is detectable by the lower sensor 740 of the multi-component fluid sensor 720.

According to various aspects of the device, the multi-component fluid sensor 720 can be in the form of a single elongated member with a plurality of sensors disposed thereon. Along the elongated member, the upper and lower sensors 724, 740 and other intermediary sensors may also be located on the single member. When the sump fluid 728 engages a particular portion of the multi-component fluid sensor 720, various communications can be sent to a control or directly to the sump pump 414 for defining the activated and idle states 750, 742 and also for operating the sump pump 414 during and after performance of a particular drying function 30. In various aspects of the device, the multi-component fluid sensor 720 can include separate members that are spaced at different locations within the sump area 170. These locations can be indicative of different levels of sump fluid 728 that correspond to at least the minimum capacity 730 and maximum capacity 726 of the sump area 170.

In various aspects of the device, the multi-component fluid sensor 720 can provide information regarding other levels of sump fluid 728 within the sump area 170. In addition to the minimum and maximum capacity 730, 726, additional portions of the multi-component fluid sensor 720 can provide information concerning the amount of sump fluid 728 that may be needed for separate spray sequences 160. By way of example, and not limitation, a spray sequence 160 for cleaning a lint filter 510 may require a different amount of sump fluid 728 than a spray sequence 160 for cleaning the coil of a heat exchanger 26 or a spray sequence 160 for cleaning a surface of a heat exchange plate 190. Additionally, components of the multi-component fluid sensor 720 may be used for deactivating the sump pump 414, such as during operation of the sump pump 414 for removing excess sump fluid 728 when the level of sump fluid 728 within the sump area 710 reaches the maximum capacity 726. In such an embodiment, the lower sensor 740 may detect when the level of sump fluid 728 within the sump area 170 being pumped away from the sump area 170 reaches the minimum capacity 730. At this minimum capacity 730, the lower sensor 740 may deactivate the sump pump 414 to maintain this minimum capacity 730 of sump fluid 728 within the sump area 170. Additional portions of the multi-component fluid sensor 720 can be incorporated for accomplishing similar functions for activating and deactivating the sump pump 414 and also for placing the sump pump 414 in the activated and idle states 750, 742.

It will be understood by one having ordinary skill in the art that construction of the described device and other components is not limited to any specific material. Other exemplary embodiments of the device disclosed herein may be formed from a wide variety of materials, unless described otherwise herein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A fluid flow system for a laundry appliance, the fluid flow system comprising:
    a blower that delivers process air along an airflow path during performance of a drying operation;
    a heat exchanger for dehumidifying the process air and removing condensate therefrom;
    a lint filter for capturing lint particles from the process air, wherein a fluid spray system removes the lint particles from the lint filter;
    a sump that collects the condensate from the heat exchanger and the lint particles from the fluid spray system to define sump fluid within the sump; and
    a sump cover having a pump that directs the sump fluid from the sump and to a fluid diverter valve, and a fluid level sensor that at least partially operates the pump; wherein
    the pump and the fluid level sensor are directly attached to the sump cover;
    the pump activates when a level of the sump fluid reaches a maximum capacity within the sump; and
    the pump remains idle when the level of the sump fluid is below a minimum capacity.

2. The fluid flow system of claim 1, wherein the fluid level sensor is deactivated and the pump is activated during a drain phase of the pump when the drying operation is complete.

3. The fluid flow system of claim 2, wherein during the drain phase, the sump fluid is directed from the pump to a removable bottle, wherein the sump cover includes an integral overflow port that is in communication with the removable bottle, wherein when the sump fluid in the removable bottle exceeds a full capacity, the sump fluid is directed into the sump via the integral overflow port.

4. The fluid flow system of claim 3, wherein the fluid level sensor is coupled to a control that operates the pump, wherein the pump selectively operates according to an override that is independent of the fluid level sensor; wherein:
    the override activates the pump when the level of the sump fluid is below the minimum capacity at completion of the drying operation; and
    the pump is deactivated when the sump fluid in the sump reaches the maximum capacity and the sump fluid in the removable bottle reaches the full capacity.

5. The fluid flow system of claim 1, wherein the fluid diverter valve is selectively operable to direct the sump fluid to a spray nozzle during a spray sequence, wherein the spray sequence operates to recirculate the sump fluid, sequentially, through the sump, the pump, the fluid diverter valve, the spray nozzle and returning to the sump.

6. The fluid flow system of claim 5, wherein the spray sequence is performed after the level of the sump fluid in the sump reaches the minimum capacity.

7. The fluid flow system of claim 6, wherein the minimum capacity of the sump fluid in the sump defines an amount of sump fluid that defines a continuous supply of the sump fluid through the pump during performance of the spray sequence.

8. The fluid flow system of claim 1, wherein the sump includes a cup portion that defines a fluid inlet and an impeller chamber, wherein the fluid inlet and the impeller chamber are in communication with a fluid outlet, wherein an impeller of the pump rotates within the impeller chamber.

9. The fluid flow system of claim 1, wherein the fluid level sensor includes a multi-part sensor that includes a lower sensor and an upper sensor, wherein:
   the lower sensor detects when the sump fluid in the sump reaches the minimum capacity; and
   the upper sensor detects when the sump fluid in the fluid level sensor reaches the maximum capacity.

10. A fluid flow system for a laundry appliance, the fluid flow system comprising:
   a sump that collects fluid from a drain channel, wherein the fluid at least partially includes condensate from a heat exchanger;
   a pump that directs the fluid from the sump and to one of a fluid outlet and a removable bottle via a fluid diverter valve;
   a sump cover that includes a pump seat that receives the pump and the fluid outlet that is integrally formed in the sump cover; and
   a fluid level sensor that detects at least a minimum capacity and a maximum capacity of the fluid in the sump, wherein:
      the fluid level sensor is disclosed within the sump cover;
      typical operation of the pump is defined by an idle state when the fluid is below the minimum capacity and an active state when the fluid reaches the maximum capacity; and
      an override operation of the pump is defined by a suspended operation of the fluid level sensor when a level of the fluid is below the minimum capacity at completion of a drying cycle, and when the fluid in the sump reaches the maximum capacity and the fluid in the removable bottle reaches a full capacity.

11. The fluid flow system of claim 10, wherein the fluid level sensor includes a multi-component sensor that includes a lower sensor and an upper sensor, wherein:
   the lower sensor detects when the fluid in the sump reaches the minimum capacity; and
   the upper sensor detects when the fluid in the fluid level sensor reaches the maximum capacity.

12. The fluid flow system of claim 10, wherein the pump is selectively operated to deliver fluid from the sump to a spray nozzle, via the fluid diverter valve, during performance of a spray sequence, wherein the fluid from the spray nozzle is directed into the drain channel and is recirculated back to the sump to define recirculated sump fluid, wherein the pump directs the recirculated sump fluid to the spray nozzle via the fluid diverter valve until completion of the spray sequence.

13. The fluid flow system of claim 12, wherein the recirculated sump fluid includes the condensate from the heat exchanger and lint particles from an upstream surface of a lint filter.

14. The fluid flow system of claim 10, wherein the sump cover includes an integral overflow port that is in communication with the removable bottle, wherein excess fluid from the removable bottle is directed into the sump via the integral overflow port.

* * * * *